(12) United States Patent
Vuong et al.

(10) Patent No.: US 8,685,252 B2
(45) Date of Patent: Apr. 1, 2014

(54) WATER TREATMENT SYSTEMS AND METHODS

(75) Inventors: Diem Xuan Vuong, Santa Ana, CA (US); Michael Motherway, Santa Ana, CA (US); Curtis Roth, Ranchos Palos Verdes, CA (US)

(73) Assignee: DXV Water Technologies, LLC, Orange, CA (US)

( * ) Notice: Subject to any disclaimer, the term of this patent is extended or adjusted under 35 U.S.C. 154(b) by 0 days.

(21) Appl. No.: 13/020,393

(22) Filed: Feb. 3, 2011

(65) Prior Publication Data

US 2011/0186513 A1   Aug. 4, 2011

Related U.S. Application Data

(60) Provisional application No. 61/301,357, filed on Feb. 4, 2010, provisional application No. 61/387,347, filed on Sep. 28, 2010.

(51) Int. Cl.
*B01D 65/02* (2006.01)
*B01D 65/08* (2006.01)
*B01D 61/02* (2006.01)
*B01D 63/12* (2006.01)
*C02F 1/44* (2006.01)

(52) U.S. Cl.
USPC . 210/652; 210/636; 210/321.76; 210/321.85; 210/321.7; 210/323.2

(58) Field of Classification Search
USPC ............ 210/652, 636, 321.76, 321.85, 321.7, 210/323.2, 321.69
See application file for complete search history.

(56) References Cited

U.S. PATENT DOCUMENTS

| | | | |
|---|---|---|---|
| 3,060,119 A | 10/1962 | Carpenter |
| 3,171,808 A | 3/1965 | Todd |
| 3,456,802 A | 7/1969 | Cole |
| 3,552,574 A | 1/1971 | Lowe et al. |
| 3,608,730 A | 9/1971 | Blaha |

(Continued)

FOREIGN PATENT DOCUMENTS

| | | |
|---|---|---|
| CN | 1654342 A | 8/2005 |
| DE | 02917058 C2 | 4/1982 |

(Continued)

OTHER PUBLICATIONS

Avula, "Sphering of a liquid-filled membrane (Stress field and deformed shapes of liquid filled axisymmetric sessile neo-Hookean membrane during submergence to various depths)", Southeastern Conference on Theoretical and Applied Mechanics, 6th, Tampa, Fla; Mar. 23-24, 1972.

(Continued)

*Primary Examiner* — David C Mellon
(74) *Attorney, Agent, or Firm* — Knobbe Martens Olson & Bear, LLP

(57) ABSTRACT

Water treatment systems and methods are provided to minimize membrane fouling and the required maintenance that results therefrom. A water treatment system includes a pressure vessel with a plurality of spaced-apart membranes disposed therein, and an impeller or other means for circulating feed water through the interior of the vessel and past the membranes. Antifouling particles (such as diatomaceous earth or activated carbon) and/or pellets can be added to the feed water inhibit membrane fouling and extend the useful life of the membranes.

28 Claims, 46 Drawing Sheets

(56) References Cited

U.S. PATENT DOCUMENTS

| | | |
|---|---|---|
| 3,655,051 A | 4/1972 | Quase |
| 3,883,412 A | 5/1975 | Jensen |
| 3,904,519 A | 9/1975 | McKinney et al. |
| 3,930,958 A | 1/1976 | Maruichi |
| 3,943,057 A | 3/1976 | Jamet et al. |
| 3,968,036 A * | 7/1976 | Liles et al. ............... 210/616 |
| 3,970,564 A | 7/1976 | Shamsutdinov et al. |
| 3,986,938 A | 10/1976 | Smith |
| 3,996,131 A * | 12/1976 | Conn ...................... 210/636 |
| 4,002,563 A | 1/1977 | Vogl et al. |
| 4,066,551 A | 1/1978 | Stern |
| 4,116,841 A | 9/1978 | Borsanyi |
| 4,164,854 A | 8/1979 | Martin |
| 4,231,873 A | 11/1980 | Swigger |
| 4,235,678 A | 11/1980 | McKeen |
| 4,288,326 A | 9/1981 | Keefer |
| 4,289,626 A * | 9/1981 | Knopp et al. ............... 210/616 |
| 4,341,629 A | 7/1982 | Uhlinger |
| 4,391,676 A | 7/1983 | Torberger |
| 4,414,114 A | 11/1983 | Drude et al. |
| 4,426,322 A | 1/1984 | Stage |
| 4,431,539 A | 2/1984 | Borsanyi |
| 4,473,476 A | 9/1984 | McMillan et al. |
| 4,504,362 A | 3/1985 | Kruse |
| 4,512,886 A | 4/1985 | Hicks et al. |
| 4,526,688 A | 7/1985 | Schmidt, Jr. |
| 4,556,488 A | 12/1985 | Timm et al. |
| 4,594,158 A * | 6/1986 | Chong et al. ............... 210/193 |
| 4,610,792 A * | 9/1986 | Van Gils et al. ........... 210/639 |
| 4,702,842 A | 10/1987 | LaPierre |
| 4,770,775 A | 9/1988 | Lopez |
| 4,806,244 A | 2/1989 | Guilhem |
| 4,849,109 A | 7/1989 | Sleytr et al. |
| 4,891,140 A | 1/1990 | Burke |
| 4,952,317 A | 8/1990 | Culkin |
| 5,028,329 A | 7/1991 | Drioli et al. |
| 5,084,182 A | 1/1992 | Arthur |
| 5,096,583 A | 3/1992 | Roux |
| 5,192,434 A | 3/1993 | Moller |
| 5,198,116 A * | 3/1993 | Comstock et al. ............ 210/636 |
| 5,229,005 A | 7/1993 | Fok et al. |
| 5,238,559 A | 8/1993 | Nieweg |
| 5,254,261 A | 10/1993 | Tomaschke et al. |
| 5,282,979 A | 2/1994 | Wilson |
| 5,348,651 A | 9/1994 | Carlson et al. |
| 5,366,635 A | 11/1994 | Watkins |
| 5,451,317 A | 9/1995 | Ishida |
| 5,494,577 A | 2/1996 | Rekers |
| 5,505,841 A | 4/1996 | Pirbazari et al. |
| 5,545,320 A | 8/1996 | Heine et al. |
| 5,552,022 A | 9/1996 | Wilson |
| 5,553,456 A | 9/1996 | McCormack |
| 5,626,752 A | 5/1997 | Mohn et al. |
| 5,632,890 A * | 5/1997 | Sugimoto ................ 210/167.11 |
| 5,650,050 A | 7/1997 | Kaufmann |
| 5,914,041 A | 6/1999 | Chancellor |
| 5,916,441 A | 6/1999 | Raether |
| 5,919,376 A | 7/1999 | Carman |
| 5,932,074 A | 8/1999 | Hoiss |
| 6,010,475 A | 1/2000 | Thomas et al. |
| 6,027,649 A | 2/2000 | Benedek et al. |
| 6,083,382 A | 7/2000 | Bird |
| 6,103,125 A | 8/2000 | Kuepper |
| 6,180,012 B1 | 1/2001 | Rongved |
| 6,187,200 B1 | 2/2001 | Yamamura et al. |
| 6,217,782 B1 | 4/2001 | Tuori |
| 6,221,255 B1 | 4/2001 | Vadoothker |
| 6,251,271 B1 | 6/2001 | Hagqvist |
| 6,348,148 B1 | 2/2002 | Bosley |
| 6,391,162 B1 | 5/2002 | Kamiya et al. |
| 6,406,622 B1 | 6/2002 | Tsuihiji |
| 6,475,460 B1 | 11/2002 | Max |
| 6,485,644 B2 | 11/2002 | Bowler |
| 6,656,352 B2 | 12/2003 | Bosley |
| 6,663,750 B1 | 12/2003 | Coon |
| 6,767,471 B2 | 7/2004 | Max |
| 6,800,201 B2 | 10/2004 | Bosley |
| 6,890,444 B1 | 5/2005 | Max |
| 6,955,222 B2 | 10/2005 | Lien |
| 6,969,467 B1 | 11/2005 | Max et al. |
| 6,991,722 B2 | 1/2006 | Max |
| 7,008,540 B1 | 3/2006 | Weavers |
| 7,023,104 B2 | 4/2006 | Koashikawa et al. |
| 7,067,044 B1 | 6/2006 | Coon |
| 7,081,205 B2 | 7/2006 | Gordon |
| 7,135,114 B2 | 11/2006 | Nonninger |
| 7,144,511 B2 | 12/2006 | Vuong |
| 7,192,522 B2 | 3/2007 | Grangeon |
| 7,294,274 B2 | 11/2007 | Kirker |
| 7,371,322 B2 | 5/2008 | Kirker |
| 7,381,335 B2 | 6/2008 | Lee |
| 7,422,689 B2 | 9/2008 | Noguchi |
| 7,425,265 B2 | 9/2008 | Schoendorfer |
| 7,445,716 B2 | 11/2008 | Quintel |
| 2002/0003111 A1 | 1/2002 | Max |
| 2002/0038782 A1 * | 4/2002 | Kim et al. .................... 210/231 |
| 2002/0134724 A1 | 9/2002 | Heine et al. |
| 2002/0189987 A1 | 12/2002 | Wagner |
| 2003/0052054 A1 | 3/2003 | Pearl et al. |
| 2003/0111402 A1 | 6/2003 | Baig et al. |
| 2003/0141250 A1 | 7/2003 | Kihara et al. |
| 2003/0173282 A1 | 9/2003 | Yamanaka et al. |
| 2004/0007881 A1 | 1/2004 | Kobashikawa et al. |
| 2004/0084156 A1 | 5/2004 | Hata |
| 2004/0108272 A1 | 6/2004 | Bosley |
| 2005/0082214 A1 | 4/2005 | Max |
| 2005/0123727 A1 | 6/2005 | Hester et al. |
| 2005/0218074 A1 | 10/2005 | Pollock |
| 2006/0144789 A1 | 7/2006 | Cath et al. |
| 2008/0190849 A1 | 8/2008 | Vuong |

FOREIGN PATENT DOCUMENTS

| | | |
|---|---|---|
| DE | 04036658 A1 | 1/1992 |
| DE | 04107099 A1 | 9/1992 |
| DE | 19508821 A1 | 3/1995 |
| DE | 19734981 A1 | 8/1997 |
| DE | 19801174 A1 | 7/1999 |
| DE | 102004010017 | 9/2005 |
| DE | 102006002314 | 3/2007 |
| EP | 0593687 B1 | 5/1997 |
| EP | 0968755 A3 | 1/2000 |
| EP | 1350766 A1 | 5/2000 |
| EP | 0970018 B1 | 7/2001 |
| GB | 1135132 A | 11/1968 |
| GB | 1141138 A | 1/1969 |
| GB | 1148295 A | 4/1969 |
| GB | 1390418 A | 4/1975 |
| GB | 1441014 A | 6/1976 |
| GB | 02256377 A | 12/1992 |
| JP | 54116382 | 9/1979 |
| JP | 55073387 | 6/1980 |
| JP | 58098182 | 6/1983 |
| JP | 58124579 | 7/1983 |
| JP | 58124584 | 7/1983 |
| JP | 59059284 | 4/1984 |
| JP | 59066391 | 4/1984 |
| JP | 59127690 | 7/1984 |
| JP | 59177189 | 10/1984 |
| JP | 60034785 | 2/1985 |
| JP | 08168653 | 7/1996 |
| JP | 09085243 | 3/1997 |
| JP | 09123997 | 5/1997 |
| JP | 01017838 | 1/2001 |
| JP | 02204911 | 7/2002 |
| JP | 02254066 | 9/2002 |
| JP | 04098065 | 4/2004 |
| JP | 04160301 | 6/2004 |
| JP | 04283798 | 10/2004 |
| JP | 04290945 | 10/2004 |
| JP | 05052802 | 3/2005 |
| SU | 422425 A1 | 4/1974 |
| SU | 2119377 C1 | 9/1988 |
| WO | WO 85/04159 A1 | 9/1985 |

(56) References Cited

FOREIGN PATENT DOCUMENTS

| WO | WO 93/10048 A1 | 5/1993 |
|---|---|---|
| WO | WO 96/23567 A1 | 8/1996 |
| WO | WO 96/36564 A1 | 11/1996 |
| WO | WO 98/57732 | 12/1998 |
| WO | WO 00/41971 | 7/2000 |
| WO | WO 01/46007 A1 | 6/2001 |
| WO | WO 01/74721 A3 | 10/2001 |
| WO | WO 02/20410 A1 | 3/2002 |
| WO | WO 2004/007953 A1 | 1/2004 |
| WO | WO 2004/074187 | 9/2004 |
| WO | WO/2005/044733 | 5/2005 |
| WO | WO/2005/068371 | 7/2005 |
| WO | WO/2006/006942 | 1/2006 |
| WO | WO/2010/003141 | 1/2010 |

OTHER PUBLICATIONS

Pleass, "The use of wave powered systems for desalination—A new opportunity (seawater pumping for reverse osmosis)", International Symposium on Wave and Tidal Energy, Canterbury, England, Sep. 27-29, 1978.

Zewen et al., "The Kuwait solar thermal power station: operational experiences with the station and the agricultural application", Solar World Congress, vol. 3, pp. 1527-1532, 1983.

Negus-De Wys, "Properties of geopressured brines and wells in the Gulf Coast and opportunities for industrial/research participation", Conference: US Department of Energy research and development for the geothermal marketplace: 7th geothermal program review, San Francisco, CA, USA, Mar. 21-23, 1989.

Boehner, "Solar Desalination with a High Efficiency Multi Effect Process Offers New Facilities.", Desalination, vol. 3, No. 1/3, p. 197-203, Nov. 1989.

Reali et al., "Energy-efficient schemes for seawater desalination", Desalination 105 (1996), p. 171.

Reali et al., "Submarine and underground reverse osmosis schemes for energy-efficient seawater desalination", Desalination 109 (1997), pp. 269-275.

"Physical Treatments: Desalination by Hydrostatic Pressure", Water Technology News, vol. 5, No. 6, Sep. 1, 1997.

Pacenti et al., "Submarine seawater reverse osmosis desalination system", Desalination 126 (1999), pp. 213-218.

Colombo et al., "An energy-efficient submarine desalination plant", Desalination 122 (1999), pp. 171-176.

Tian, "Simple and safe deep pool reactor for low-temperature heat supply", Prog. Nucl. Energy, vol. 37, No. 1-4; pp. 271-610, 2000.

Sawyer et al., "An investigation into the economic feasibility of unsteady incompressible duct flow (waterhammer) to create hydrostatic pressure for seawater desalination using reverse osmosis" Desalination 138 (2001), pp. 307-317.

Pacenti et al., "Deployment of a submarine reverse osmosis desalination prototype plant (RODSS): field tests and preliminary technical evaluations", Desalination 138 (2001), p. 181.

Paulsen et al., "Introduction of a new Energy Recovery System—optimized for the combination with renewable energy", Desalination 184 (2005), pp. 211-215.

Al-Kharabsheh, S., "An innovative reverse osmosis desalination system using hydrostatic pressure", Desalination 196 (2006), pp. 210-214.

Bates, "Improvements in Spiral Wound RO and NF Membrane & Element Construction for High Fouling Feed Water Applications", pp. 1-8.

Shimizu et al., "Filtration characteristics of hollow fiber microfiltration membranes used in membrane bioreactor for domestic wastewater treatment", Water Research vol. 30, Issue 10 (Oct. 1996), pp. 2385-2392.

Djebedjian et al., Reverse Osmosis Desalination Plant in Nuweiba City (Case Study), Eleventh International Water Technology Conference, IWTCC11 Sharm El-Sheikh, Egypt (2007), pp. 315-330.

Chang et al., "Membrane Fouling in Membrane Bioreactors for Wastewater Treatment", Journal of Environmental Engineering, vol. 128, Issue 11 (Nov. 2002), pp. 1018-1029.

Zhu et al., "Modeling of ultrasonic enhancement on membrane distillation", Journal of Membrane Science, vol. 136, Issue 1 (Aug. 2000), pp. 31-41.

International Search Report and Written Opinion issued on Jun. 13, 2011 for International Application No. PCT/US2011/023637.

Dow Water Solutions FILMTEC™ Reverse Osmosis Membranes Technical Manual, Form No. 609-00071-0308, publication date unknown, pp. 1-180.

Wastewater Engineering Treatment and Reuse, Fourth Ed., Metcalf & Eddy, Inc., 2002, pp. 1114-1126.

Dytnersky, Yu I., Baromembrane Processes, Moskva, Khimiya, 1986, p. 38, 75.

Karelin, F.N., Water Demineralization by Reverse Osmosis, Moskva, Stroyizdat, 1988, p. 137.

International Search Report; PCT/US2012/044456; Mailing Date: Oct. 4, 2012, 8 pages.

\* cited by examiner

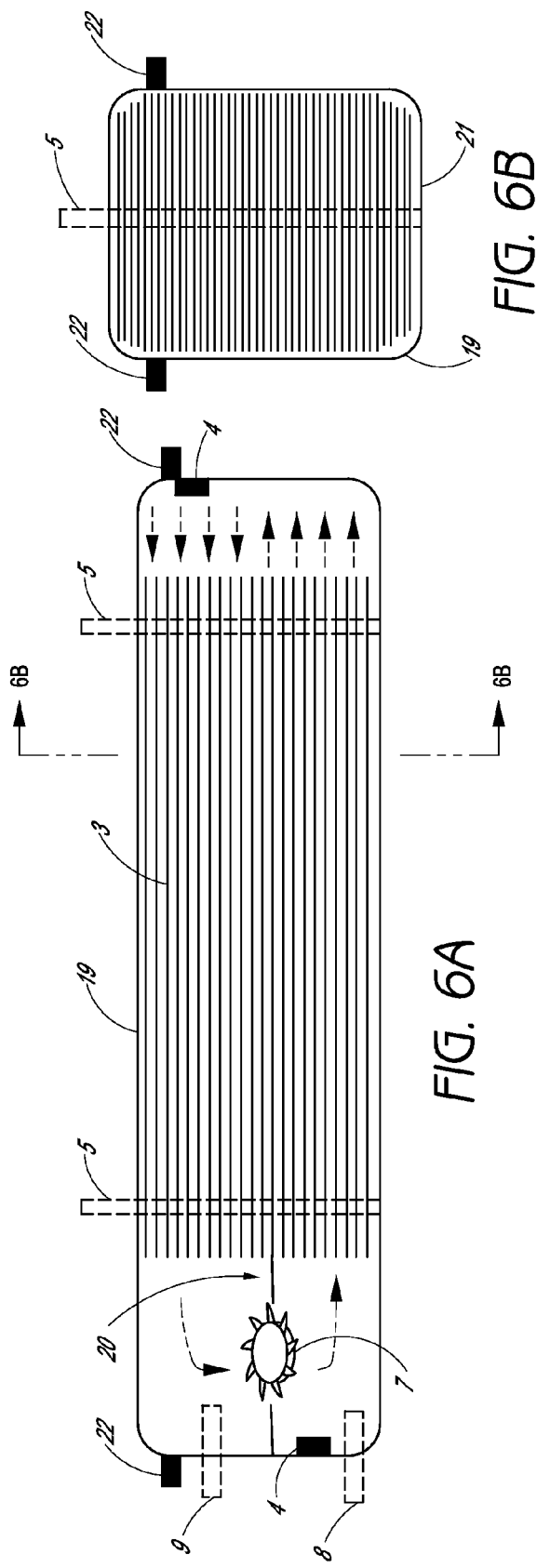

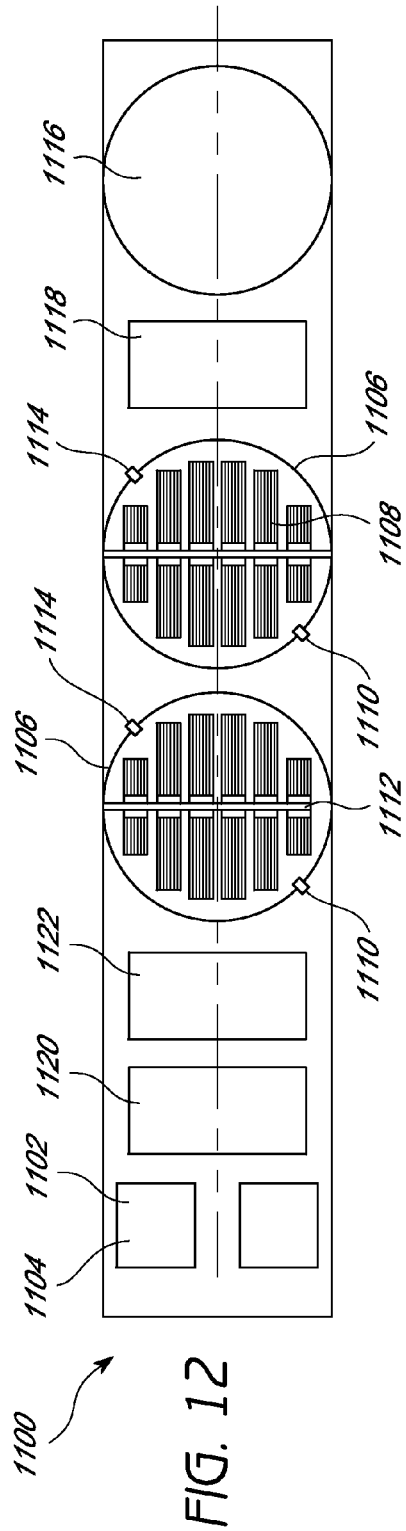
FIG. 12
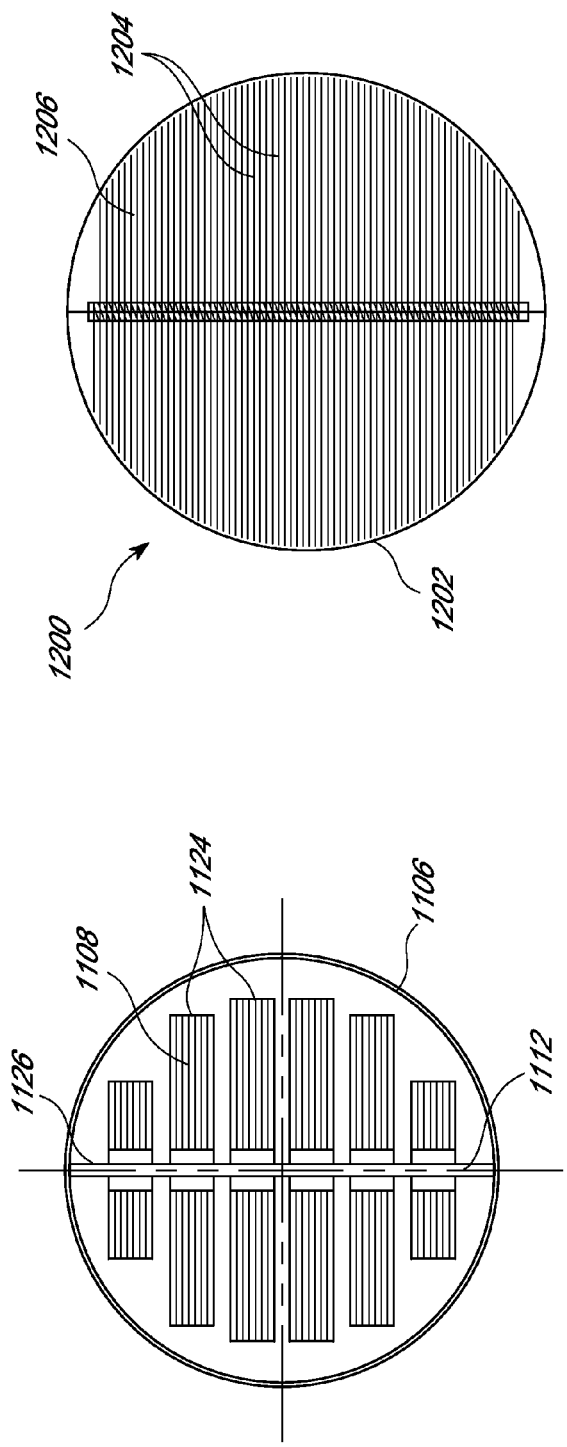
FIG. 14A
FIG. 13

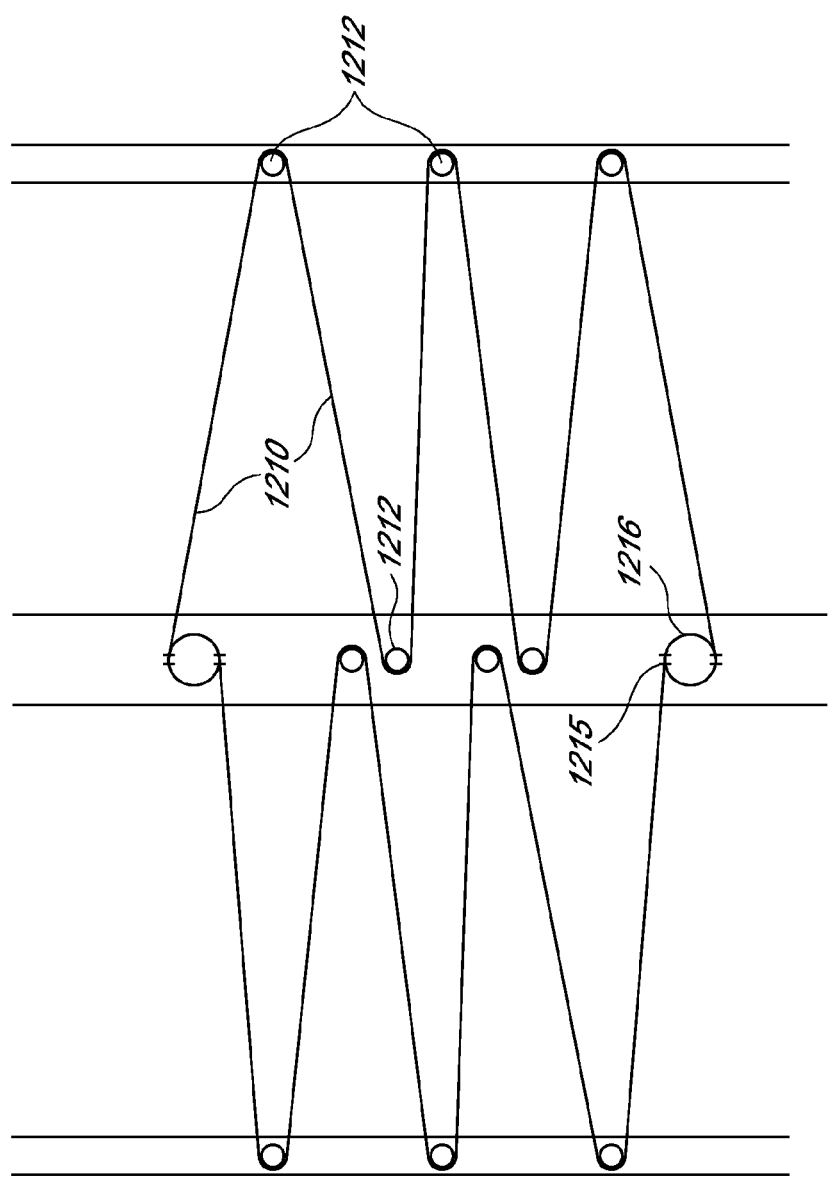
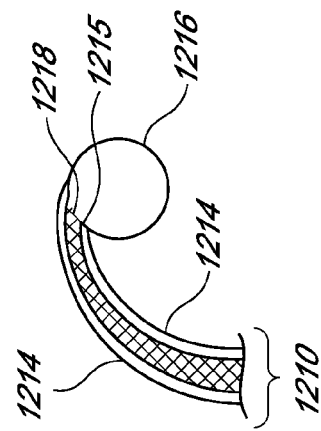
FIG. 14B
FIG. 14C

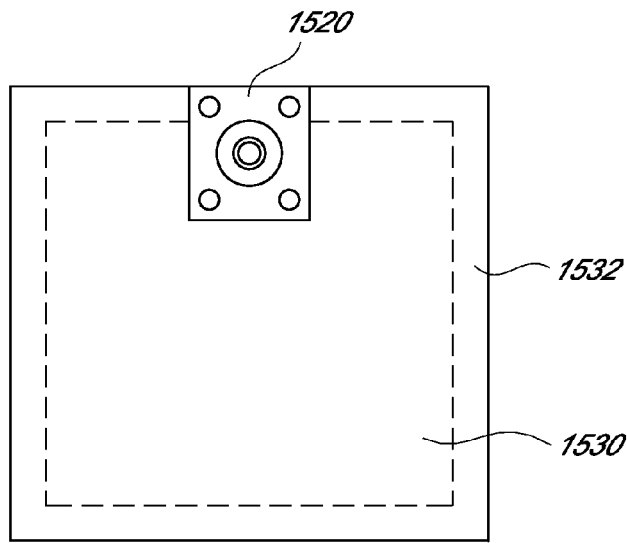
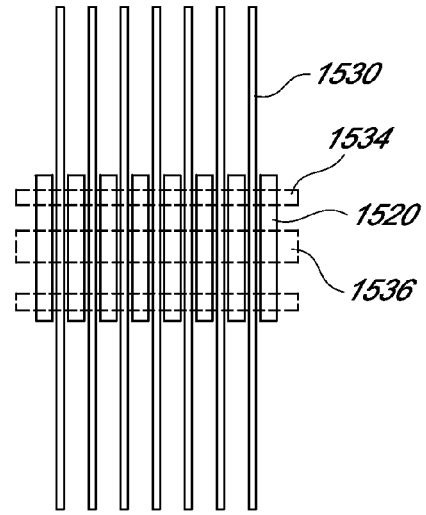
FIG. 19    FIG. 20
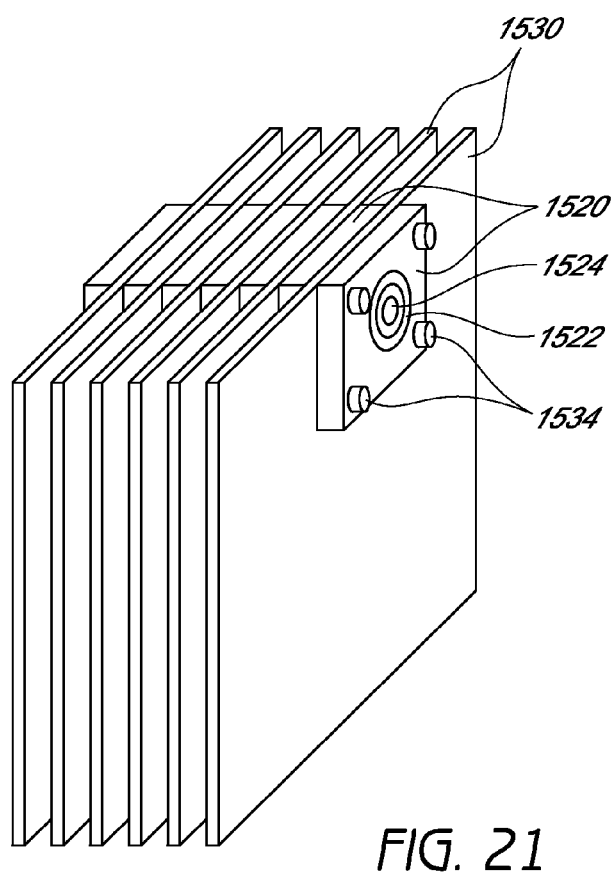
FIG. 21

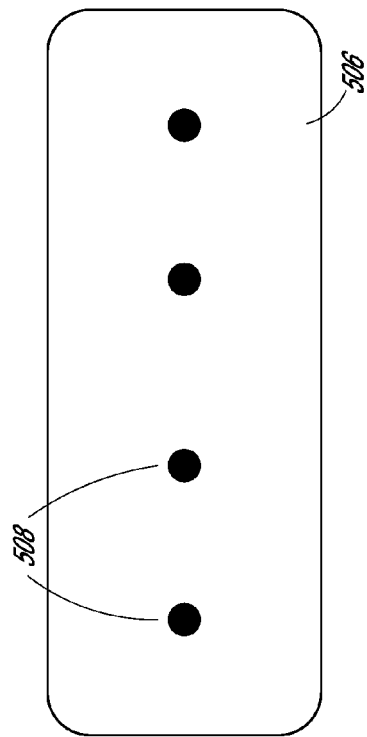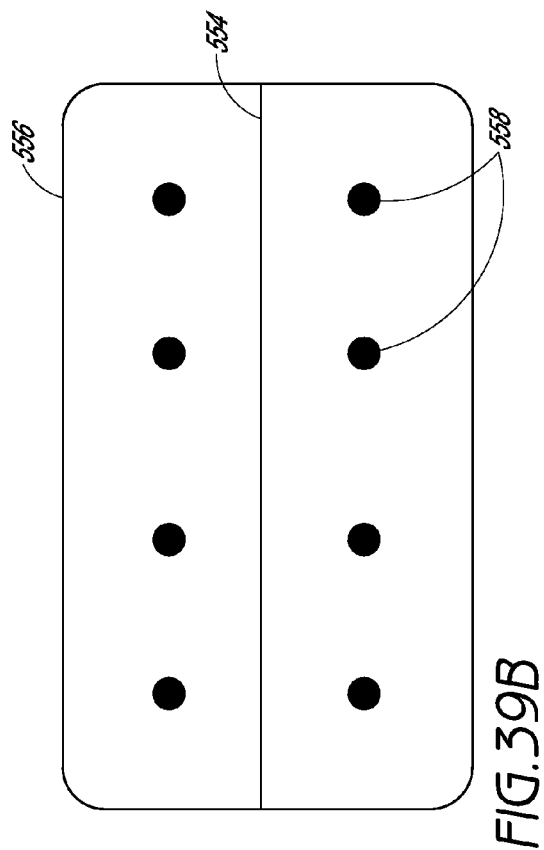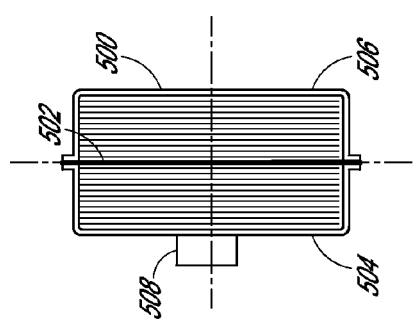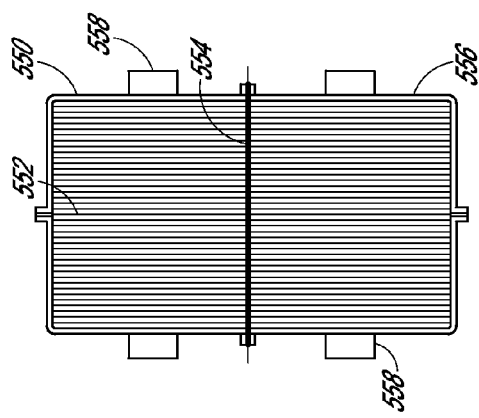

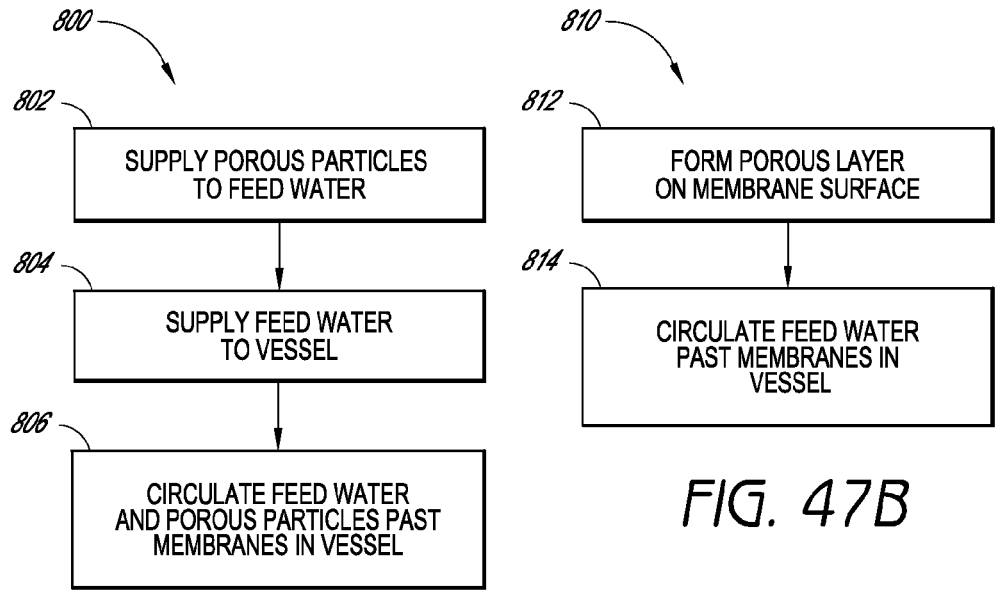
FIG. 47A
FIG. 47B
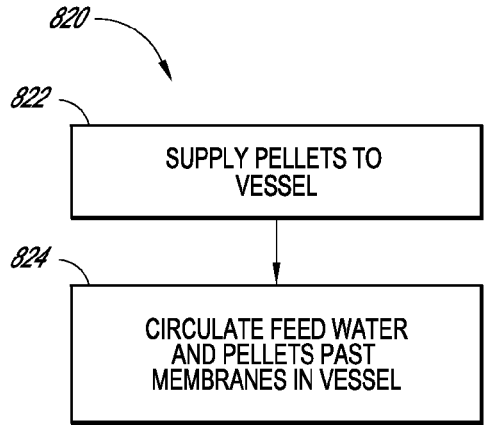
FIG. 47C

WATER TREATMENT SYSTEMS AND METHODS

CROSS-REFERENCE TO RELATED APPLICATIONS

This application claims the benefit of U.S. Provisional Application No. 61/301,357, filed Feb. 4, 2010, and U.S. Provisional Application No. 61/387,347, filed Sep. 28, 2010. The disclosures of the above-referenced applications are hereby expressly incorporated by reference in their entireties.

BACKGROUND OF THE INVENTION

1. Field of the Invention

This application relates to the field of water and waste water treatment. More particularly, this application relates to a membrane system for treating water and waste water.

2. Description of the Related Art

While there are many methods to remove impurities from water, membrane treatment is becoming far more common as technologies improve and water sources become more contaminated. Membrane treatment entails providing a pressure differential across a semi-permeable membrane. The differential allows relatively smaller water molecules to flow across the membrane while relatively larger contaminants remain on the high pressure side. As long as the contaminants are larger than the pores in the membrane, they can be effectively filtered out by the membrane and removed with the concentrate.

Different membranes can be used for different raw water sources and treatment goals. Classifications of membranes generally fall into four broad categories, generally defined by the size of contaminants screened out by the membrane. This size can loosely be correlated to the pore size in the membrane. The four broad categories of membranes are, in decreasing order of the size of materials screened, microfiltration (MF) membranes (which are capable of screening materials with atomic weights between about 80,000 and about 10,000,000 Daltons); ultrafiltration (UF) membranes (which are capable of screening materials with atomic weights between about 5,000 and about 400,000 Daltons); nanofiltration (NF) membranes (which are capable of screening materials with atomic weights between about 180 and about 15,000 Daltons); and reverse osmosis (RO) membranes (which are capable of screening materials with atomic weights between about 30 and about 700 Daltons).

MF and UF membrane systems are typically operated under positive pressures of, for example, 3 to 40 psi, or under negative (vacuum) pressures of, for example, −3 to −12 psi, and can be used to remove particulates and microbes. MF and UF membranes may be referred to as "low-pressure membranes." NF and RO membranes, in contrast, are typically operated at higher pressures than MF and UF membrane systems, and can be used to remove dissolved solids, including both inorganic and organic compounds, from aqueous solutions. NF and RO membranes may be referred to as "osmotic membranes." Osmotic membranes are generally charged, adding to their ability to reject contaminants based not only on pore size but also on the repulsion of oppositely-charged contaminants such as many common dissolved solids. Reverse osmosis (RO), nanofiltration (NF) and, to some extent, ultrafiltration (UF) membranes can be used in cross-flow filtration systems which operate in continuous processes (as opposed to batch processes) at less than 100% recovery.

RO and NF membranes can be composed of a thin film of polyamide deposited on sheets of polysulfone substrate. One common form of RO or NF membrane is a thin film composite flat sheet membrane that is wound tightly into a spiral configuration. UF membranes are more commonly provided as hollow fiber membranes, but can also be used in spiral wound elements. The spiral elements make efficient use of the volume in a pressure vessel by tightly fitting a large area of membrane into a small space. A spiral element typically consists of leaves of back to back flat sheet membranes adjoining a perforated tube. Between the back to back membranes of each leaf is a permeate carrier sheet that conveys the treated water around the spiral to the central perforated collection tube. A feed water spacer is wound into the spiral to separate adjacent leaves. After the leaves are wound against each other they are as close together as 0.5 to 0.8 millimeters (about the thickness of the physical feed (raw water) spacer that is rolled up with the membrane leaves). The feed water spacer maintains an adequate channel between the membrane layers so that pressurized feed water can flow between them.

Feed channel spacers typically consist of a netting of cylindrical fibers. These fibers impede the flow of the water down the channel, creating "dead spaces" of little or no water movement both upstream and downstream of the feed spacer fibers. FIG. 7 shows a longitudinal cross section of one such feed channel (taken perpendicular to the direction of winding). The flow direction 29 is indicated by the arrow in FIG. 7. In the dead spaces 30 upstream and downstream of the cylindrical fibers 23, small particles 25 and bacteria settle and accumulate. The dead spots 30 are regions with virtually no flow velocity and represent perfect conditions for particles 25 to settle and for bacteria to colonize. Particle settlement 25 in these dead spots fouls the membrane. Over time, as the particles accumulate and biological organisms reproduce, this fouling can stop the longitudinal flow 29 of water in the inter-membrane spaces and can slow the penetration of permeate through the membrane 24.

Fouling is the single greatest maintenance issue associated with membrane water treatment. Fouling occurs when contaminants in the water adhere to the membrane surfaces and/or lodge into the membrane pores. Fouling creates a pressure loss in the treatment process, increasing energy costs and reducing system capacity. Numerous cleaning methods have been developed to de-foul membranes but they are complex, require significant downtime and often do not fully restore the flux of the membranes.

SUMMARY OF THE INVENTION

Embodiments of the invention provide water treatment systems and methods that minimize membrane fouling and the required maintenance that results therefrom. Embodiments of the invention also significantly reduce cost and complexity of membrane separation systems. In some embodiments, a unique membrane configuration is situated in a pressure tank. In some embodiments, planar membrane elements can be spaced apart from one another by a sufficient distance as to keep them from touching each other without the use of a conventional feed water spacer sheet. In some embodiments, antifouling particles are added to the feed water to adsorb and/or absorb contaminant particles and inhibit membrane fouling. In some embodiments, pellets are suspended in the pressure tank with the feed water, to dislodge particles which may have settled on the membrane surfaces. In some embodiments, the pressure tank is subjected to a vibration system to reduce or prevent settlement of and/or suspend contaminants on the membrane surfaces. In some embodiments, an in-vessel re-circulatory system is provided to increase the velocity of the feed solution so as to reduce particulate settlement. Baffling can be provided in the vessel to direct the feed water around the interior of the vessel. The high cross-flow velocity of some embodiments can serve to mitigate particle settlement and membrane fouling. Embodiments of the invention can dramatically reduce membrane maintenance requirements and provide a system that can accommodate a greater variety of feed water qualities with a vast reduction in pre-treatment requirements.

In a first aspect, a method of treating a liquid containing membrane foulants is provided. The method comprises adding antifouling particles to the liquid, the antifouling particles having a specific surface area of 10 m$^2$/g or more, supplying the liquid to a pressure vessel, the pressure vessel having an inlet, a permeate outlet, and a plurality of osmotic membrane elements disposed within the pressure vessel, applying a pressure differential across the osmotic membrane elements, circulating the liquid and the antifouling particles past the osmotic membrane elements in the pressure vessel, and collecting permeate from the permeate outlet. The antifouling particles can be configured to adsorb at least some of the membrane foulants while allowing passage of permeate through the membrane elements. The antifouling particles can be configured to adsorb membrane foulants comprises suspended and/or dissolved particles. At least one of the osmotic membrane elements can comprise a reverse osmosis membrane. At least one of the osmotic membrane elements can comprise a nanofiltration membrane. The liquid can be circulated at a cross-flow velocity between 0.5 feet per second and 10 feet per second. The liquid can be circulated at a cross-flow velocity between 1 foot per second and 2 feet per second. The pressure vessel can be pressurized to an operating pressure of from 15 psi to 250 psi. The antifouling particles can have a specific surface area of 30 m$^2$/g or more. The antifouling particles can have a specific surface area of 300 m$^2$/g or more. The antifouling particles can have a minimum major dimension of 0.5 microns or more. The antifouling particles can have a minimum major dimension of 1.0 micron or more. The antifouling particles can be configured to adsorb membrane foulants having a diameter of 1 micron or less. The antifouling particles can comprise diatomaceous earth. The antifouling particles comprise activated carbon. The antifouling particles can be added to the liquid during treatment. The antifouling particles can be added to the liquid continuously during treatment. The antifouling particles can be added so as to have a concentration of between 1 and 20 mg/L of liquid in the pressure vessel. The liquid can be primary effluent from a wastewater primary treatment process. The primary effluent can be supplied to the pressure vessel from the wastewater primary treatment process without any intervening biological treatment process. In an embodiment, the method further comprises adding pellets to the pressure vessel. The pellets can be configured to dislodge at least some of the membrane foulants and/or at least some of the antifouling particles from the osmotic membrane elements as the pellets circulate in the pressure vessel. The pellets can have a cylindrical shape. The pellets can have an oblong shape. The pellets can have a maximum major dimension between 0.1 mm and 2.0 mm. Each osmotic membrane element can be spaced apart from an immediately adjacent osmotic membrane element by a spacing of from about 2 mm to about 8 mm. The pellets can have a maximum major dimension which can be less than or equal to half of the spacing. The pellets can be added so as to have a concentration of between about 0.5% and about 10% of the volume of the liquid in the pressure vessel. In an embodiment, the vessel further comprises a concentrate outlet.

In a second aspect, a system for treating liquid comprising membrane foulants is provided. The system comprises a pressure vessel configured to hold a volume of the liquid and having an inlet and a permeate outlet, a plurality of osmotic membrane elements disposed within the pressure vessel, a circulator configured to circulate the liquid in the vessel in a direction generally parallel to the active surfaces of the membrane elements, and an antifouling apparatus configured to deliver a supply of antifouling particles to the liquid, the antifouling particles having a specific surface can be a of 10 m$^2$/g or more. The antifouling apparatus can be configured to deliver the antifouling particles at a controlled rate. The antifouling particles can have a specific surface area of 30 m$^2$/g or more. The antifouling particles can have a specific surface area of 500 m$^2$/g or more. The antifouling particles can have a major dimension of 0.5 microns or more. The antifouling particles can have a major dimension of 1.0 micron or more. The antifouling particles can be configured to adsorb membrane foulants having a diameter of 1 micron or less. The antifouling particles can comprise diatomaceous earth. The antifouling particles can comprise activated carbon. Each membrane element can be spaced apart from an immediately adjacent membrane element by between about 2 mm and about 8 mm. Each membrane element can be spaced apart from an immediately adjacent membrane element by at least 3 mm. In an embodiment, the system further comprises a supply of pellets configured to inhibit the buildup of membrane foulants on the membrane elements. A volume of the pellets can be between about 0.5% and about 10% of the volume of the liquid. The pellets can have a density greater than about 1.0 g/mL. The pellets can have nonspherical shape. Each membrane element can be spaced apart from an immediately adjacent membrane element by a spacing between about 2 mm and about 8 mm, and the pellets can have a major dimension which is less than or equal to about half the spacing.

In a third aspect, a system for treating liquid comprising membrane foulants is provided. The system comprises means for holding the liquid, means for pressurizing the liquid in the holding means, means for separating the liquid into a permeate component and a retentate component at least when the liquid can be sufficiently pressurized, the permeate component containing a lower concentration of dissolved constituents than the retentate component, means for circulating the liquid past the separating means, and means for inhibiting the buildup of membrane foulants on the separating means. The inhibiting means can comprise antifouling particles suspended in the liquid. The inhibiting means can comprise pellets suspended in the liquid.

In a fourth aspect, a method of treating municipal or industrial wastewater comprising suspended and dissolved solids is provided. The method comprises subjecting the wastewater to a primary treatment process to remove at least some suspended solids and produce a primary effluent comprises dissolved inorganic and organic compounds, subjecting the primary effluent to an osmotic treatment process to remove at least some biological constituents, at least some particulate constituents, and at least some dissolved constituents from the primary effluent to produce a permeate of sufficient quality for at least indirect potable water standards for reuse applications. The osmotic treatment process can comprise supplying the primary effluent to a pressure vessel, the pressure vessel having a plurality of osmotic membrane elements disposed inside the pressure vessel, each membrane element having a substantially planar configuration, each membrane element spaced apart from an immediately adjacent membrane element by at least 1 millimeter, each membrane element having a feed water side and a permeate side. The method further comprises exposing the feed water side to a vessel pressure sufficient to drive a filtration process across the osmotic membrane elements from the feed water side to the permeate side, and generating cross-flow of feed water in the pressure vessel in a direction generally parallel to the planar configuration of the membrane elements. The primary effluent can be subjected to the osmotic treatment process without any intervening biological treatment process. In an embodiment, subjecting the primary effluent to the osmotic treatment process removes substantially all biological and particulate constituents from the primary effluent. In an embodiment, subjecting the primary effluent to the osmotic treatment process removes at least 10% of monovalent dissolved constituents from the primary effluent. In an embodiment, subjecting the primary effluent to the osmotic treatment process removes at least 30% of monovalent dissolved constituents from the primary effluent. In another embodiment, subjecting the primary effluent to the osmotic treatment process removes at least 60% of multivalent dissolved constituents from the primary effluent. In another embodiment, subjecting the primary effluent to the osmotic treatment process removes at least 80% of multivalent dissolved constituents from the primary effluent. A cross-flow velocity of the feed water in the pressure vessel can be between about 0.5 feet per second and about 10.0 feet per second. A cross-flow velocity of the feed water in the pressure vessel can be between about 2.0 feet per second and about 3.0 feet per second. The vessel pressure can be between about 30 psi and about 75 psi. The osmotic treatment process can be operated at a recovery rate of between about 20% and 95%. The osmotic treatment process can be operated at a recovery rate of between about 30% and 80%. The membrane elements can extend in a generally vertical direction. Each membrane element can be spaced apart from an immediately adjacent membrane element without the presence of a conventional feed water spacer disposed between the elements. Each membrane element can be spaced apart from an immediately adjacent membrane element by between about 1 millimeter and about 12 millimeters. Each membrane element can be spaced apart from an immediately adjacent membrane element by about 3 millimeters. Each of the osmotic membrane elements can comprise two osmotic membranes spaced apart by a permeate spacer. The osmotic membrane elements can comprise nanofiltration membranes. The osmotic membrane elements can comprise reverse osmosis membranes. Generating cross-flow can comprise rotating an impeller disposed inside the pressure vessel. In an embodiment, the method further comprises recirculating feed water in the pressure vessel so as to create at least bidirectional flow in the pressure vessel. The pressure vessel can further comprise a baffle configured to direct flow of feed water recirculating in the pressure vessel. In an embodiment, the method further comprises delivering ultrasonic vibration to the feed water inside the pressure vessel. The ultrasonic vibration can be delivered continuously or intermittently. In an embodiment, the method further comprises delivering sonic vibration to the feed water inside the pressure vessel. The sonic vibration can be delivered continuously or intermittently. In an embodiment, the method further comprises supplying the permeate to a follow-on treatment process. The follow-on treatment process can comprise an osmotic membrane process. In an embodiment, the method further comprises collecting permeate outside the pressure vessel. In an embodiment, the method further comprises supplying concentrate from the osmotic treatment process to a follow-on treatment process to produce a secondary effluent. The follow-on treatment process can include an activated sludge process and a secondary clarification or membrane bioreactor process. In an embodiment, the method further comprises supplying the secondary effluent to a second osmotic treatment process. The second osmotic treatment process can comprise supplying the secondary effluent to a second pressure vessel, the second pressure vessel having a second plurality of osmotic membrane elements disposed inside the second pressure vessel, each membrane element having a substantially planar configuration, each membrane element spaced apart from an immediately adjacent membrane element by at least 1 millimeter, each membrane element having a feed water side and a permeate side, exposing the feed water side to a vessel pressure sufficient to drive a filtration process across the osmotic membrane elements from the feed water side to the permeate side, and generating cross-flow of feed water in the pressure vessel in a direction generally parallel to the planar configuration of the membrane elements. In an embodiment, the method further comprises supplying concentrate from the second osmotic treatment process to the follow-on treatment process.

In another aspect, a system for separating contaminants from feed water is provided. The system comprises a pressure vessel for holding feed water to be treated, the pressure vessel having an occupied region and at least one open region, a plurality of spaced-apart membrane elements disposed inside the pressure vessel in the occupied region, each membrane element having a feed water side and a permeate side, the permeate side being exposed to atmospheric pressure, the feed water side being exposed to a vessel pressure sufficient to drive a filtration process across the membrane elements, a permeate collection tube sealed from the feed water side and in fluid communication with the permeate side of the membrane elements, and an circulator disposed inside the pressure vessel, the circulator being configured to generate circulation of the feed water through the occupied region and the at least one open region of the pressure vessel. In an embodiment, the system further comprises at least one baffle disposed inside the pressure vessel, the baffle configured to direct feed water circulating through the occupied region and the at least one open region of the pressure vessel. The circulator can be an impeller. The circulator and the at least one baffle can cooperate to direct flow in a first direction in a first portion of the occupied region and in a second direction in a second portion of the occupied region, the second direction being opposite the first direction. The system can further comprise a vibration system configured to produce vibration waves in the feed water. The vibration system can be configured to deliver vibration waves directly to the feed water. The vibration system can be configured to deliver vibration waves to a wall of the pressure vessel. The vibration system can be configured to produce vibration waves having a frequency of greater than about 15 kHz. The vibration system can be configured to produce vibration waves having a frequency of greater than about 20 kHz. The vibration system can be configured to produce vibration waves at both sonic and ultrasonic frequencies. The vibration system can be configured to produce the ultrasonic waves intermittently at a first interval and the sonic waves intermittently at a second interval. The second interval can be shorter than the first interval. The membrane elements can comprise reverse osmosis (RO) membranes, nanofiltration (NF) membranes, ultrafiltration (UF) membranes, microfiltration (MF) membranes, or other types of membranes. Adjacent membrane elements can be spaced apart by at least 1 millimeter, at least 2 millimeters, at least 3 millimeters, at least 4 millimeters, or any other suitable distance. The membrane elements can be substantially planar. The membrane elements can be oriented vertically inside the pressure vessel.

In another aspect, a method of separating contaminants from feed water is provided. The method comprises supplying feed water to a pressure vessel, the pressure vessel comprises a plurality of spaced-apart membrane elements disposed inside the pressure vessel, each membrane element having a feed water side and a permeate side, exposing the permeate side to atmospheric pressure, exposing the feed water side to a vessel pressure sufficient to drive a filtration process across the membrane elements, and recirculating the feed water inside the pressure vessel. Recirculating the feed water can comprise rotating an impeller disposed inside the pressure vessel. The pressure vessel can further comprise a baffle configured to direct flow of feed water recirculating in the pressure vessel. The method can further comprise delivering ultrasonic vibration to the feed water. The ultrasonic vibration can be delivered continuously or intermittently. The method can further comprise delivering sonic vibration to the feed water. The sonic vibration can be delivered continuously or intermittently. The ultrasonic vibration can be delivered intermittently at a first interval. The sonic vibration can be delivered intermittently at a second interval, the second interval being shorter than the first interval. The method can further comprise collecting permeate outside the pressure vessel.

In another aspect, a water treatment system comprises a pressure vessel for holding feed water to be treated. The pressure vessel can comprise a first chamber having a first plurality of spaced-apart membrane elements disposed in an interior of the first chamber, each membrane element having a feed water side and a permeate side, the feed water side being exposed to the interior of the first chamber, the permeate side being exposed to atmospheric pressure, a second chamber having a second plurality of spaced-apart membrane elements disposed in an interior of the second chamber, each membrane element having a feed water side and a permeate side, the feed water side being exposed to the interior of the second chamber, the permeate side being exposed to atmospheric pressure, a sealing member configured to releasably seal the first chamber and the second chamber together, wherein when sealed, the interior of the first chamber and the interior of the second chamber can be in fluid communication, and wherein when released, the second chamber can be separable from the first chamber, and a third chamber having an circulator disposed in an interior of the third chamber, the interior of the third chamber being in fluid communication with the interior of the first and second chambers at least when the sealing member can be sealed, the circulator being configured to generate circulation of the feed water through the first and second chambers at least when the sealing member can be sealed. A cross-sectional area of the first chamber can be substantially equal to a cross-sectional area of the second chamber. A cross-sectional area of the second chamber can be substantially equal to a cross-sectional area of the third chamber. The system can further comprise a first permeate collection tube coupled to the first plurality of spaced-apart membrane elements and in fluid communication with the permeate side of the membrane elements of the first plurality of spaced-apart membrane elements. The system can further comprise a second permeate collection tube coupled to the second plurality of spaced-apart membrane elements and in fluid communication with the permeate side of the membrane elements of the second plurality of spaced-apart membrane elements. The system can further comprise a first vibration system coupled to the first chamber, the first vibration system configured to deliver vibration waves to the interior of the first chamber. The system can further comprise a second vibration system coupled to the second chamber, the second vibration system configured to deliver vibration waves to the interior of the second chamber. The first chamber can comprise a first baffle configured to define at least first and second flow paths through the interior of the first chamber. The second chamber can comprise a second baffle configured to define at least third and fourth flow paths through the interior of the second chamber. The first baffle can be configured to couple to the second baffle at least when the sealing member can be sealed so as to fluidly couple the first and third flow paths and the second and fourth flow paths, respectively. The third chamber can comprise a third baffle configured to direct flow toward and/or away from the circulator.

BRIEF DESCRIPTION OF THE DRAWINGS

FIG. 6A is a side view vertical cross section of a water treatment system according to an alternative embodiment.

FIG. 6B is an end view vertical cross section of the embodiment shown in FIG. 6A.

FIG. 6C is a plan view of the baffle and impeller shown in FIG. 6A.

FIG. 6D is a plan view of an alternative baffle that can be used in embodiments of the invention, for example the embodiment shown in FIG. 6A.

FIG. 12 is a schematic diagram illustrating a mobile treatment system according to an embodiment.

FIG. 13 is a schematic diagram better illustrating the configuration of membrane units in the embodiment shown in FIG. 12.

FIG. 14A is a schematic diagram illustrating an alternative configuration of membrane units in a pressure vessel, according to another embodiment.

FIG. 14B is a diagram illustrating membrane units woven around supports and attached to collection tubes, according to an embodiment.

FIG. 14C is a diagram illustrating a membrane unit attached to a collection tube.

FIG. 19 is a plan view of a membrane element, configured in accordance with an embodiment and shown with the gasketed spacer of FIG. 18 positioned on the element.

FIG. 20 is a top view of a membrane cartridge comprising a series of membrane elements spaced apart by gasketed spacers, in accordance with an embodiment.

FIG. 21 is a perspective view of the membrane cartridge illustrated in FIG. 20.

FIG. 39A shows an end view cross-section and a side view of a segmented vessel according to another embodiment.

FIG. 39B illustrates an end view cross-section and a side view of a segmented vessel according to a further embodiment.

FIGS. 47A-C are method diagrams illustrating various processes for treating water in accordance with some embodiments.

DETAILED DESCRIPTION OF THE PREFERRED EMBODIMENTS

Figure 1B:
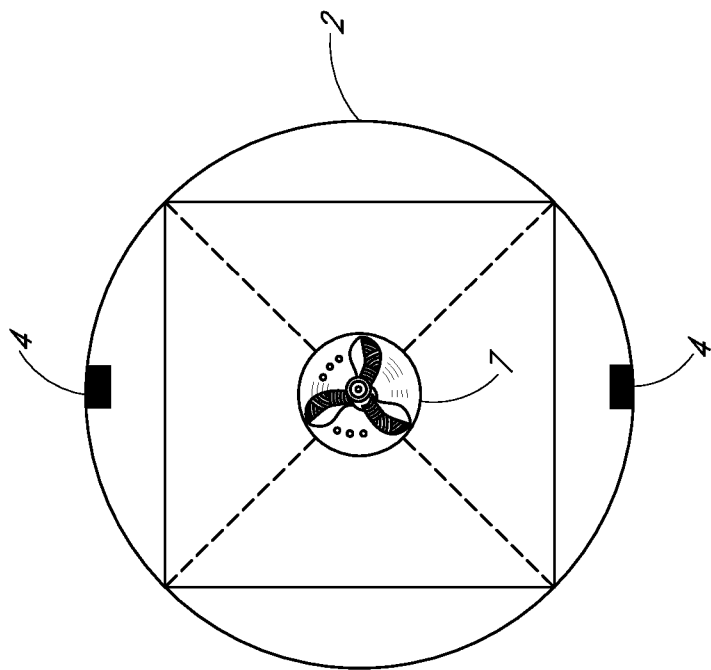
FIG. 1B shows the cross section of FIG. 1A with the membrane cartridge removed to better illustrate the baffle and impeller disposed within the pressure vessel.

The features, aspects and advantages of the present invention will now be described with reference to the drawings of several embodiments, which are intended to be within the scope of the invention herein disclosed. These and other embodiments will become readily apparent to those skilled in the art from the following detailed description of the embodiments having reference to the attached figures, the invention not being limited to any particular embodiment(s) disclosed.

Membrane-based water treatment processes often employ two or more filtration methods in stages to minimize membrane fouling in the later stage. As an example, a reclaimed water treatment system might include a microfiltration (MF) membrane treatment first stage and a reverse osmosis (RO) membrane second stage that receives product water from the first stage as input. Contaminants larger than the membrane pores can lodge in the pores and block the flow of water through the membrane in either stage. When this occurs the membrane is said to be fouled. Membrane fouling can be caused by particulates (e.g., silts, clays, etc.), biological organisms (e.g., algae, bacteria, etc.), dissolved organic compounds (e.g., natural organic matter), or precipitation of dissolved inorganic compounds (e.g., calcium, magnesium, manganese, etc.).

Membrane productivity can also decrease as dissolved solids increase in concentration in the feed water. An increase in concentration of dissolved solids near the membrane surface raises the osmotic pressure requirement. For a given feed pressure, this can result in a reduction in the effective driving pressure and a lower flux rate.

Another source of fouling is scaling, which can occur when dissolved solids increase in concentration to the point of precipitation. Scale formation can block the membrane and reduce productivity.

Membrane fouling requires higher pressure and more energy to maintain productivity of the membrane. In the two-stage system described above, the MF membranes of the first stage, which have relatively larger pores than the RO membranes of the second stage, can be cleaned by periodic backwashing, which involves forcing clean water back through the membranes in the opposite direction of the treatment process flow. This backwashing step takes the membrane system out of operation for the period of the backwash. Less frequent, but lengthier, cleaning processes can involve removal of the membrane elements from their containers and cleaning with chemicals and agitation.

The drawbacks to these cleaning systems are several. First, because the MF first stage does not screen out all potential foulants, the downstream RO stage often still requires significant maintenance. In addition, the MF backwashing stage requires expensive equipment such as automated valves and pumps. This stage also reduces system capacity as product water is used in the cleaning process. These processes require skilled operators to maintain complicated electronic systems and the chemicals used for cleaning require special containment and handling procedures. Embodiments of the present invention avoid membrane fouling, with simple systems that require very little maintenance.

In preferred embodiments, one or more membrane units are arranged in a pressure vessel configured to hold source water to be treated. The membrane units can be disposed in a spaced-apart configuration, such as, for example, a sufficiently spaced configuration to limit or prevent attraction between adjacent membrane units and/or collapse of adjacent membrane units upon each other. Each membrane unit has a feed water side and a permeate side. The feed water side is exposed to the pressure of the vessel and the permeate side is exposed to atmospheric pressure. The pressure differential between the vessel pressure and atmospheric pressure drives a filtration process across the membranes. In some embodiments, the membrane units or elements are configured in an "open" configuration, with adjacent membrane elements being spaced apart by a greater distance than in conventional osmotic membrane systems, and without a conventional continuous feed water spacer disposed between adjacent active membrane surfaces on the feed water side. Such a configuration can both inhibit settlement of bacteria and/or particles on the membrane and can also reduce longitudinal head loss as compared to conventional systems. In some embodiments, the membrane elements are arrayed vertically within the pressure vessel.

The systems of certain embodiments are advantageous in that they simplify or eliminate certain process steps that would otherwise be necessary in a conventional water treatment plant, such as a plant employing conventional spiral-wound membrane systems. Embodiments can be configured to treat a wide range of source (raw) water, including potable or brackish surface water, potable or brackish well water, seawater, industrial feed water, industrial wastewater, storm water, and municipal wastewater, to produce product water of a quality suitable for a particular desired use, including supplying the product water to particular follow-on treatment process. In addition, the systems described herein can be mounted and/or transported in a vehicle and deployed in emergency situations to remove, e.g., dissolved salts or other unwanted constituents such as viruses and bacteria to produce potable water from a contaminated or otherwise non-potable water supply.

The systems involve exposure of one or more membranes, such as nanofiltration (NF) or reverse osmosis (RO) membranes, to a volume of water held at pressure in a pressure vessel. The vessel pressure can be tailored to the selected membranes and the treatment goals. In embodiments employing an osmotic membrane (one that removes a portion of dissolved solids), for example, the minimum operating pressure required would be the sum of the osmotic pressure differential of the feed water and permeate, the transmembrane pressure, and the longitudinal head loss through the vessel.

Embodiments of the present invention comprise a unique membrane element configuration disposed inside a pressure vessel, with real time anti-fouling systems integrated into the vessel. In some embodiments, pressurized feed water is pumped into the vessels and feed water is separated into permeate and concentrate by a cross-flow membrane process. The membranes can comprise microfiltration, ultrafiltration, nanofiltration or reverse osmosis flat sheet membranes. The membranes can have a generally planar configuration, and can be stacked in series to form an array of spaced-apart membranes. By such a configuration, embodiments of the invention avoid the "dead spots" that are formed in the feed water flow path by conventional feed water spacers. Spacing between the membranes (to avoid the sheets' tendency to attract one other via surface tension and to lessen head loss) can be maintained by any suitable means. For example and without limitation, in embodiments of the invention, a collection channel can be formed in a generally perpendicular direction through the array by a collection tube that penetrates each membrane element. Such a collection tube can be surrounded by a spacer, such as a gasketed spacer or a studded spacer, between each adjacent pair of membrane sheets. In some embodiments, tension between two such collection channels can pull the membrane elements tight and reduce or eliminate their tendency to attract to each other and touch. In some embodiments, additional spacers can be disposed between one or more edges of adjacent membrane sheets to keep the membranes from collapsing toward each other. In some embodiments, spacers can be disposed along the leading edges of the membrane elements, with the circulation of the water helping to maintain the spacing of the membrane elements along the flow path. In embodiments of the invention, adjacent membrane sheets are spaced further apart than traditional spiral wound elements, for example, by at least about 1 mm. In other embodiments, the adjacent membrane sheets are spaced apart by at least about 2 mm. The greater spacing, combined with the absence of a conventional webbed feed water spacer sheet, keeps adjacent membrane sheets from attracting to each other and touching as a result of surface tension. The greater spacing and absence of a conventional continuous feed water spacer also significantly reduce the longitudinal headloss through the system as compared to a conventional spiral membrane system.

In some embodiments, the membranes comprise ultrafiltration (UF), nanofiltration (NF) and reverse osmosis (RO) membranes which are relatively much tighter and smoother than microfiltration (MF) membranes. With pore sizes much smaller than typical MF membranes, these membranes do not allow large contaminants to lodge in their pores. In addition, NF and RO membranes, which are often charged, can remove varying amounts of dissolved solids from the feed water stream. RO membranes are usually capable of removing more dissolved solids than nanofiltration membranes. In some embodiments, use of NF and RO membranes involves higher driving pressures than MF membranes, resulting in a much lower flux as well as lower attractive forces between the membrane surfaces, aiding in the anti-fouling nature of embodiments.

Embodiments of the invention can also incorporate other elements to mitigate fouling. Assuming constant recovery in a single-stage system, as the space between membrane elements is increased, the cross flow velocity is decreased. Since higher cross flow velocity helps to keep particles from settling on the membranes and thus mitigates fouling, embodiments of the invention incorporate features and/or methods to increase this velocity. For example, in some embodiments, feed water velocity can be raised by re-circulating water past the membranes inside the pressure vessel. Rather than removing the feed water from the pressure vessel at one end and pumping it back to the other end via an external conduit or circuit, in embodiments of the invention, the feed water is routed through open areas inside the pressure vessel (areas not occupied by membrane or membrane cartridges) via baffles that direct the water flow around the membrane cartridge(s). For example, frustoconical baffles can be disposed at one end of the membrane cartridges so as to direct the feed water toward a circulator, such as, for example, a pump or a rotating impeller. The impeller can be configured and positioned to draw feed water flowing between the membrane elements, and redirect that water around the baffles, through the open areas inside the pressure vessel, and back to the other end of the membrane cartridge(s). Recirculating the feed water within the vessel results in less pressure loss than in conventional systems that redirect feed water into a smaller-aperture circuit outside the vessel.

In some embodiments, antifouling particles can be added to a contaminated feed water supply to inhibit or prevent membrane fouling, extending the time between periodic membrane cleanings, and extending the useful life of the membranes. In suspension, the antifouling particles can absorb and/or adsorb (i.e., attract and hold) smaller contaminant particles which might otherwise coat the membrane surfaces and block the flow of permeate through the membrane surfaces. The antifouling particles can also coat the membrane surfaces to form a water-permeable protective structure (or layer) over the membrane surfaces. Such a protective structure can attract and hold contaminant particles throughout its thickness, preventing the buildup of a dense, water-impermeable layer close to or on the membrane surfaces. In some embodiments, pellets can be added to the feed water inside the vessel. The pellets can be configured to contact and dislodge contaminant particles which may have built up on the membrane surfaces, inhibiting or preventing the buildup of a nonporous (or low-porosity) layer of contaminant particles on the membrane surface. In embodiments employing both antifouling particles and pellets, the pellets can be configured to contact and dislodge antifouling particles which may have built up on the membrane surfaces, along with any contaminant particles which may have adhered to the antifouling particles. In such an embodiment, the pellets can inhibit or prevent the formation of a contaminant particle "crust" at the surface of the antifouling layer which is exposed to the feed water, improving the performance of the antifouling layer.

Embodiments of the invention can be used as an enhanced pretreatment stage in a multi-stage process to facilitate higher water recovery rates than conventional systems. For example, a system as described herein can be configured with relatively loose NF membranes to target dissolved minerals (calcium, magnesium) as well as dissolved organics and biological contaminants in wastewater plant effluent (i.e., primary effluent as well as secondary or tertiary effluent). Such a system can be installed upstream of a conventional RO system (as the final treatment stage) and configured to deliver an extremely clean feed stream to the RO stage, allowing the RO stage to operate at higher-than-typical recoveries—as high or higher than 90%. In this example, because the concentrate produced in the enhanced pretreatment stage is not highly saline, it can be sent back through the wastewater treatment plant with causing any process problems. In some embodiments, the higher calcium content of the concentrate from the enhanced pretreatment stage can actually facilitate the overall reclaimed water treatment process. Such a pretreatment system can be operated at any appropriate recovery rate. By recycling the concentrate of the enhanced pretreatment stage back to the beginning of the reclaimed water treatment process, a 90 to 95% recovery rate can be achieved for the overall process.

One embodiment of the invention, shown in FIG. 1, comprises a rectangular membrane cartridge 1 disposed in a pressure vessel 2 having a round cross-section. The open areas 6 created between the outer surfaces of the rectangular membrane cartridge and the inner surfaces of the rounded vessel 2 are used to conduct or re-circulate the feed water from one end of the membrane cartridges 1 back to the other end (into and out of the page, in FIG. 1). In the embodiment illustrated in FIG. 1, the four open areas 6 act as a return conduit for feed water from the bottom of the vessel 2 to the top of the vessel 2. In another embodiment, as shown in FIG. 2, three rectangular membrane cartridges 1 are disposed in a circular cross-section pressure vessel 2, in order to accommodate a greater total membrane surface area in the cylindrical vessel 2. These three membrane cartridges 1 create four circular segment-shaped voids 6 and four quasi-triangular voids 6 that can be used as return conduits for the circulating raw water. All the voids 6 around the membrane elements can be used to direct the water from the bottom of the vessel 2 back to the top of the vessel 2 (into and out of the page).

Figure 3:
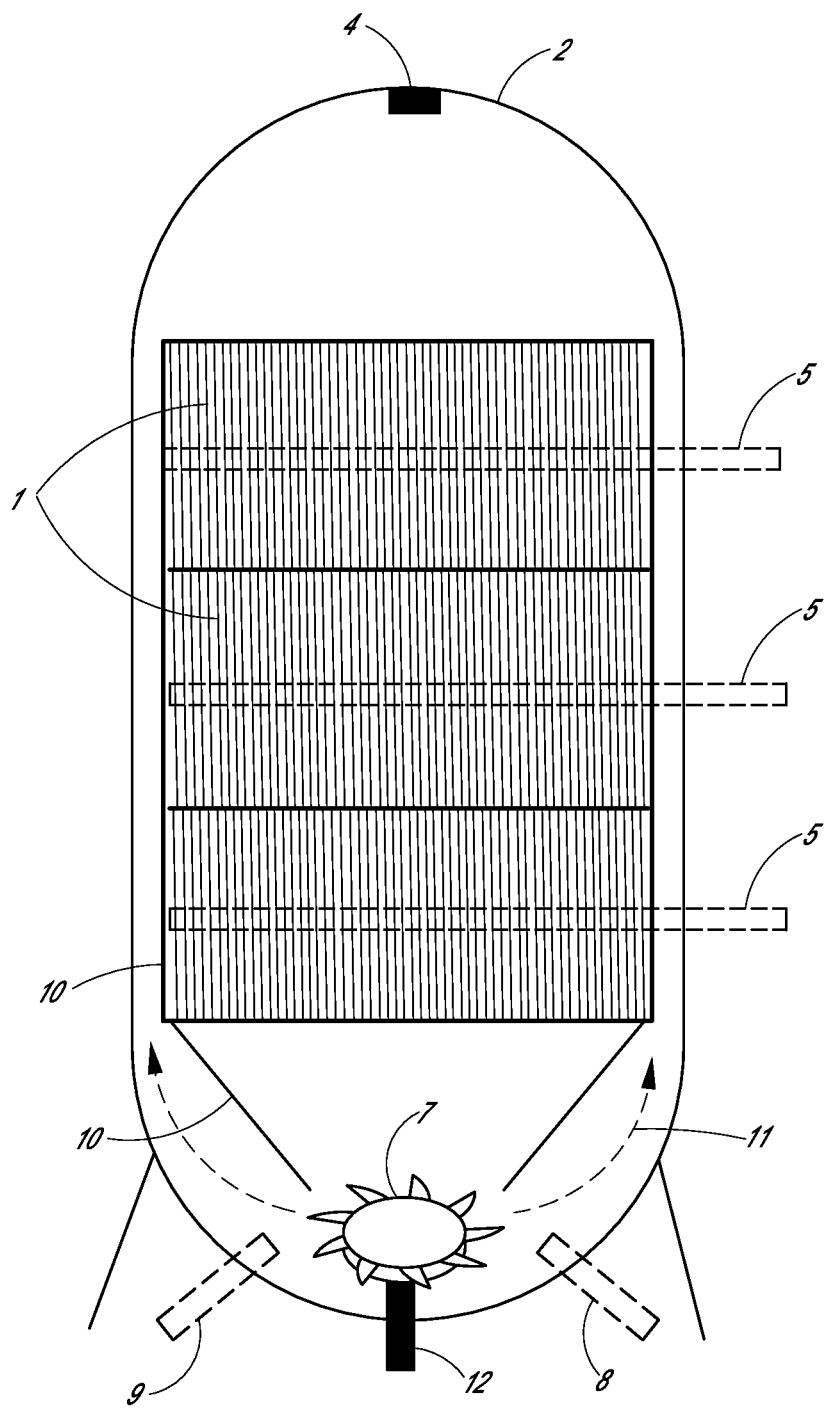
FIG. 3 shows a vertical cross section of another embodiment of a treatment system.

In the embodiment illustrated in FIG. 3, an impeller 7 is disposed near the bottom of the baffle 10 with its axle 12 penetrating the vessel. The impeller 7 can be driven by an external motor (not shown). The impeller 7 draws the feed water down between the membranes of the membrane cartridge 1 and pushes it through the voids 6 back up toward the top of the vessel 2. The frustoconical baffle 10 at the bottom of the tank 2 directs the feed water toward the impeller 7 which forces the feed water up the voids 6 within the tank, generally in the direction indicated by arrow 11. Although illustrated with a frustoconical shape, the baffle 10 have any shape and configuration suitable to accommodate the shape of the footprint of the membrane cartridges 1 in a central part of the vessel and direct feed water toward the impeller 7. The baffle 10 can be made of any suitable material, such as, for example, an inert material such as plastic. Structurally, the baffle 10 is configured to withstand the slight pressure differential caused by the bi-directional flow of the water (that is, downward in the central part of the vessel, in which the membranes are disposed, and upward in the open areas in the periphery of the vessel, between the membranes and the inner surface of the vessel). Vibration, while destructive to most things mechanical, can also be incorporated to help limit or prevent particle settlement. In embodiments of the invention, transducers 4 are placed in or on the pressure vessel 2 to generate and direct vibration waves through the feed water, which transports the waves between the membrane elements 3. The waves produced by the vibration act to suspend particles and/or foulants off the surfaces of the membrane elements 3. When the vibration waves reach the membrane surfaces, the membrane surfaces act like tennis rackets, colliding with and repelling particles that might otherwise settle on the membranes. In addition, the vibration causes movement of the membrane back and forth, which creates turbulence in the feed water at the surface of the membranes, enhancing the mixing and movement of dissolved and suspended particles from the membrane surface and through the feed water channels between the membrane surfaces. The amount of vibration applied can vary, depending on such parameters as the quality of the source water and the characteristics (charge, roughness, etc) of the membrane used. The type of vibration can also vary, from, for example, physical mechanical vibration to sonic and ultrasonic vibration, as the frequency and power can be adjusted to meet the needs of the particular application.

Membrane Modules

The systems of preferred embodiments utilize membrane modules of various configurations. In a preferred configuration, the membrane module employs a membrane system wherein two parallel membrane sheets are held apart by permeate spacers, and wherein the volume between the membrane sheets is enclosed. Water (permeate) passes through the membranes and into the enclosed volume, where it is collected. Particularly preferred embodiments employ rigid separators to maintain spacing between the membranes on the low pressure (permeate) side; however, any suitable permeate spacer configuration (e.g., spacers having some degree of flexibility or deformability) can be employed which is capable of maintaining a separation of the two membrane sheets. The spacers can have any suitable shape, form, or structure capable of maintaining a separation between membrane sheets, e.g., square, rectangular, or polygonal cross section (solid or at least partially hollow), circular cross section, I-beams, and the like. Spacers can be employed to maintain a separation between membrane sheets in the space in which permeate is collected (permeate spacers), and spacers can maintain a separation between membrane sheets in the area exposed to raw or untreated water (e.g., raw water spacers). Alternatively, configurations can be employed that do not utilize raw water spacers. Instead, separation can be provided by the structure that holds the membranes in place, e.g., the supporting frame. Separation can also be provided by, e.g., a series of spaced expanded plastic media (e.g., spheres), corrugated woven plastic fibers, porous monoliths, nonwoven fibrous sheets, or the like. In addition, separation can be achieved by weaving the membrane unit or units through a series of supports. Similarly, the spacer can be fabricated from any suitable material. Suitable materials can include rigid polymers, ceramics, stainless steel, composites, polymer coated metal, and the like. As discussed above, spacers or other structures providing spacing are employed within the space between the two membrane surfaces where permeate is collected (e.g., permeate spacers), or between active membrane surfaces exposed to raw water (e.g., raw water spacers).

Alternatively, one or more spiral-wound membrane units can be employed in a loosely rolled configuration wherein gravity or water currents can move higher density concentrate through the configuration and away from the membrane surfaces. The membrane elements can alternatively be arrayed in various other configurations (planar, curved, corrugated, etc.) which maximize surface exposure and minimize space requirements. In a preferred configuration, these elements are arrayed vertically, spaced apart sufficiently to avoid attraction and/or collapse of adjacent elements upon each other, and are disposed within the pressure vessel. The induced vessel pressure forces water through the membrane, and a gathering system collects the treated water and releases it to a location outside of the pressure vessel. Any suitable permeate collection configuration can be employed in the systems of preferred embodiments. For example, one configuration employs a central collector with membrane units or cartridges adjoining the collector from either side. Another configuration employs membrane units in concentric circles with radial collectors moving the potable water to the central collector. Still another configuration employs membrane units extending between collection tubes. In such a configuration, the collection tubes can be configured to support the membrane units, hold them spaced apart from one another, and collect permeate as well.

Figure 5:
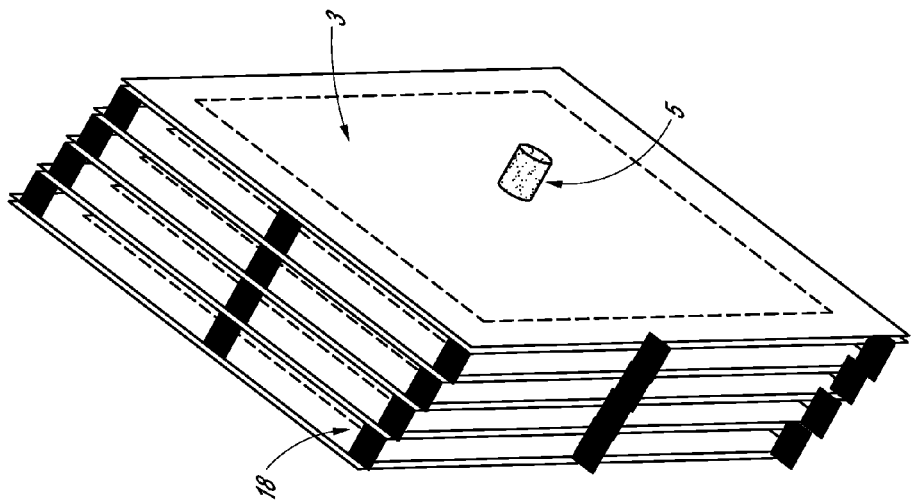
FIG. 5 shows a perspective view of a membrane cartridge configured in accordance with an embodiment.
Figure 4B:
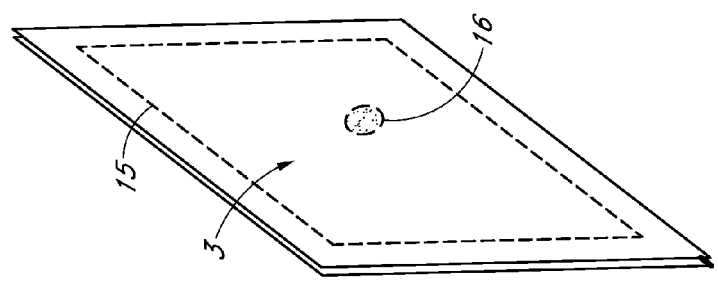
FIG. 4B shows a perspective view of an assembled membrane element configured in accordance with an embodiment.
Figure 4A:
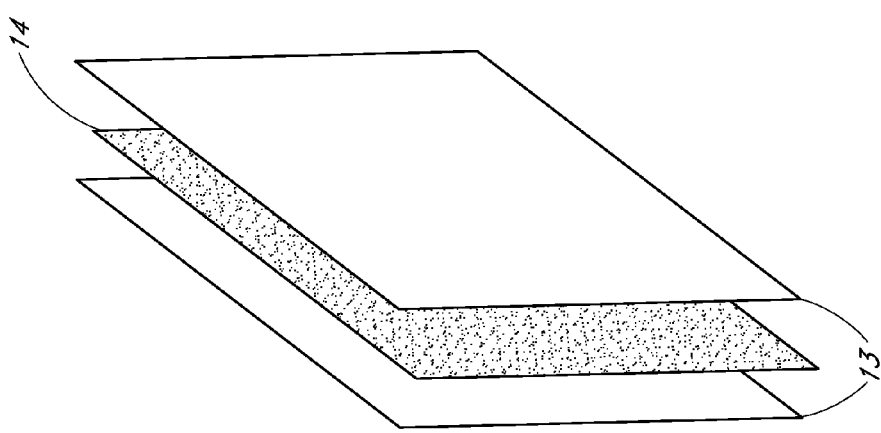
FIG. 4A shows an exploded perspective view of components of a membrane element configured in accordance with an embodiment.
Figure 7:
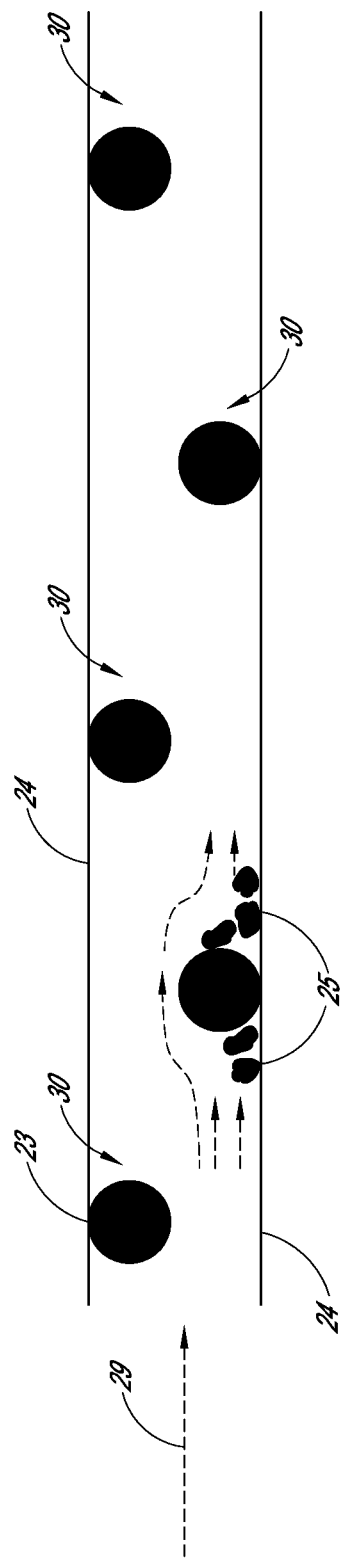
FIG. 7 is a schematic diagram illustrating the flow of feed water through a feed channel of a conventional spiral wound membrane element.

In some embodiments, a membrane system can comprise a series of generally planar flat sheet membrane elements 3 arranged in one or more discrete cartridges, for example as illustrated in FIG. 5. FIG. 4 shows a single membrane element 3 which comprises two outwardly-facing sheets 13 of thin film composite membrane with a permeate carrier sheet 14 disposed between them. Suitable membranes are manufactured by several international suppliers notably Dow Filmtec, Toray and Hydranautics. Suitable permeate carrier sheets are manufactured by companies such as Guilford Mills and Industrial Netting. These planar components 13, 14 are stacked against each other and sealed together around the edges 15 by any suitable method, for example, using an adhesive or heat seal or both. The edge seal 15 requires deactivating some of the membrane material, as the membrane cannot perform its filtering function if it is part of the seal. An aperture 16 is made in each element 3 in the same position and a gasketed spacer is placed around the aperture 16, between each adjacent pair of elements 3. With reference now to FIG. 5, a perforated collection tube 5 is inserted into the channel formed by the series of gasketed spacers and apertures 16. The collection tube 5 can be used to compress the series of spacers so as to form a seal with the gaskets. This seal separates the feed water on the active side of the membrane elements 3 (the side exposed to the feed water) from the permeate in the carrier sheets 14 between the membranes 13 and in the collection channel. Alternatively or in addition, the gaskets can be compressed using dowels extending through the membrane array, in which case a perforated collection tube may not be necessary. Dowel penetrations in the membrane elements 3 can also be sealed to keep raw water from the inside of the membrane element.

With continued reference to FIG. 5, perimeter spacers 18 can be used to help maintain separation of (and spacing between) adjacent membrane elements 3. In some embodiments, these perimeter spacers 18 can comprise small pieces of plastic or rubber or other suitable material which are adhered to the edges of the membranes. In some embodiments, the perimeter spacers can comprise one or more comb-like elements that bridge the array and serve to maintain the spacing between all the elements in a single cartridge 1. Further separation of the membrane elements can be achieved through tension pulled on the elements 3 (in the plane of the membrane face). Tension can be pulled from the edges of the membrane elements or from two or more collection channels. In some embodiments, the membrane elements 3 can be stiffened by adding extra material, such as a folded piece of polyester, on the perimeter. In addition or in the alternative, interior thin plastic components, acting like studs in a wall, can be placed along the permeate spacer sheet 14 to stiffen the membrane elements 3 and thereby help to prevent collapse (or attraction) of adjacent membrane elements upon each other.

In preferred embodiments of the invention, a membrane module as described herein can be submerged in a pressure vessel and used to produce potable water from a non-potable supply. The permeate side of the membranes is kept at about atmospheric pressure by a port (not shown) placing the collection system in fluid communication with the atmosphere outside the pressure vessel, via a pipe, tube or other means of transmitting the product water through the side of the pressure vessel to a storage tank or distribution point. The membrane module(s) can include one or more cartridges, which can be configured to withstand the vessel pressure to which they will be exposed during operation, and which can comprise materials suitable for the particular application.

When the membrane module is submerged, pressurized source water in the pressure vessel flows substantially freely through the top, bottom, and rear of each cartridge. The pressure differential between the source water side of the membranes and the permeate side of the membranes causes permeate to flow to the low pressure (permeate) side of the membranes. Although the illustrated embodiments show a generally symmetrical configuration with cartridges on either side of a collection system, membrane modules can be configured in any other suitable configuration. One such configuration could be to cap the end of an individual cartridge and connect the membrane cartridges together with a series of collection pipes or tubes.

FIG. 12 shows an arrangement for a mobile treatment system 1100 according to a preferred embodiment of the invention. The system 1100 comprises a pumping system 1102 configured to extract water from a contaminated freshwater source 1104 and feed it to the treatment system at pressures ranging from about 20 psi to and 100 psi. The pressure used can vary depending on the particular membranes used, and can be about 5 psi, 10 psi, 20 psi, 30 psi, 40 psi, 50 psi, 60 psi, 70 psi, 80 psi, 90 psi, 100 psi, 110 psi, 120 psi, 130 psi, 140 psi, 150 psi, in a range defined by any of these two numbers, or higher. The system 1100 also includes one or more pressure vessels 1106 having one or more membrane units 1108 disposed therein. The pressure vessels 1106 receive source water from the pump or pumps 1102 through one or more inlets 1110 and hold the water at pressure. The membrane units 1108 are disposed within the vessel 1106 such that the source water can flow substantially freely past the membranes. The membrane units 1108 have a permeate side configured to direct the flow of permeate into a collection system 1112. The collection system 1112 is in fluid communication with atmospheric pressure. The collection system 1112 can be placed in communication with atmospheric pressure in any suitable manner, such as, for example, piping transporting the water through the side of the pressure vessel 1106, a tube extending through the top of the pressure vessel 1106, or any other appropriate method. The collection system 1112 has an outlet 1114 through which permeate can travel out of the pressure vessel 1106. The outlet can also provide fluid communication to the atmospheric pressure outside the vessel 1106. The system 1100 can also include a storage tank 1116 configured to receive permeate from the collection system 1112 and store the permeate for later usage. Of course, in some embodiments, permeate can be supplied from the collection system 1112 to a separate storage unit, disposed outside of the system 1100.

In some embodiments, the system 1100 includes a disinfection system 1118, such as an ultraviolet light disinfection system, disposed downstream of the pressure vessels 1106. The system 1100 can also include one or more pump or pumps configured to pump permeate from the collection system 1112 to the disinfection system 1118, and/or from the disinfection system to the storage tank 1116. The system 1100 includes an electrical panel 1120 configured to control the pump or pumps 1102 and the disinfection system 1118 (if any). The system 1100 further includes a portable generator and fuel tank 1122 configured to supply power to the pumps 1102 and the disinfection system 1118 (if any). Optionally, the system 1100 can also employ some pretreatment methods, which may include coarse filters or the like, to protect pumps and membranes from damage due to large particles.

Embodiments of the invention can be mounted on a vehicle, such as a semi-truck, and transported to an area where treatment is needed. Embodiments can be rapidly deployed, used as required, and then moved to another area when desired. Systems configured in accordance with preferred embodiments offer ease of operation, with minimal pretreatment requirements (coarse filter only) and no process chemical requirements. Embodiments comprising tight nanofiltration membranes can be configured to provide an exceptional quality of product water.

FIG. 13 illustrates a configuration of membrane units 1108 in the pressure vessel 1106. The membrane units 1108 are spaced apart in cartridges 1124 and mounted on either side of a central collection channel 1112. The cartridges 1124 are variously sized so as to maximize usage of space within the pressure vessel 1106. At least a portion of the collection channel 1112 is placed in communication with atmospheric pressure via a vent or port 1126 extending from the channel to outside of the pressure vessel 1106, thereby allowing the vessel pressure to drive a filtration process across the membrane units 1108.

Of course, the membrane units and collection system can have any other suitable configuration consistent with their intended purpose. FIG. 14A, for example, illustrates a membrane system 1200 arranged inside a pressure vessel 1202. The membrane system 1200 includes one or more membrane units 1204 which are woven back and forth through a series of supports disposed around the perimeter of the vessel 1202 and/or along a center channel 1206. The membrane units 1204 are also connected at one or more points to one or more collection tubes, such that a permeate side of the membrane units 1204 is disposed in fluid communication with an interior of the collection tube or tubes. FIG. 14B illustrates (with exaggerated spacing) an example of membrane units 1210 which are woven around supports 1212 and connected at their ends to one or more collection tubes 1216. The supports 1212 and/or the collection tubes 1216 can be disposed in any suitable configuration. For example, the supports 1212 and/or the collection tubes 1216 can be disposed in a roughly perpendicular orientation to the orientation of the membrane units 1204. As better illustrated in FIG. 14C, the membrane unit 1210 has a source water side 1214 which is exposed to pressurized source water held in the vessel 1202. The membrane unit 1210 is also connected at one or more points to a perforation 1215 in one or more collection tubes 1216, such that a permeate side 1218 of the membrane unit 1210 is disposed in fluid communication with an interior of the collection tube 1216. Although not illustrated, in some embodiments, the collection tube or tubes 1216 can interconnect and flow into a central channel. In other embodiments, a network of collection tubes can comprise the collection system. The collection tubes and/or the collection system can be exposed to atmospheric pressure, for example via a port or breathing tube extending through the pressure vessel, such that the vessel pressure drives a filtration process across the membrane units and into the collection tubes.

Figure 15:
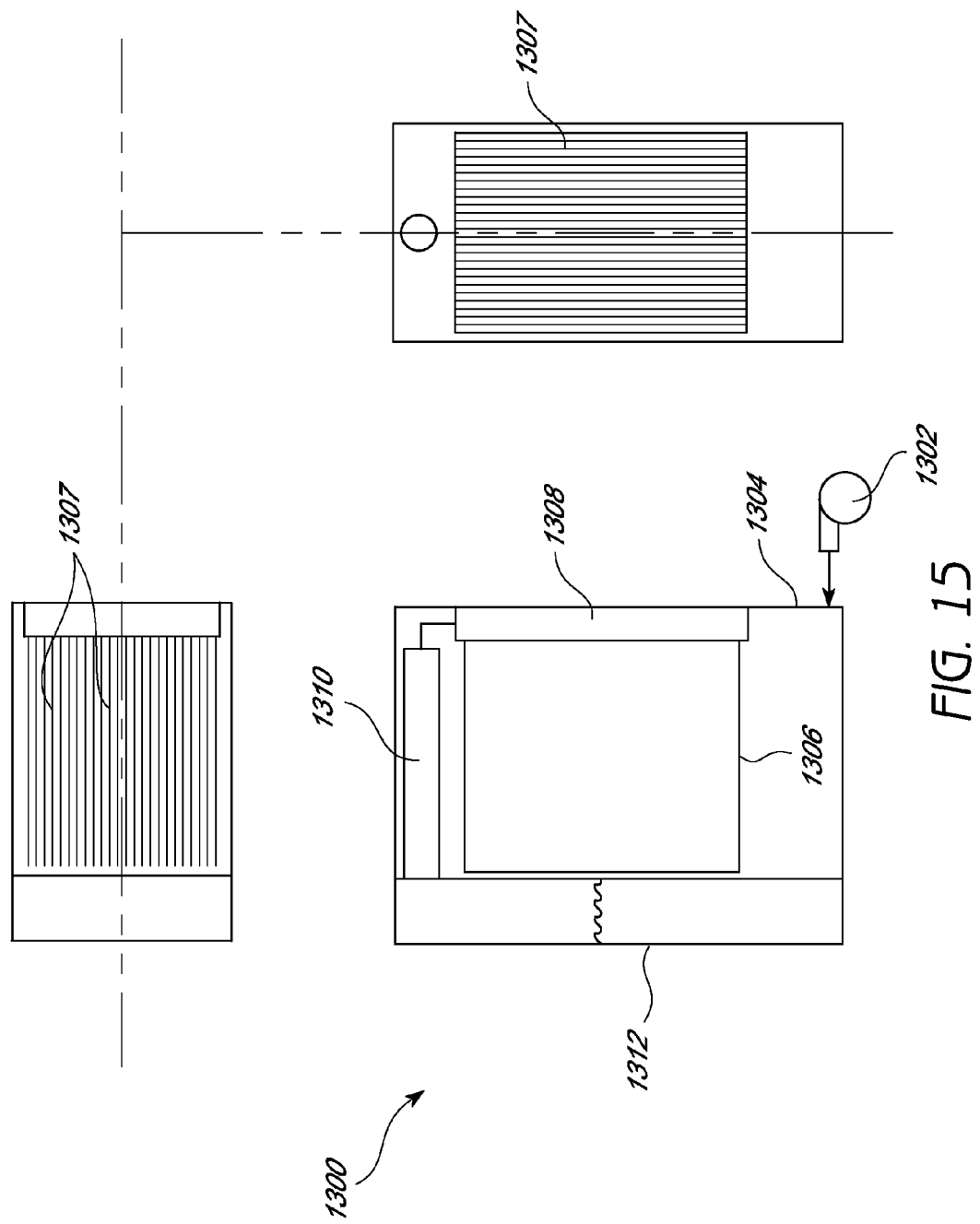
FIG. 15 is a schematic diagram illustrating a side view and side and plan view cross-sections of a filtration system according to a further embodiment.

With reference now to FIG. 15, a smaller mobile filtration system 1300 according to another embodiment is illustrated. The system 1300 includes an external pump 1302 configured to provide source water, at pressure, into a container 1304. The container 1304 includes one or more membrane cartridges 1306 or membrane systems, including one or more membranes 1307 which are configured to produce permeate when exposed to the pressurized source water. The membrane cartridges 1306 are configured to direct the flow of permeate into a collection channel 1308 which is exposed to atmospheric pressure. The system 1300 can also include a disinfection system 310, such as an ultraviolet disinfection system, configured to disinfect product water collected in the collection channel 1308. The system 1300 can also include a product water storage unit 1312 disposed downstream of the collection channel 1308. Such a system can be configured at a very small scale if desired. For example, such a system can be configured for use in one or more standard 5-gallon cans or storage containers. Such a system can also be configured in smaller or larger sizes, and/or can be used in "under-the-sink" models.

Figure 16:
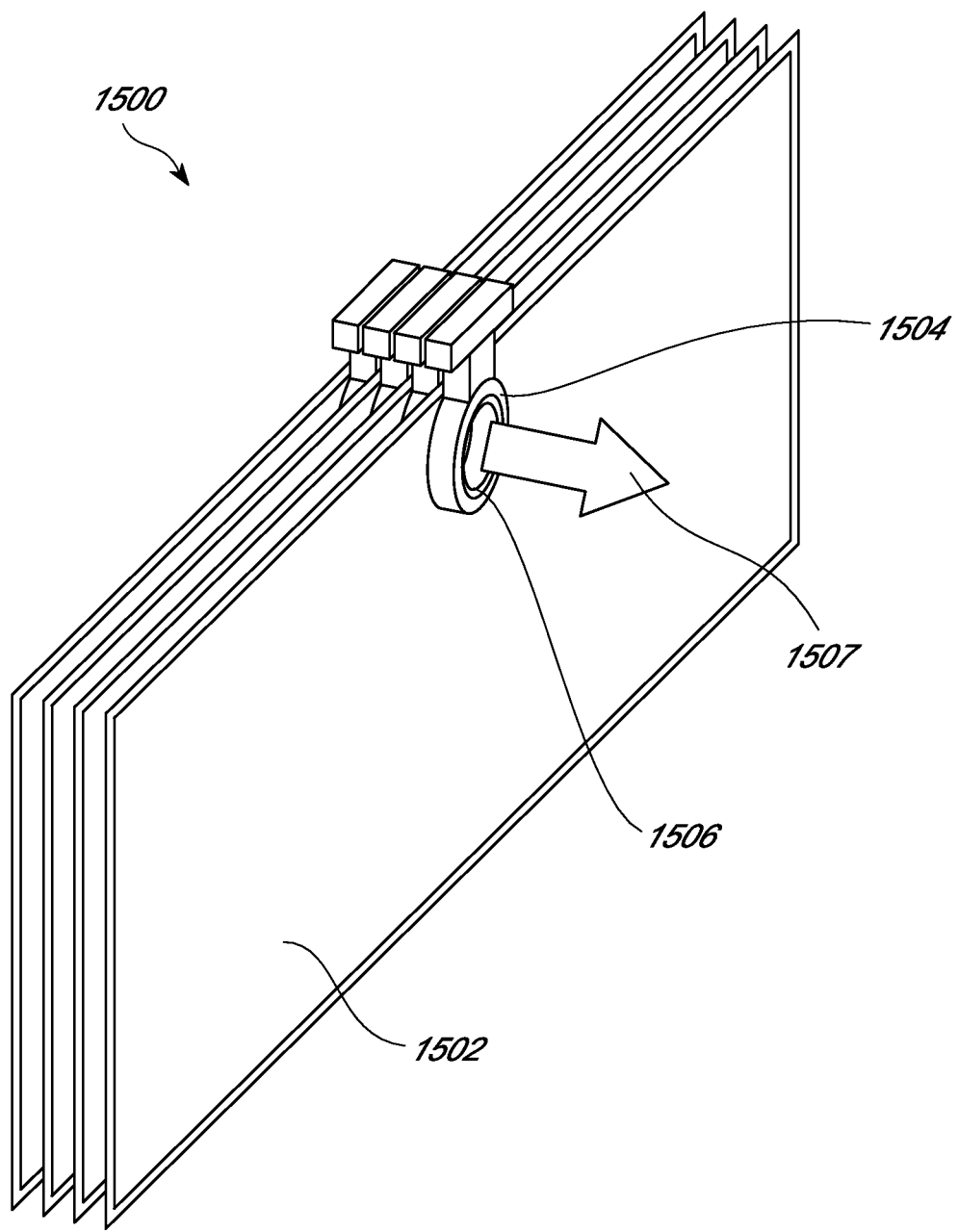
FIG. 16 is a perspective diagram illustrating an arrangement of membrane elements with gasketed spacers including a tee shaped top for hanging the elements on a frame, according to a further embodiment.

FIG. 16 is a perspective diagram illustrating an arrangement 1500 of membrane elements 1502 with gasketed spacers 1504. The spacers 1504 each have a tee-shaped top for hanging the elements 1502 on a rack or frame (not shown). The gasketed spacers 1504 may be stacked in series to define and create a permeate collection channel 1506, through which permeate can flow, generally in the direction indicated by arrow 1507. In the illustrated embodiment, the collection channel 1506 is located generally at the top and center of the series of elements 1502. In other embodiments, one or more collection channels or points can be disposed at other suitable locations.

Figure 17:
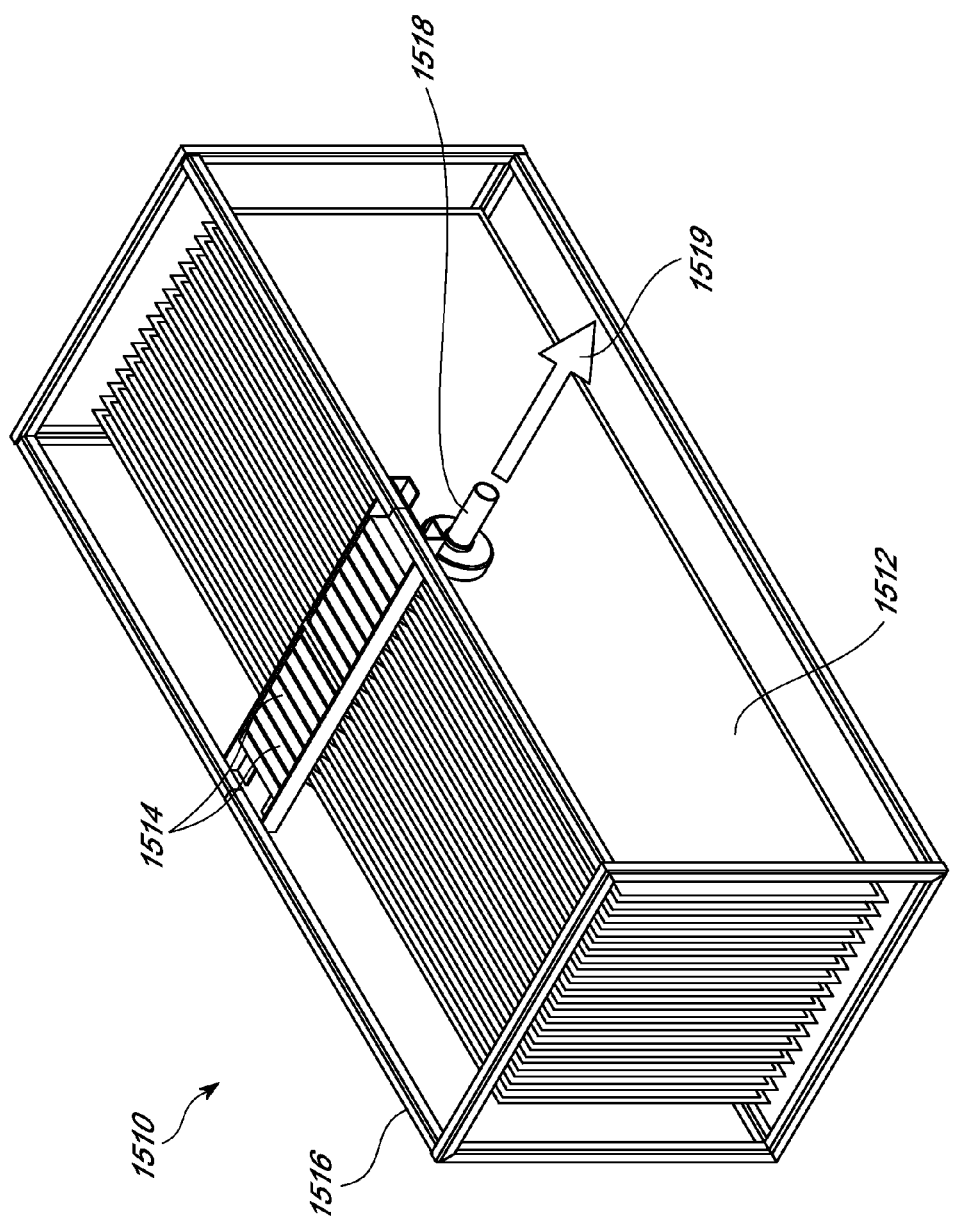
FIG. 17 is a perspective diagram illustrating a cartridge of multiple membrane elements supported on a frame, according to a still further embodiment.

FIG. 17 is a perspective diagram illustrating a cartridge 1510 comprising a plurality of membrane elements 1512 spaced apart by a series of gasketed spacers 1514. The series of spacers 1514 are compressed together, by any suitable means, to define a permeate conduit. A collection pipe 1518 comprising perforations or slits can be disposed inside the conduit to receive and convey the permeate, generally in the direction indicated by arrow 1519. The spacers 1514 can each have generally tee-shaped tops, so that the spacers 1514 (and thus, the elements 1512 compressed between the spacers) can be supported on a frame 1516. The dimensions of the frame 1516 can vary depending on required capacity, shipping constraints, weight and other factors. Suitable frame materials can include metal, plastic, fiberglass or other materials with an appropriate strength and corrosion resistance for the particular application.

Figure 18A:
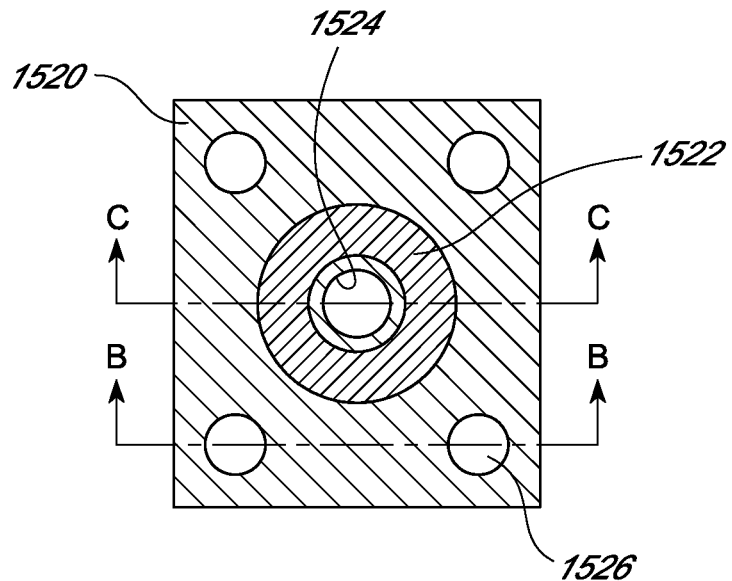
FIG. 18A is a plan view of a gasketed spacer, configured in accordance with an embodiment.
Figure 18B:
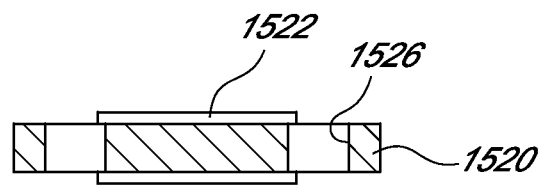
FIG. 18B is a cross-sectional view of the gasketed spacer of FIG. 18A, taken through line B-B.
Figure 18C:
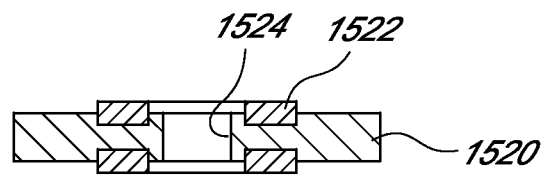
FIG. 18C is a cross-sectional view of the gasketed spacer of FIG. 18A, taken through line C-C.

FIG. 18A is a plan view of one example of a gasketed spacer 1520, configured in accordance with an embodiment. The spacer 1520 comprises a suitably rigid material for maintaining the spacing between adjacent membrane elements. The spacer 1520 can be provided with any suitable number of holes 1526 for receiving one or more fasteners or connectors, such as a rigid bolt or dowel, which will extend through a stacked series of spacers 1520 and membrane elements. The spacer 1520 is also provided with a conduit hole 1524 configured to allow permeate to pass from the permeate side of the membrane element, into the hole 1524. The illustrated spacer 1520 has a generally rectangular shape; however, spacers can have any other suitable shape, including a generally annular shape, and can also include any desired extension shape, such as, for example, a tee-shaped extension as illustrated in FIG. 17. FIGS. 18B and 18C are side cross-sectional views better illustrating the fastener holes 1526, the gaskets 1522 on each opposing face of the spacer 1520, and the permeate conduit hole 1524 of the spacer 1520. The spacer 1520 can comprise plastic, fiberglass, or any other suitably rigid material to maintain the spacing between adjacent membrane elements and withstand the pressures to which the spacer will be exposed. The gaskets 1522 can comprise any elastomeric material with sufficient compressibility to create a watertight seal when compressed.

FIG. 19 is a plan view of a membrane element 1530 configured in accordance with an embodiment and shown with the gasketed spacer 1520 of FIG. 18A positioned on the element. As illustrated in FIG. 20, a series of membrane elements 1530 and gasketed spacers 1520 can be stacked together to form a membrane cartridge. To make such a cartridge, the gasketed spacers 1520 are aligned with holes in the membrane faces of the membrane elements 1530, and are also aligned with one another, so that the conduit holes 1524 and fastener holes 1526 of each spacer 1520 are aligned. In such a configuration, each series of holes 1524 defines a receiving space for a fastener or dowel 1534 (indicated in dashed lines). The series of holes 1526 defines a permeate conduit 1536 (also illustrated in dashed lines). The structure forming the permeate conduit 1536 can be sealed in any suitable manner to isolate the interior of the permeate conduit 1536 from the surrounding source water. In one embodiment, the series of spacers 1520 can be mechanically compressed, so that the gaskets 1522 can form an effective seal against the membrane faces. Then, the stack can be secured in the compressed position by one or more rigid members, such as, for example, one or more rigid dowels. The dowels can be glued to the stack of spacers in the compressed position. Once the glue has dried, the stack can be released from the external compression. FIG. 21 is a perspective view of a portion of a membrane cartridge formed in the manner illustrated in FIG. 20. In another embodiment, threaded fasteners can be deployed through each series of holes, and tightened to compress the stack of spacers until the gaskets form a watertight seal against the membrane faces. In still other embodiments, each spacer can include one or more clips or other structure configured to mate with corresponding structure on a second spacer, to thereby provide the required compression of the gaskets. In some embodiments, each spacer can include one or more abutment surfaces, or stops, configured to abut against corresponding structure on a second spacer when the spacers are moved toward one another, to maintain at least a minimal spacing between adjacent spacers even when compressed.

Figure 22C:
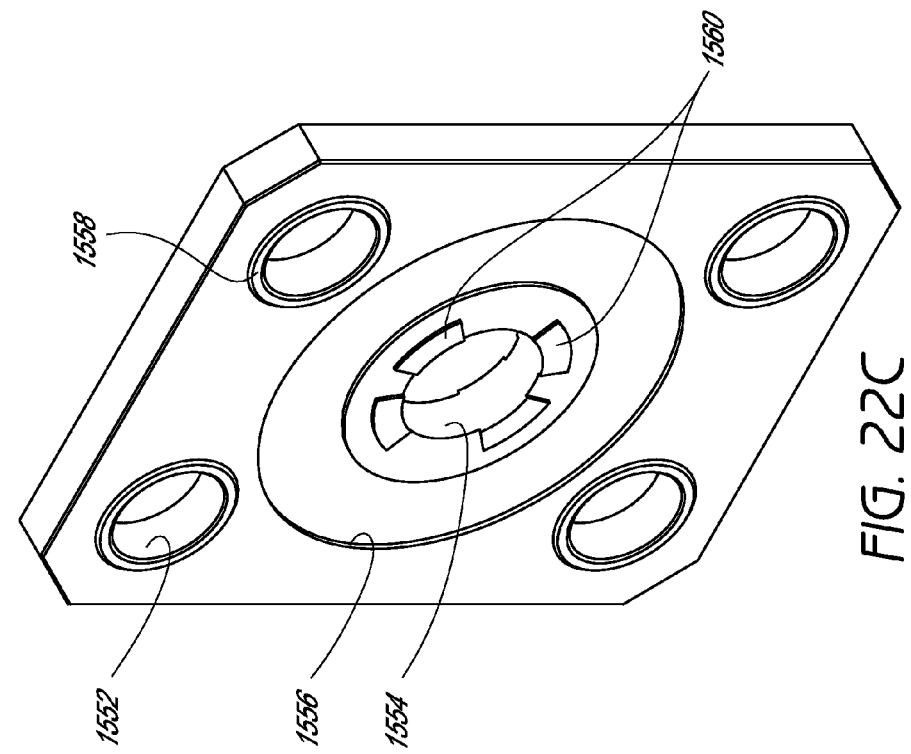
FIG. 22C is a perspective view of the gasketed spacer of FIG. 22A.
Figure 22B:
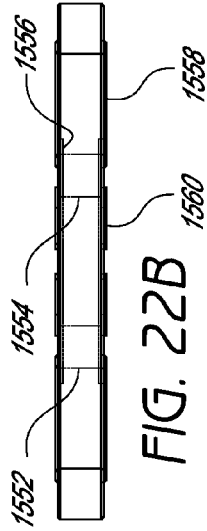
FIG. 22B is a side view of the gasketed spacer of FIG. 22A.
Figure 22A:
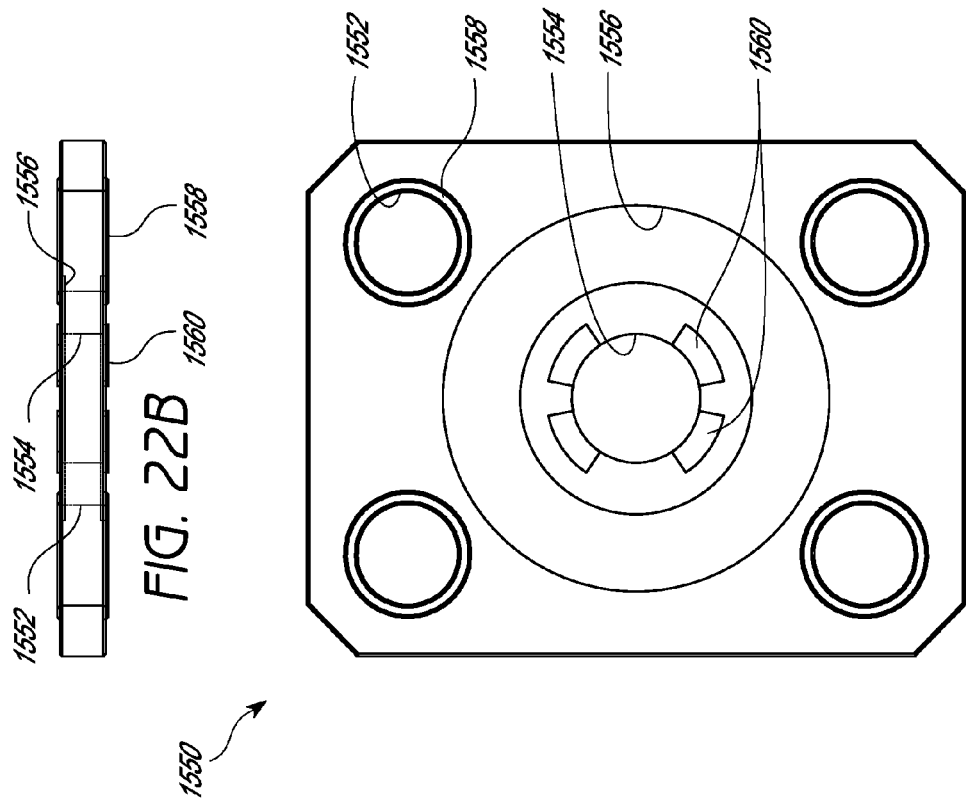
FIG. 22A is a plan view of a gasketed spacer, configured in accordance with an embodiment.

FIG. 22A is a plan view of a spacer 1550, configured in accordance with another embodiment. The spacer 1550 includes four holes 1552 that extend through the thickness of the spacer 1550. The holes 1552 are configured to receive a rod, bolt, or other member configured to extend through a stack of spacers 1550 (with membrane elements disposed between each spacer 1550) and maintain the stack of spacers 1550 under compression. As better illustrated in FIGS. 22B and 22C, the spacers 1550 include an annular protruding portion 1558 around each of the holes 1552. When the spacers 1550 are aligned in a stack (with membrane elements disposed between each spacer), the protruding portions 1558 (as well as the rod, bolt, or other compressive member) extend through a corresponding hole in the membrane elements and abut against corresponding portions 1558 of an adjacent spacer 1550. By such a configuration, the protruding portions 1558 serve to maintain at least a minimal spacing between the spacers 1550 even when compression is applied to the stack, and prevent damage to the membrane elements.

The spacer 1550 also includes a permeate opening 1554 that extends through the thickness of the spacer 1550. The permeate opening 1554 is configured to be placed in fluid communication with the permeate side of a membrane element (or a pair of membrane elements disposed on either side of the spacer 1550). When a series of spacers 1550 are aligned in a stack (of alternating spacers and membrane elements), the permeate openings 1554 align to form a permeate conduit extending through the elements. In some embodiments (see, e.g., FIG. 16), the permeate openings can be directly aligned with openings in the membrane faces (and thus, can be in direct fluid communication with the permeate sides of the membranes). In other embodiments, the permeate openings can be disposed in a region of the spacer which is spaced apart from the membrane elements (and thus, can be in indirect fluid communication with the permeate sides of the membranes through, for example, a second opening or perforation in the surface of the spacer).

The spacer 1550 also includes a groove 1556 configured to receive a sealing member such as a gasket. When a stack of alternating spacers and membrane elements is placed under compression, the gaskets form a watertight seal that separates the permeate openings 1554 from the source water sides of the membrane.

As better illustrated in FIGS. 22B and 22C, the spacer 1550 can also include one or more protruding portions 1560 disposed generally around the permeate opening 1554, without continuously encircling the permeate opening 1554. The protruding portions 1560 can be configured to serve the same function as the protruding portions 1558, without cutting off the flow of permeate from the permeate side of adjacent elements into the permeate conduit.

Figure 40A:
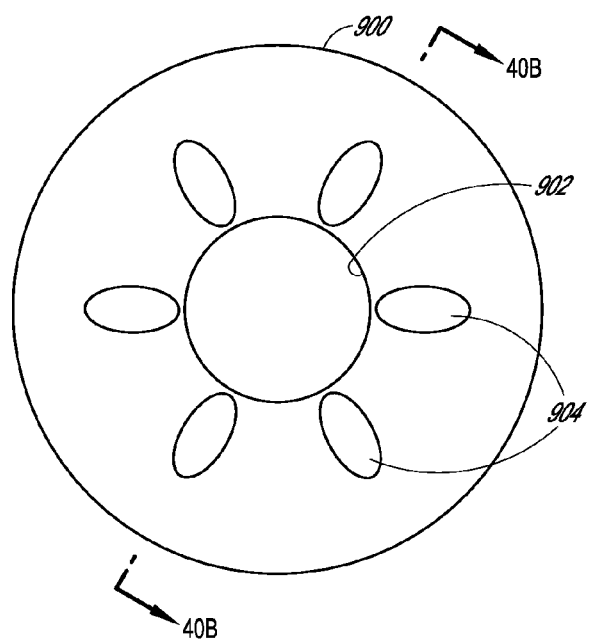
FIG. 40A shows a plan view of a feed water spacer configured in accordance with an embodiment.
Figure 40B:
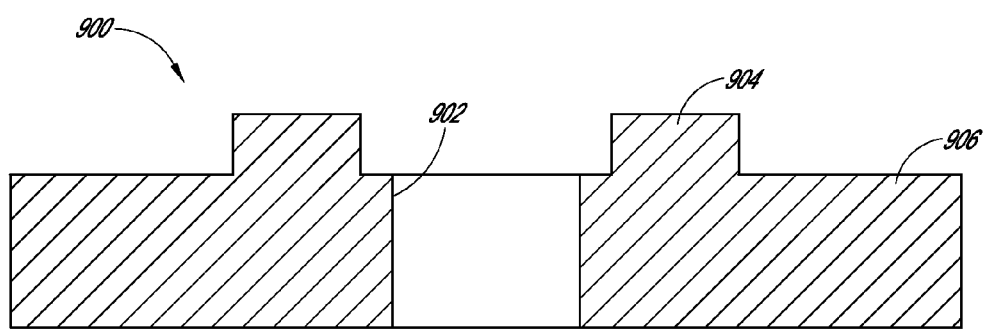
FIG. 40B shows a cross-section of the feed water spacer of FIG. 40A, taken along line 40B-40B of FIG. 40A.

In some embodiments, alternatively or in addition to a spacer/gasket system, studded spacers can be used to maintain spacing of the membrane elements. FIG. 40A shows a plan view of a studded spacer 900 configured in accordance with one such embodiment. The spacer 900 includes an opening 902 for a permeate collection channel as well as a plurality of studs 904 protruding from the body 906 of the spacer 900 and encircling the opening 902. FIG. 40B shows a cross-section of the spacer 900, taken along line 40B-40B of FIG. 40A, and better illustrates the configuration of the studs 904.

Figure 41A:
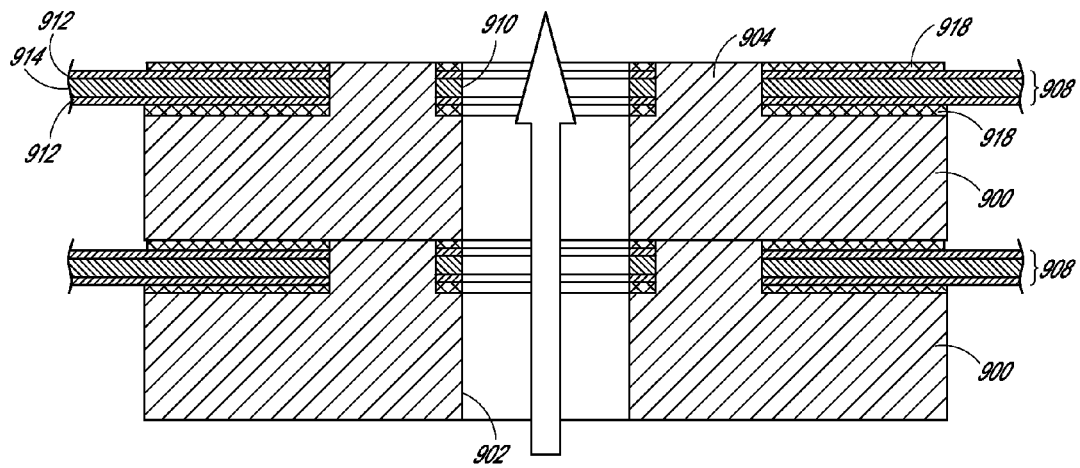
FIG. 41A shows a cross-sectional view of a stack of membrane elements and feed water spacers configured in accordance with another embodiment.
Figure 41B:
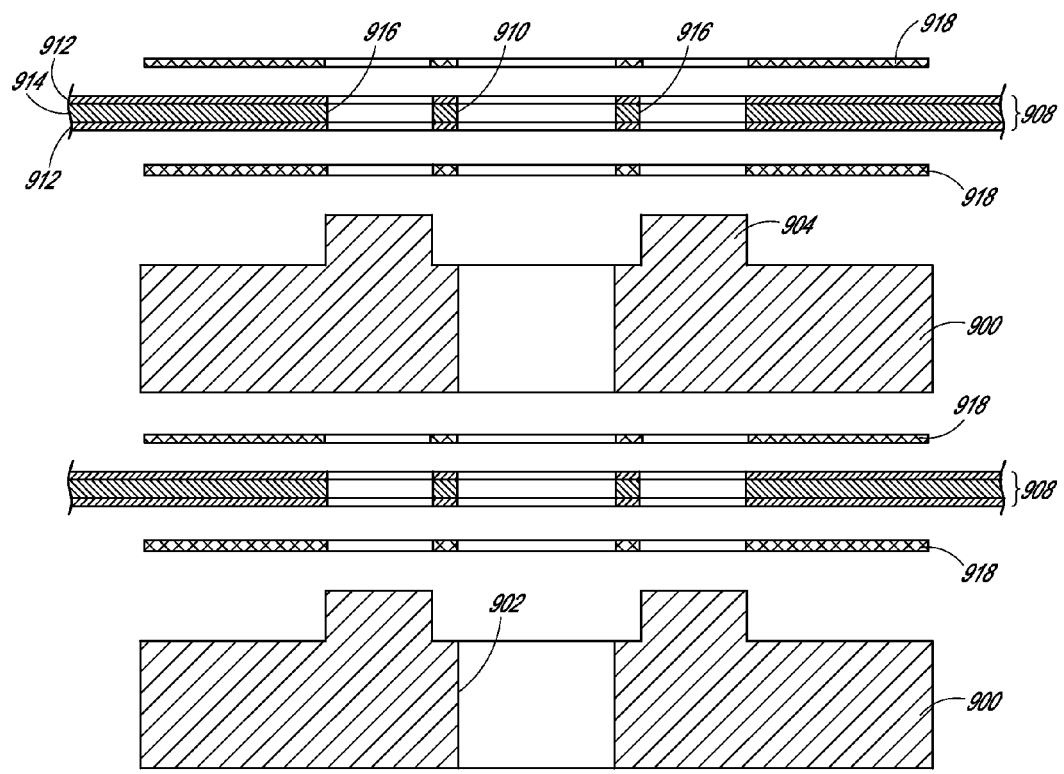
FIG. 41B is an exploded cross-sectional view of the stack illustrated in FIG. 41A.

FIG. 41A shows a cross-sectional view of a stack of membrane elements 908 which are spaced apart by studded spacers 900, in accordance with one embodiment, with the arrow indicating flow of permeate through the permeate collection channel. Each of the membrane elements 908 comprises two membranes 912 and a permeate spacer 914. The permeate openings 902 in the spacers 900 align with permeate openings 910 in the membrane elements 908, and the studs 904 align with holes 916 in the membrane elements. As shown in FIG. 41A, the studs 904 protrude from the spacer body 906 by a distance about equal to the thickness of the membrane element 908. Thus, the studs 904 can extend through the holes 910 in the membrane elements 908 so as to contact an adjacent spacer 900 through the membrane element 908. The spacers 900 and membrane elements 908 can be sealed together with an adhesive layer 918. The adhesive layer 918 can encircle each of the studs 904 at the active surfaces of the membranes 912, so as to seal the membrane surfaces near the permeate opening 910 and the holes 916 and maintain the fluid separation between the feed water sides and the permeate sides of the membranes 912. Such a configuration can maintain the desired spacing between adjacent membrane elements 908 while limiting the amount of compression on the membrane elements 908 themselves, which can in some cases lead to pinching the permeate spacer and blocking the flow of permeate to the permeate collection channel. Such a configuration can also add rigidity to a membrane stack, especially in a large stack with several membrane elements. Such a configuration can further allow for maximization of packing density while maintaining an "open" membrane configuration.

In some embodiments, the adhesive layer 918 can comprise an adhesive which is selected to be nonrigid, somewhat flexible, and/or somewhat compressible when dry. Epoxy and polyurethane are examples of suitable adhesives that may be used in embodiments. In some embodiments, a studded spacer can comprise a single piece of any suitable material, such as, for example, molded plastic. In other embodiments, a studded spacer can include a spacer body and studs comprising different materials which are bonded together in any suitable fashion.

In one embodiment, a membrane stack may be constructed by providing a studded spacer, applying an adhesive to at least a portion of an upper surface of the spacer, aligning holes in a membrane element with holes and/or studs in the spacer, applying an adhesive on at least a portion of an upper surface of the membrane element, aligning a second spacer on top of the membrane element, and repeating the process with multiple spacers and membrane elements. In some embodiments, studded spacers can be positioned at the center of a membrane stack, while in other embodiments, studded spacers can be positioned at or near one or more edges of a membrane stack, such as, for example, the leading edge of a membrane stack near the feed water inlet.

Pressure Vessel

In embodiments of the invention, if gravity pressure is not available from a water source at a greater elevation than the system, the pressure differential (between the feed water side and the permeate side of the membranes) can be provided using one or more pumps. In certain embodiments, to contain the high pressure feed water surrounding the membranes, a pressure vessel 2 is provided. Such a vessel can be made of any suitable material such as steel, fiberglass or another composite. The structural configuration of the pressure vessel 2 can vary depending on the treatment goals and the characteristics of the membranes chosen for the particular application. Varying levels of pressure can be provided to remove varying percentages of dissolved solids. For example, with brackish water source (total dissolved solids at, say, 1,500 mg/l), where the goal is to remove 50% of the solids, tight NF membranes can be used with a feed water pressure of approximately 60 psi. With a soft water source having relatively low dissolved solids (under 100 mg/l), NF membranes can be used, with only 25 psi of feed water pressure. If removal of dissolved solids is not a treatment goal, ultrafiltration (UF) membranes can be selected and used with lower feed water pressures.

One embodiment of the pressure vessel is a cylindrical tank. In some embodiments, in order to accommodate the relatively large volume of the membrane cartridge(s), the vessel or tank can be provided with a rather large gateway or portal, such as a removable lid, in order to allow loading of the membrane elements into the vessel. In other embodiments, a series of relatively smaller membrane cartridges can be loaded through a relatively smaller gateway or portal in the vessel wall, and then moved into position within the tank. In some embodiments, the gateway or portal can comprise a flange with a gasket.

With reference now to FIGS. 6A through 6D, in some embodiments, feed water can be supplied to the vessel through an inlet 8, and concentrate can be removed from the vessel through an outlet 9. The inlet 8 and outlet 9 can be positioned so as to avoid short-circuiting from the inlet 8 to the outlet 9.

In the embodiment shown in FIG. 6A, the membrane cartridge spans across the entire cross section of the pressure vessel 19. In this embodiment, a baffle 20 is disposed inside the vessel 19 in such a manner as to effectively split the open area into two regions. The impeller 7 is arranged to draw water from the region above the impeller down into the region below the impeller, creating circulating flow inside the pressure vessel. Feed water is thus directed between the spaced-apart membranes of the membrane cartridge generally in one direction in one half of the cartridge, and generally in the opposite direction in the other half of the cartridge. The circulation of the water to be treated is bi-directional, as indicated by the dashed arrows in FIG. 6A. Feed water moving in both directions flows past the membranes in the same vessel. In some embodiments, the membranes cartridges can be structurally coupled to a lid of the pressure vessel 19. In the illustrated embodiment, the lid of the pressure vessel runs along the length of the vessel and includes two permeate channels 5 extending therethrough. In some embodiments, the permeate outlet 5 can communicate with atmospheric pressure outside of the vessel, thereby providing a pressure differential between the vessel pressure (i.e., the pressure of the water to be treated) and the pressure on the product water side of the membrane to drive the filtration process. In other embodiments, a separate vent or port can be provided to communicate atmospheric pressure to the permeate channel. Removal of this lid will also serve to remove the membrane cartridge attached thereto. The lid is represented in the two cross sections in FIG. 6 (longitudinal cross section and horizontal cross section) as the top part of the vessel cross sections between the flange marks 22.

FIG. 6B is an end view cross section of the embodiment shown in FIG. 6A, looking in the direction shown by the arrows A in FIG. 6A. Here can be seen the permeate collection channel 5 penetrating the membrane cartridge as well as the flange 22 extending about the lid of the vessel 19. FIGS. 6C and 6D show plan views of alternative baffle and impeller configurations that can be disposed in the vessel 19 of in FIG. 6A. The baffle 20 of FIG. 6C is disposed within the open space at the end of the vessel 19, outside of the space occupied by the membrane cartridges. In such a configuration, one of the membrane elements 3 can act as a divider encouraging bi-directional flow in different portions of the vessel. FIG. 6D shows an alternative baffle 20 that can be integrated into the membrane cartridge configured to divide the bi-directional flow along the entire length of the vessel. In the embodiment shown in FIG. 6D, the permeate collection channels can penetrate the baffle 20 through holes 34 in the baffle 20. The impeller 7 in FIG. 6A is shown without its drive shaft in order to better illustrate other features of this embodiment. The impeller 7 can be driven by an internal motor, or by an external motor with the drive shaft penetrating the vessel wall and sealed from the outside environment.

Figure 8:
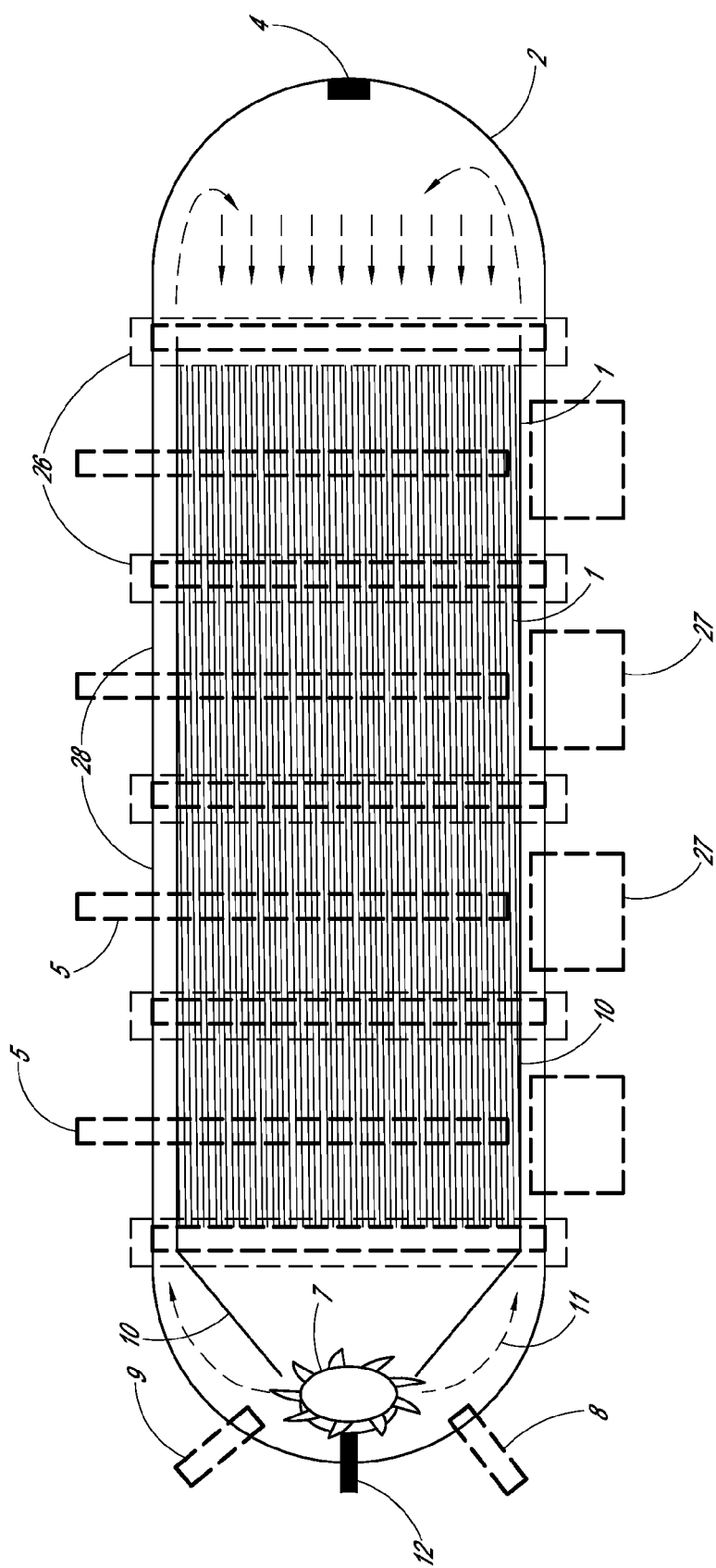
FIG. 8 is a cross section of a water treatment system according to another embodiment.

A further embodiment of the system is shown in FIG. 8, in which the pressure vessel comprises four sections 28. Each section 28 can be pre-loaded with membrane cartridges 1 attached to each section. The vessel/membrane sections can be configured similar to the embodiments shown in FIGS. 1 and 2, with one or more areas occupied by membranes and with one or more open areas for re-circuation of feed water within the section. Each section of the vessel can be connected and sealed to its adjacent section(s) by a suitable connection 26, such as a Victaulic coupling, flange, or other suitable coupling. Further, each vessel section can have a dedicated permeate penetration 5 extending through the vessel wall, so that each vessel section 28 can operate independently of the others for essentially all functions except feed water supply and recirculation. By such a configuration, embodiments allow easy repair and replacement of membrane sections, as the section to be replaced can be removed while the other sections remain in place. These embodiments also allow for separate monitoring of membrane integrity in each section as the permeate of each section can be monitored and shut off independently if a leak or other malfunction is detected. These embodiments further allow for pre-fabrication of the vessel sections 28 loaded with membrane cartridges, so that there is no requirement to have on-site personnel entering large vessels to install membrane cartridges. Each section of this horizontal vessel can be provided with one or more external supports 27 configured to bear the weight of the vessel section 28, its corresponding coupling 26, and its corresponding membrane cartridge(s) and permeate pipe(s). Similarly, each section can be provided with its own vibration transducer configured to keep the membranes clean. The vessel sections 28 can be made of any suitable material, such as steel, fiberglass or other composite material. The sections 28 can be cut and outfitted to accommodate the membrane cartridges. With such a configuration, a vessel section can be replaced with a spare already loaded with membranes or, if a membrane-filled spare section is not available, a blank section without membranes can be used to bring the system back online quickly but with some reduced capacity. A quick coupling Victaulic-type connection 26 can be used between sections to minimize associated downtime.

Figure 9:
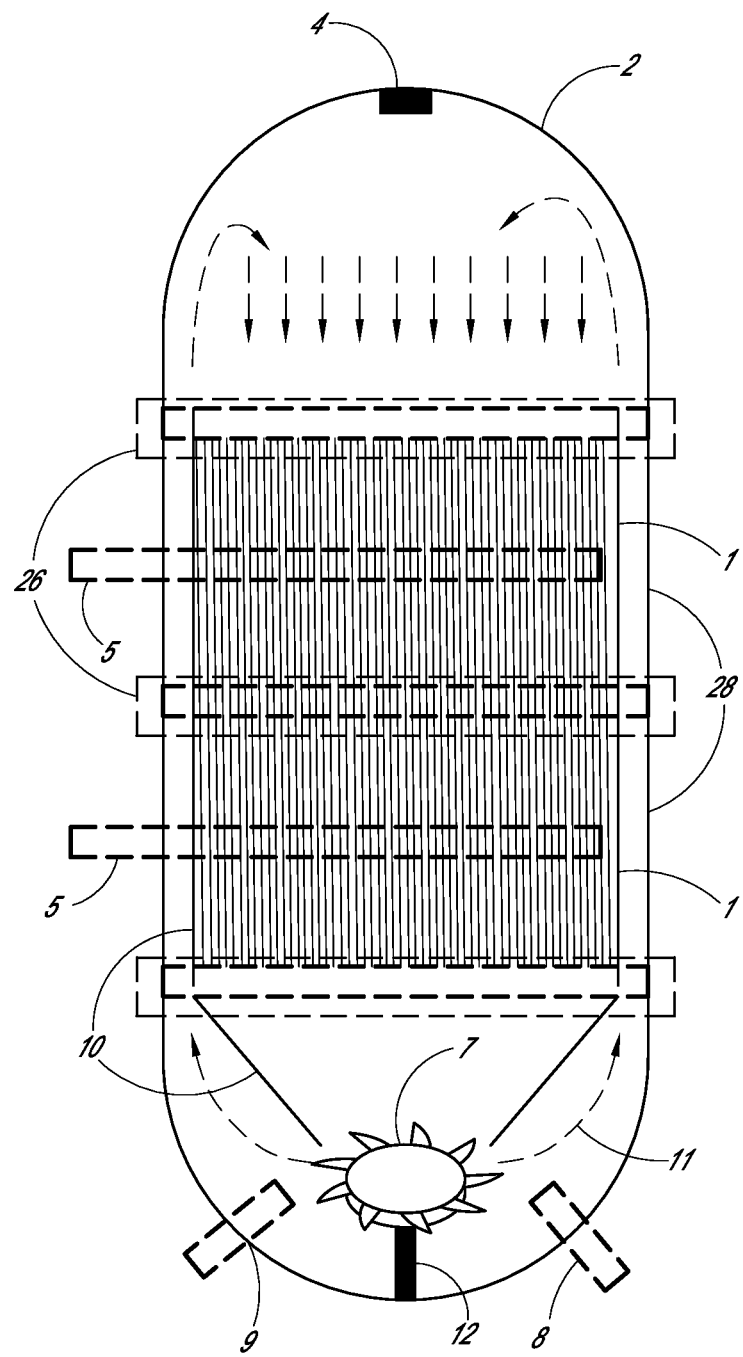
FIG. 9 is a cross section of a water treatment system according to a further embodiment.

Another embodiment of a sectional pressure tank system is shown in FIG. 9, in which adjacent cartridges are arrayed vertically. This configuration of the sectional pressure vessel allows for a smaller footprint as the membrane/vessel sections 28 can be stacked higher than structurally feasible for the horizontally-arrayed system in FIG. 8.

In some embodiments, alternatives to a conventional cylindrical pressure vessel can be employed to save space, reduce piping and connections requirements, improve flow dynamics, and provide structural integrity with less material than would otherwise be required with a conventional cylindrical shape. Such embodiments can be used to advantage to reduce costs and make high cross-flow velocity systems economical for far more membrane applications than conventional vessel designs.

In some embodiments, a pressure vessel can be partitioned into multiple segments, with each segment defining a flow path for feed water. In some embodiments, the different segments within the same pressure vessel can be fluidly connected, for example at the ends of the pressure vessel, so as to define multiple flow paths for the feed water within the pressure vessel. In some embodiments, the multiple flow paths can extend in parallel (but opposing) directions. In some embodiments, the multiple segments can be isolated from one another using one or more partitions (also "dividers" or "dividing walls") extending longitudinally between longitudinal ends of the vessel and radially between opposing sides of the vessel wall. In some embodiments, the partition or partitions can be connected to the vessel wall in such a manner as to transfer at least tensile forces from the outer vessel wall to the partitions, enhancing the structural integrity of the vessel and allowing the use of a relatively thinner outer vessel wall (and/or use of materials having a lower tensile strength) than would otherwise be required without the flow path dividers. In particular the dividers bear tensile load from the outer walls. By providing multiple flow paths within the same vessel, and flow-path dividers configured to impart structural strength to the outer walls of the vessel, embodiments can save significant cost and complexity, reduce membrane fouling, and reduce points of failure for piping to and from the vessel as compared to a conventional design.

Figure 27C:
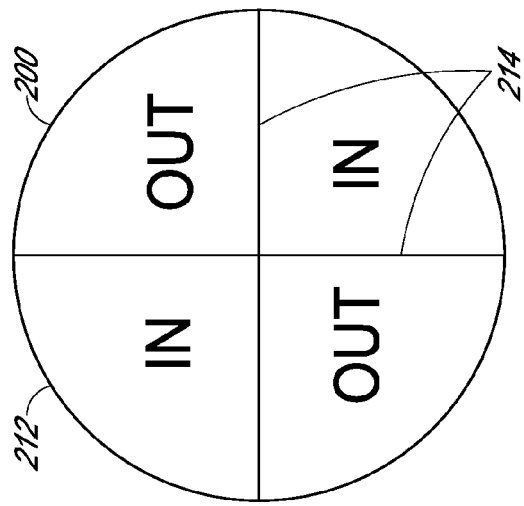
FIG. 27C shows an example of how multiple flow paths in a vessel can be directed, according to an embodiment.
Figure 27B:
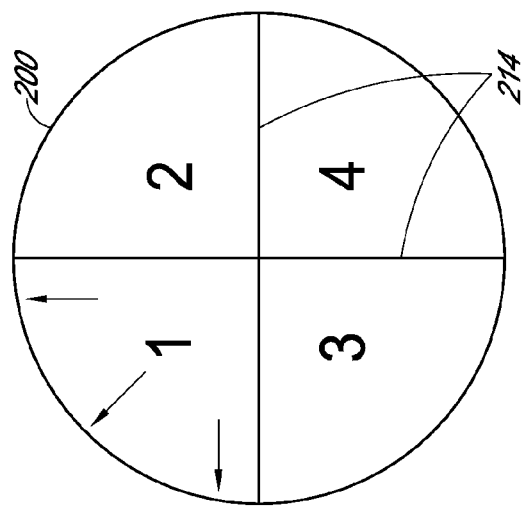
FIG. 27B shows a cross section of a cylindrical vessel according to an embodiment.
Figure 27A:
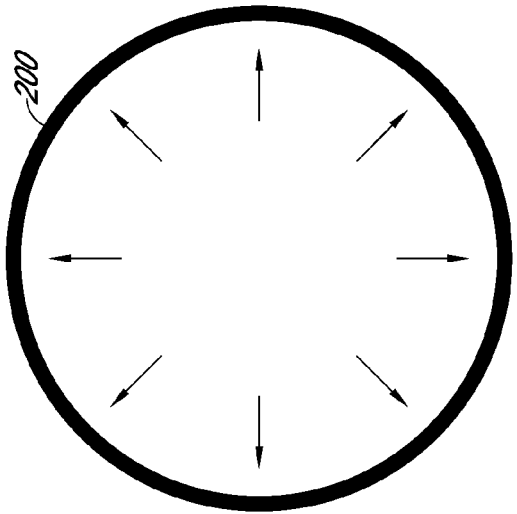
FIG. 27A shows a cross section of a conventional cylindrical vessel with walls designed to bear the inside-out pressure (or operating pressure) applied to the feed solution.

FIG. 27A shows a cross section of a conventional cylindrical vessel 200 with a wall designed to bear the inside-out pressure (or operating pressure) of the vessel. In the vessel 200, the outer wall bears all of the vessel force equally around its circumference. In contrast, FIG. 27B shows a cross section of a cylindrical vessel 210 according to an embodiment. The vessel 210 includes an outer wall portion 212 and internal dividers 214 that are structurally connected to the outer wall portion 212—for example, by welding—so as to transfer at least tensile forces from the outer wall portion 212 to the dividers 214. By such a configuration, the tensile load-bearing cross braces 214 limit or prevent the forces in segments 2, 3 and 4 from being transferred to the wall of segment 1. Because the dividers 214 serve to bear much of the tensile load in the vessel 210, allowing the outer wall portion 212 to be fabricated using less material (for the same vessel operating pressure) than the conventional vessel design shown in FIG. 27A. In the embodiment shown in FIG. 27B, each section of the outer wall portion 212 bridges a 90 degree arc, rather than the entire 360 degrees of a cylinder as in FIG. 27A, allowing the embodiment of FIG. 27B to contain the same pressure as the conventional design of FIG. 27A, but using less material for the outer wall portion 212 (e.g., ¼ of the thickness used in the conventional design of FIG. 27A). Below are example calculations that show potential material savings that can be achieved by embodiments:

TABLE 1

| | Conventional design (see FIG. 27A) | Segmented design (see FIG. 27B) |
|---|---|---|
| Wall thickness (t) | 1 | 1/4 |
| Diameter (d) | 1 | 1 |
| Material (M) per unit of vessel length | circumference: $\pi d t = 3.14159\ldots$ | circumference + dividers: $\pi d t + 2 d t = 1.2854$ |
| Material Savings | | =41% of the material used in the conventional design |

In the vessel 210, the dividers 214 can be configured to divide the interior of the vessel 210 into multiple flow paths, which can be fluidly connected at the longitudinal ends of the vessel 210. By such a configuration, the segmented vessel 210 can define up to four times the flow path length than the conventional design shown in FIG. 27A. FIG. 27C shows an example of how the multiple flow paths in the vessel 210 can be directed: flow can be directed in a first direction (into the page) in the upper left quadrant, a second direction (out of the page) in the upper right quadrant, again in the first direction (into the page) in the lower right quadrant, and again in the second direction (out of the page) in the lower left quadrant. By such a configuration, for example, a two meter long vessel can incorporate eight meters of feed water travel distance.

Figure 28A:
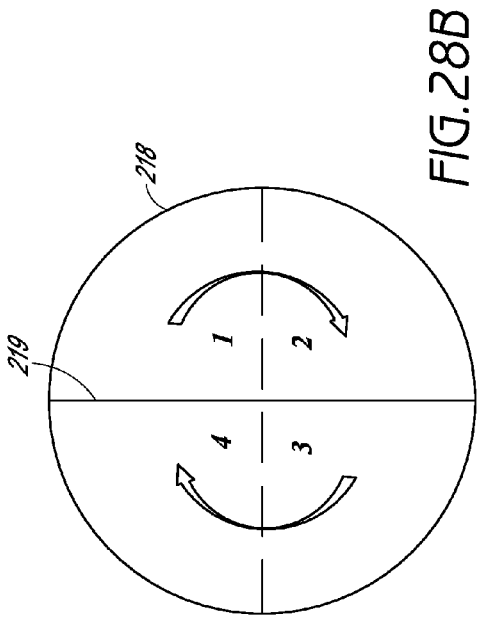
FIGS. 28A and 28B show one possible configuration of end caps configured to direct the flow of feed water at the longitudinal ends of a vessel according to an embodiment.
Figure 28B:
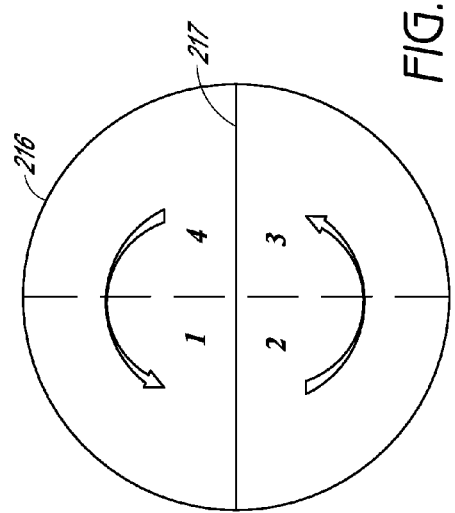

FIGS. 28A and 28B show one possible configuration of end caps 216, 218 configured to direct the flow of feed water at the longitudinal ends of the vessel 210. The first end cap 216 includes a horizontally-extending divider 217 which directs feed water from the second quadrant into the third quadrant, and from the fourth quadrant into the first quadrant. The second end cap 218 includes a vertically-extending divider 219 which directs feed water from the first quadrant into the second quadrant, and from the third quadrant into the fourth quadrant. The dashed lines in FIGS. 28A and 28B outline channels defined by the dividers 214 in the body of the vessel 210. In some embodiments, the feed water can travel back and forth within the vessel 210, from the first through fourth quadrants in sequence. At the end of the fourth quadrant, the feed water can either be re-circulated back into the first quadrant (as implied by the upper arrow in FIG. 28A) or removed from the vessel 210.

Figure 29A:
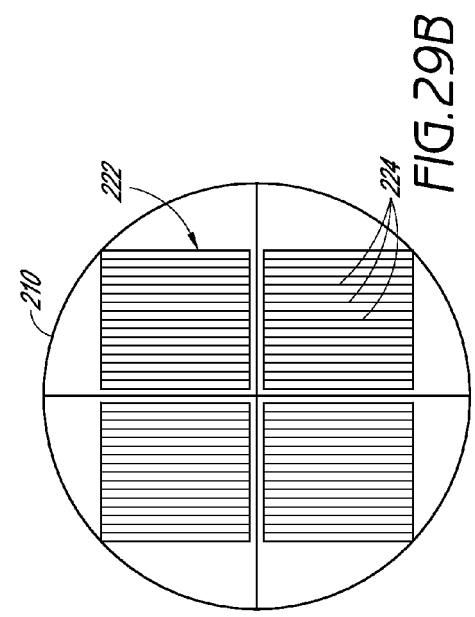
FIGS. 29A and 29B show examples of different configurations of membrane elements that can be housed within a vessel according to various embodiments.
Figure 29B:
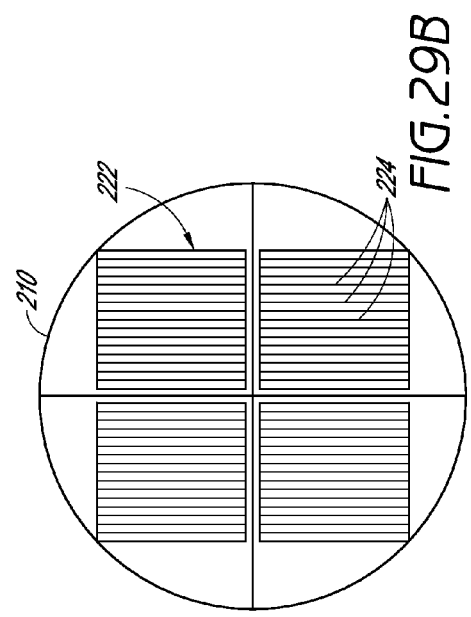

Several different configurations of membrane elements can be housed within the vessel 210 shown in FIG. 27B. For example, in some embodiments, as shown in FIG. 29A, spiral-wound membrane modules 220 having a generally cylindrical configuration can be disposed within each quadrant of the vessel 210. In some embodiments, baffling can be provided in the unoccupied spaces. In other embodiments, a stack 222 of parallel plate-and-frame type membrane elements 224 (or other membrane elements having a generally planar configuration) can be disposed in each quadrant of the vessel 210. In some embodiments, the planar membrane elements can extend along the full length of the cylindrical portion of the vessel 210, from the first end cap 216 to the second end cap 218. Within each stack 222 of membrane elements 224, the elements 224 can have a uniform size and shape, as shown in FIG. 29B. In some embodiments, each stack 222 can include membrane elements 224 of varying sizes and/or shapes, to better fit the cross-sectional shape of each quadrant in the vessel 210. In some embodiments, each stack 222 can comprise a number of planar, parallel membrane elements arranged in a vertical orientation and separated from one another using either a continuous feed water spacer sheet or one or more discrete feed water spacing elements. A vertical orientation can assist in mitigating particle settlement on the surfaces of the membranes. A spacing of more than 1 mm between membrane elements can be employed to allow for a consistent cross flow velocity in the feed water, reduce longitudinal headloss, and reduce fouling and particle settlement on the membranes. In some embodiments, the membrane elements can be spaced apart from one another by 2 mm or more.

Figure 30A:
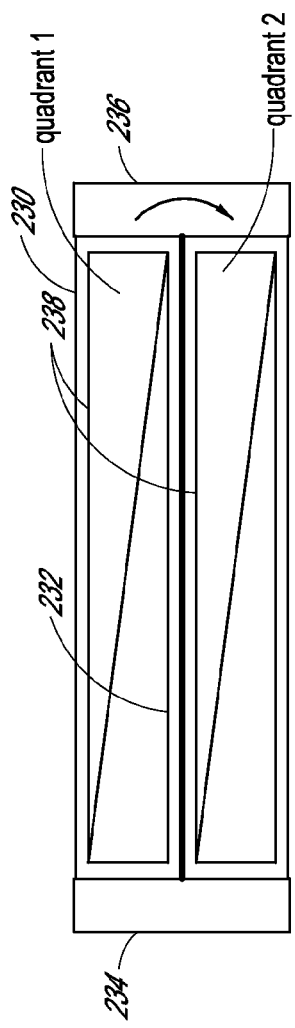
FIGS. 30A-30C show plan, near end, and far end cross-sectional views, respectively, of a vessel having a rectangular cross-sectional shape, according to an embodiment.
Figure 30C:
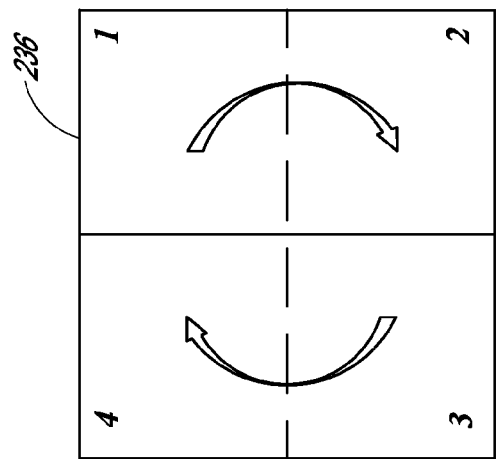
Figure 30B:
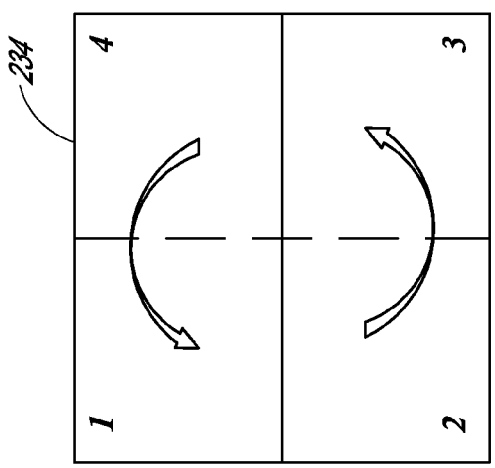

In some embodiments, a vessel can have a different cross-sectional shape than the circular cross-sectional shape of the cylindrical vessel 210 shown in FIG. 27B. For example, as shown in FIGS. 30A-30C, a vessel 230 is shown having a rectangular cross-sectional shape. The vessel 230 includes two dividers 232 extending longitudinally (one vertically, one horizontally) along the length of the vessel 230 and across the entire height and width of the vessel 230, from a first end cap 234 to a second end cap 236. The dividers 232 separate the vessel 230 into four different sections or quadrants, to define four separate flow paths for feed water through the vessel 230. The first end cap 234 is configured to direct flow from the fourth quadrant into the first quadrant, and from the second quadrant into the third quadrant. The second end cap 236 is configured to direct flow from the first quadrant into the second quadrant, and from the third quadrant into the fourth quadrant. Along the length of the vessel 230 (between the end caps 234, 236), the dividers 232 are structurally connected to the outer wall portion of the vessel 230 so as to bear at least tensile loads from the outer wall portion. In FIG. 30A, the vessel 230 houses a stack 238 of rectangular, planar, plate-and-frame-type membrane elements in each quadrant. For these types of membrane elements, such a vessel configuration can advantageously minimize the amount of space in each quadrant that is not occupied by membranes. In these and other embodiments, the vessel and end caps can be formed from any suitable material, including, for example, reinforced fiberglass, composite materials, or steel.

Figure 31C:
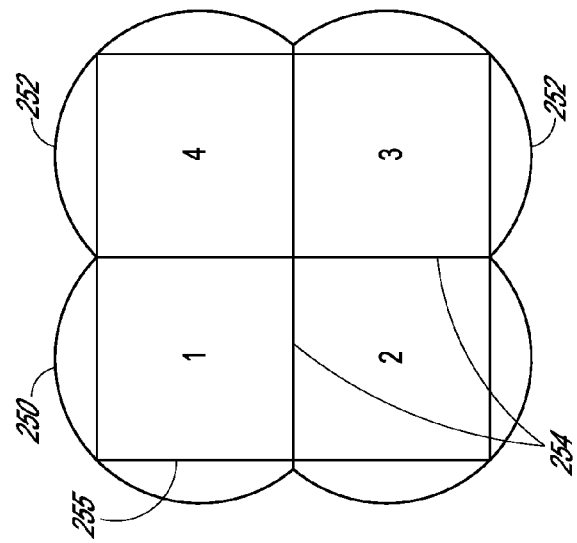
FIG. 31C is a cross-section of a vessel according to an embodiment.
Figure 31B:
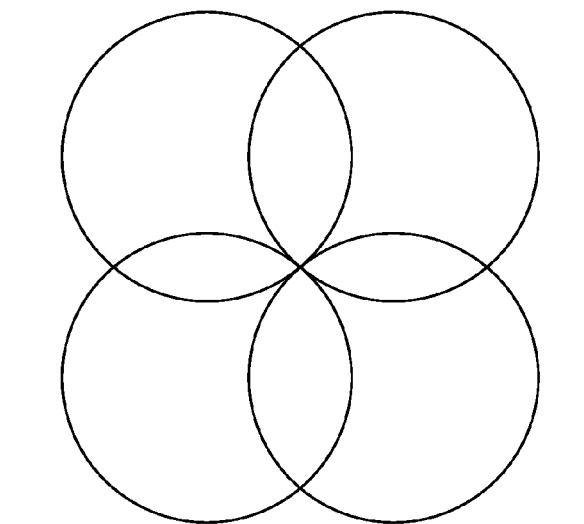
FIGS. 31A and 31B are schematic drawings illustrating the derivation of the geometry of one example of a pressure vessel, for example as illustrated in FIG. 31C.
Figure 31A:
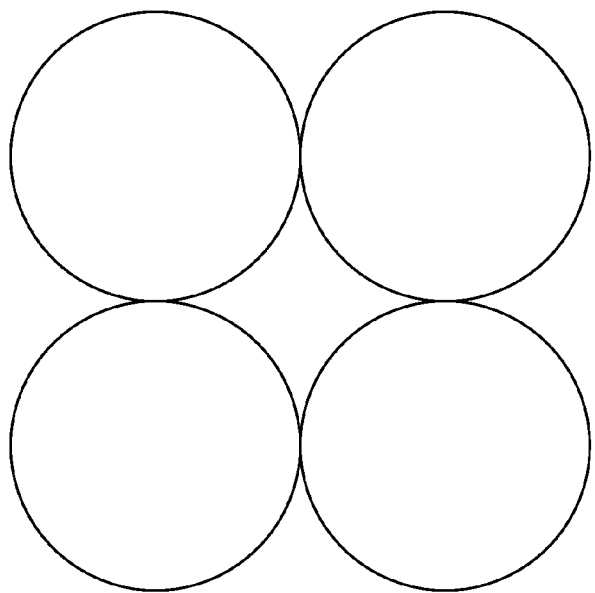

FIGS. 31A and 31B show the derivation of yet another alternative geometry for a pressure vessel 250 which is shown in cross-section in FIG. 31C. The geometry of the vessel 250 derives from four separate cylinders (of circular cross-section), as shown in FIG. 31A. FIG. 31B shows the four separate cylinders overlapping to contact one another tangentially at a central point. The outer perimeter of the cylinders in this configuration forms the cross-sectional geometry of the vessel 250 shown in FIG. 31C. As shown in FIG. 31C, the vessel 250 has a cross-section defined by four semi-circular arcs 252. The vessel 250 also includes dividing members 254 configured to separate the interior of the vessel 250 into four separate segments or quadrants, with each semi-circular arc 252 forming the outer wall of one of the quadrants. The dividing members 254 are connected to the semi-circular arcs 252 of the outer wall of the vessel 250 so as to bear tensile load from the arcs 252. The vessel 250 further includes reinforcing members 255 extending perpendicularly to the dividing members 254. The reinforcing members can connect to the ends of the dividing members 254, the ends of the semi-circular arcs 252, and also to points along the semi-circular arcs 252. The reinforcing members 255 can extend continuously along the length of the vessel 250, or can comprise truss-like support members disposed at discrete locations along the length of the vessel 250. The configuration illustrated in FIG. 31C and other similar configurations can efficiently accommodate a stack of plate-and-frame-type membrane elements (that is, with little space in each quadrant not occupied by membranes), while taking advantage of the strength provided by the arched shape of the outer walls.

TABLE 2

| | 4-cylinder design (see FIG. 31A) | Segmented arched design (see FIG. 31C) |
| --- | --- | --- |
| Wall thickness (t) | 1 | 1/4 |
| Diameter (d) | 1 | 1 |
| Material (M) per unit of vessel length | 4πdt = 12.56637 | 2πdt + (12)(.707)(1.414)dt = 4.5614* |
| Material Savings | | =36.4% of the material used in the 4-cylinder design |

*The straight vessel wall portions must increase thickness by 1/cosθ or 1.4141 times as compared to the arched wall portions because the straight portions are not perpendicular to the arched portions.

Figure 31E:
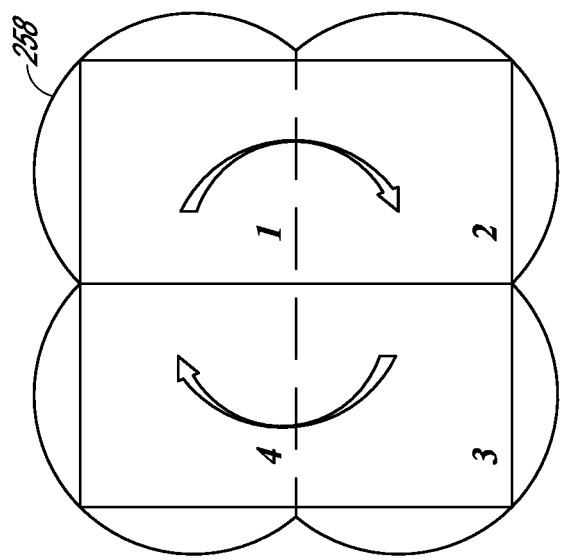
FIGS. 31D and 31E show cross-sectional views of examples of end caps that can be disposed at opposing longitudinal ends of the vessel shown in FIG. 31C.
Figure 31D:
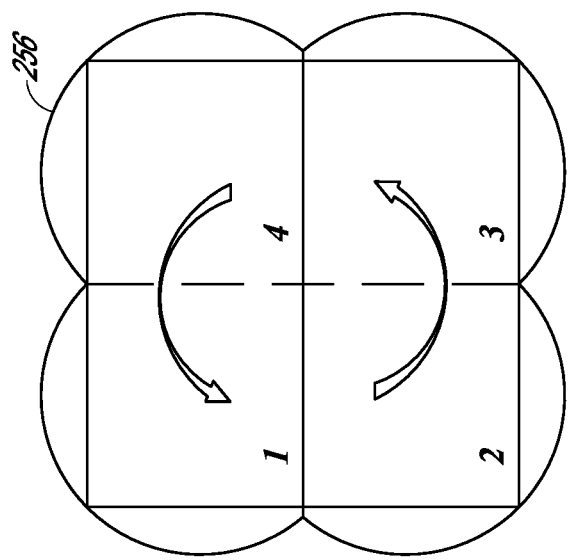

FIGS. 31D and 31E show end caps 256, 258 which can be disposed at opposing longitudinal ends of the vessel 250 and configured to direct flow among the quadrants in a similar fashion as illustrated in FIGS. 28A and 28B. In these and other embodiments, a support or cradle can be provided which is configured to distribute the weight of the liquid filled vessel along the bottom quadrants.

Figure 32:
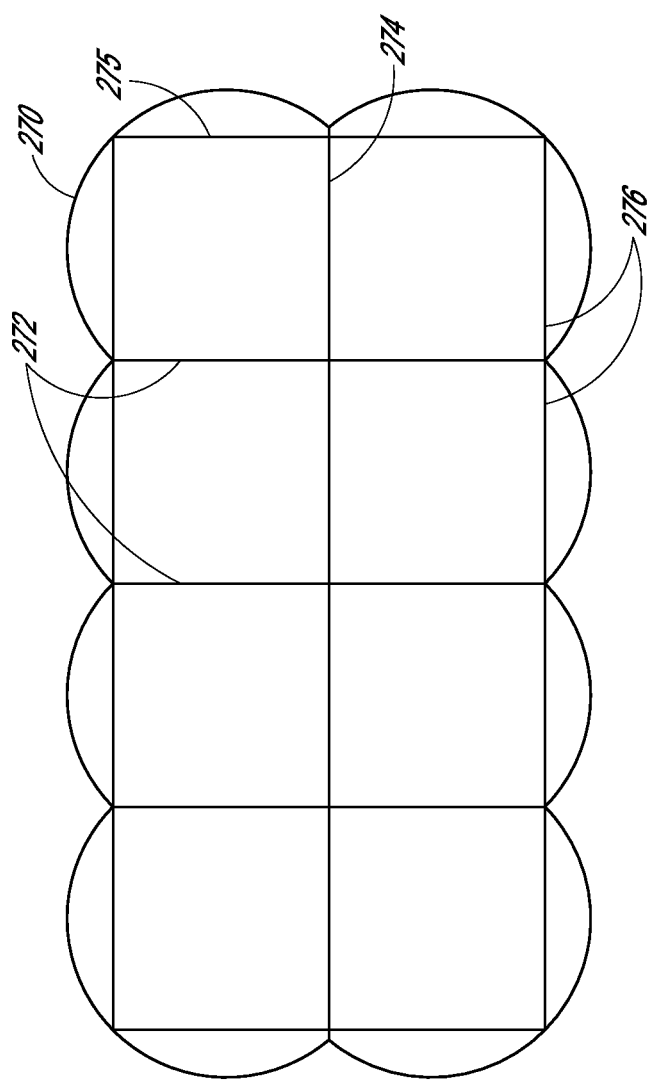
FIG. 32 is a cross-section of vessel according to another embodiment.
Figure 33:
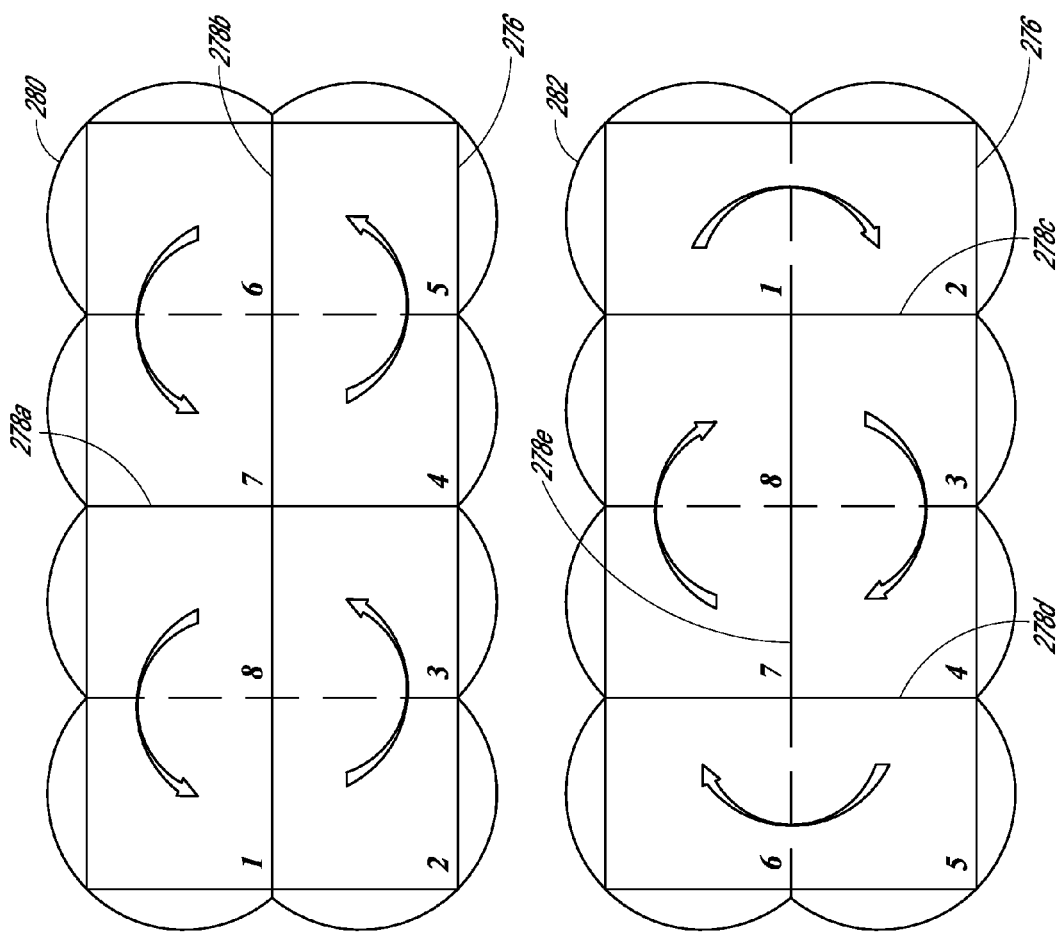
FIG. 33 shows cross-sectional views of examples of end caps which can be disposed at opposing longitudinal ends of the vessel shown in FIG. 32.

In some embodiments, the configuration illustrated in FIGS. 31A-31E can be expanded to include more flow paths. FIG. 32, for example, shows a vessel 270 having a cross-sectional geometry similar to that of the vessel 250, but with eight segments instead of four. Three vertically oriented dividers 272 and a single horizontally extending divider 274 are connected to the outer wall of the vessel 270 (as well as to one another) in such a way as to transfer load from the outer wall to the dividers 272, 274. The dividers 272, 274 divide the vessel 270 into eight separate segments, each of which can accommodate a stack 276 (or other arrangement) of membrane elements. The vessel 270 further includes reinforcing members 275 extending perpendicularly to the individual dividing members 272, 274. The reinforcing members can connect to the ends of the dividing members 272, 274, as well as to points along the outer wall of the vessel 270. The reinforcing members 275 can extend continuously along the length of the vessel 270, or can comprise truss-like support members disposed at discrete locations along the length of the vessel 270. In some embodiments, the vessel 270 can include multiple injection points for feed water along the length of the vessel 270. By such a configuration, a more uniform feed water velocity and concentration can be achieved throughout the system (as opposed to a system in which feed water is injected only at the start of the circuit), further inhibiting fouling of the membranes. Calculations similar to those shown in Table 2 above reveal that such a configuration can be formed using only 30% of the material that would otherwise be required in an 8-cylinder configuration. FIG. 33 shows end caps 280, 282 which can be disposed at opposing longitudinal ends of the vessel 270 and configured to direct flow among the eight segments in a similar fashion as illustrated in FIGS. 28A and 28B. The end cap 280 includes a vertically extending separator 278a and a horizontally extending separator 278b which together direct the flow between quadrants as indicated by the arrows in the upper figure. Similarly, the end cap 282 includes two vertically extending separators 278c, 278d and a horizontally extending separator 278e which together direct the flow between quadrants as indicated by the arrows in the lower figure. The configuration shown in FIG. 32 can serve to reduce expensive piping and fitting requirements as opposed to a configuration employing eight separate vessels connected end-to-end.

Figure 36:
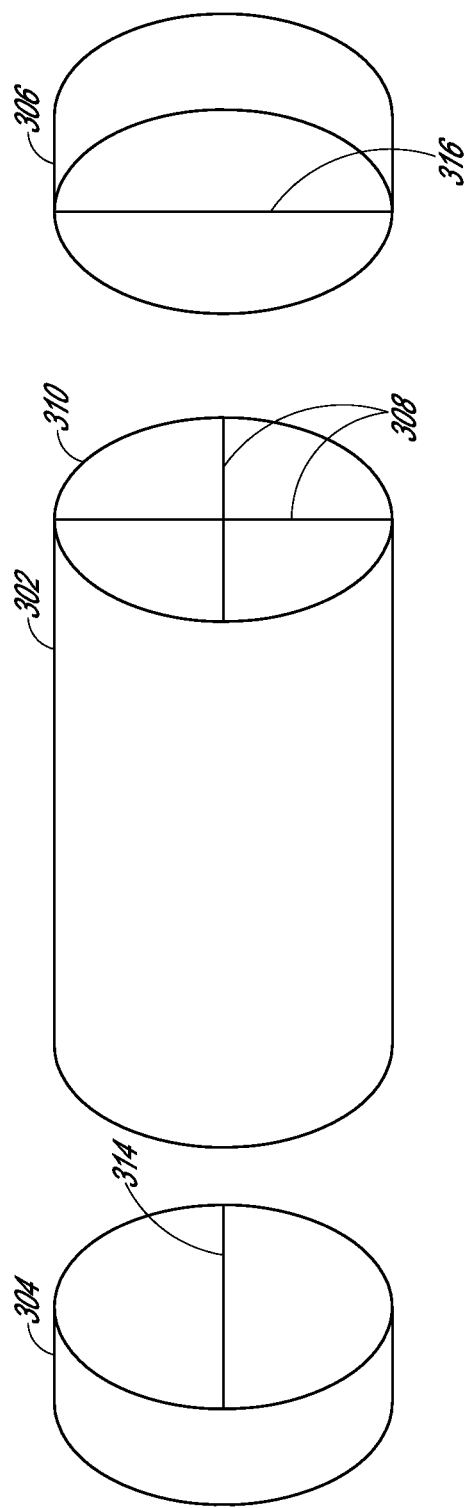
FIG. 36 shows a schematic exploded view of a vessel according to an embodiment, including near end, main body, and far end portions.

FIGS. 36A-36C show a schematic exploded view of a vessel 300 comprising a body portion 302 and two rounded end caps 304, 306. The body portion 302 and end cap 304 are shown from a left side view and the end cap 308 are shown from a right side view. The body portion 302 includes internal dividers 308 which separate the body portion into four different segments or flow paths, and which are also configured to bear loads from the outer wall 310 of the body portion. The end cap 304 includes a horizontally-extending cross member 314 which is configured to direct flow between the two upper segments and between the two lower segments of the vessel 300. The end cap 306 includes a vertically-extending cross member 316 which is configured to direct flow between the two left segments and between the two right segments of the vessel 300.

In addition to directing the flow changes through the various flow paths, in some embodiments, one or both of the end caps also house a pump, an impeller, propeller, or other structure configured to re-circulate the feed water through the vessel, to avoid channeling the feed water out of the vessel into a separate circuit with an external pump and the headloss associated therewith. In some embodiments, one or both end caps can be configured to accommodate various penetrations for the vessel system as desired for the particular application, such as a permeate outlet, a concentrate outlet and at least one feed water input.

Figure 34:
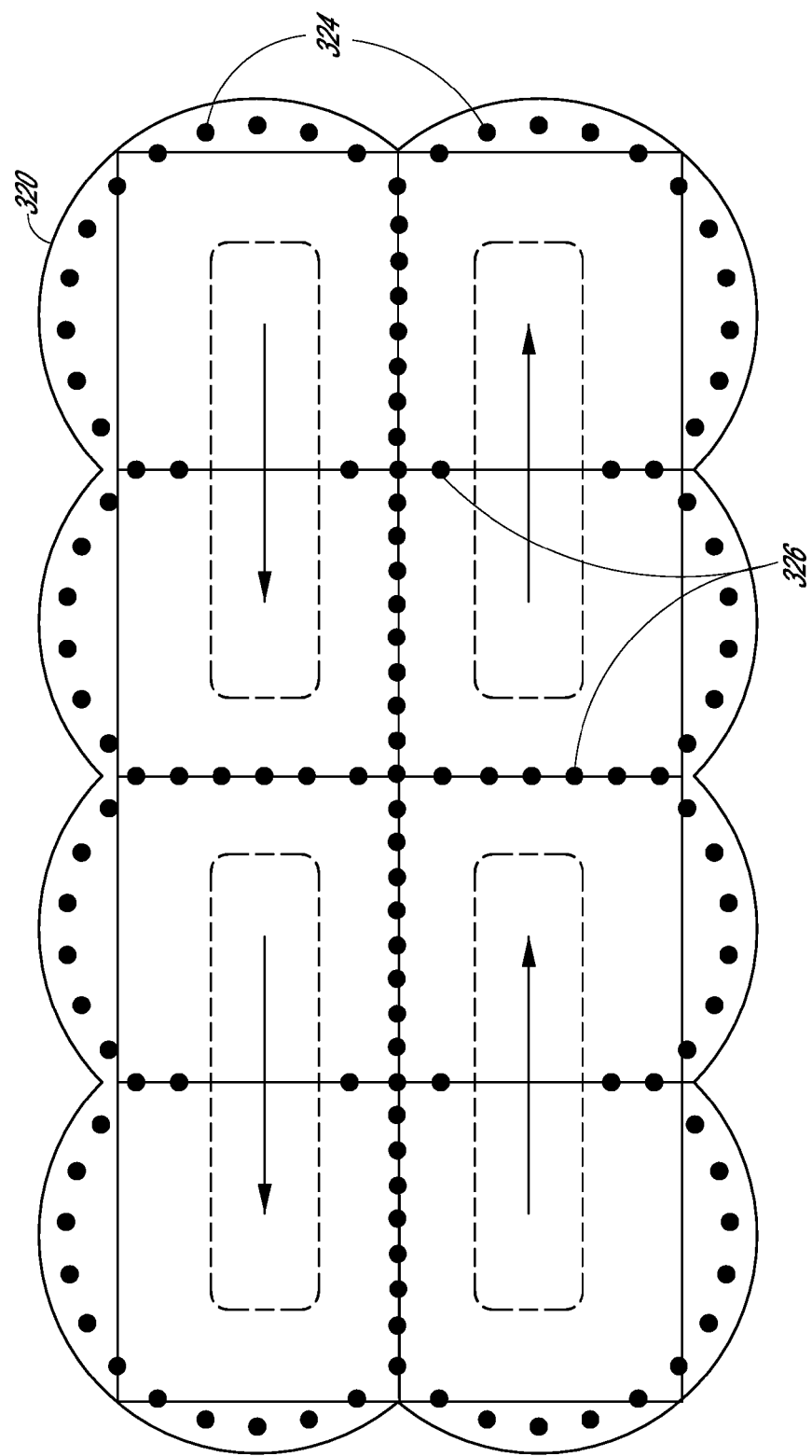
FIGS. 34 and 35 are schematic representations of another configuration of end caps which may be used in embodiments.
Figure 35:
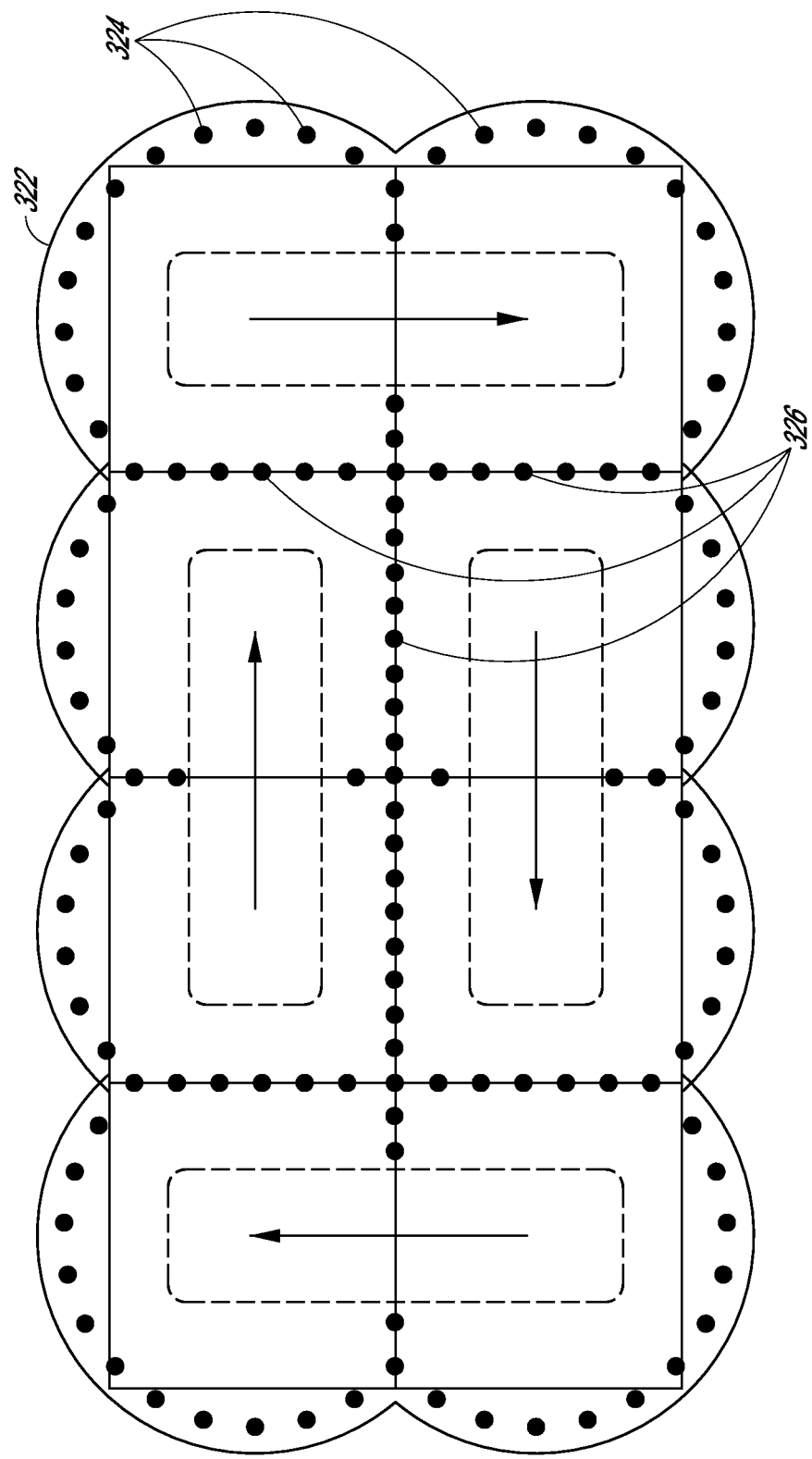

For a vessel having a larger number of segments, such as, for example, the 8-path vessel illustrated in FIG. 32, a larger end cap can be fabricated that includes structures configured to divert the flow between the various flow paths. FIG. 33 shows one possible configuration of end caps. FIGS. 34 and 35 show an alternative configuration of end caps 320, 322, with dots representing flange bolts (or other suitable fasteners) configured to fasten the caps 320, 322 to the vessel 270 and overcome the effects of the vessel pressure. As shown in FIGS. 34 and 35, the caps 320, 322 include both perimeter fasteners 324 arranged around the outer perimeters of the caps, as well as interior fasteners 326 configured to attach the end caps 320, 322 to the load-bearing dividers 272, 274 of the vessel 270. Such internal fasteners 326 can increase the structural integrity of the end caps 320, 322 considerably as compared to a configuration including perimeter fasteners only. In embodiments, the end caps can be connected to the vessel outer wall and to the vessel internal dividers in any suitable fashion, including, for example and without limitation, by welding, using flange bolts or other fasteners, or with a grooved fitting, as appropriate for desired ease of access, structural integrity and cost.

In some embodiments, a vessel, its internal segments, and its end caps can be configured so that two or more segments in an earlier (upstream) stage of the segment circuit feed into a single segment in a later (downstream) stage. Such a configuration can be used to maintain cross-flow velocity along the membrane circuit, without adding downstream injection points for feed water. In some such embodiments, one or both end caps can contain an integrated booster pump between the stages to overcome the overall longitudinal headloss of the system.

Figure 37:
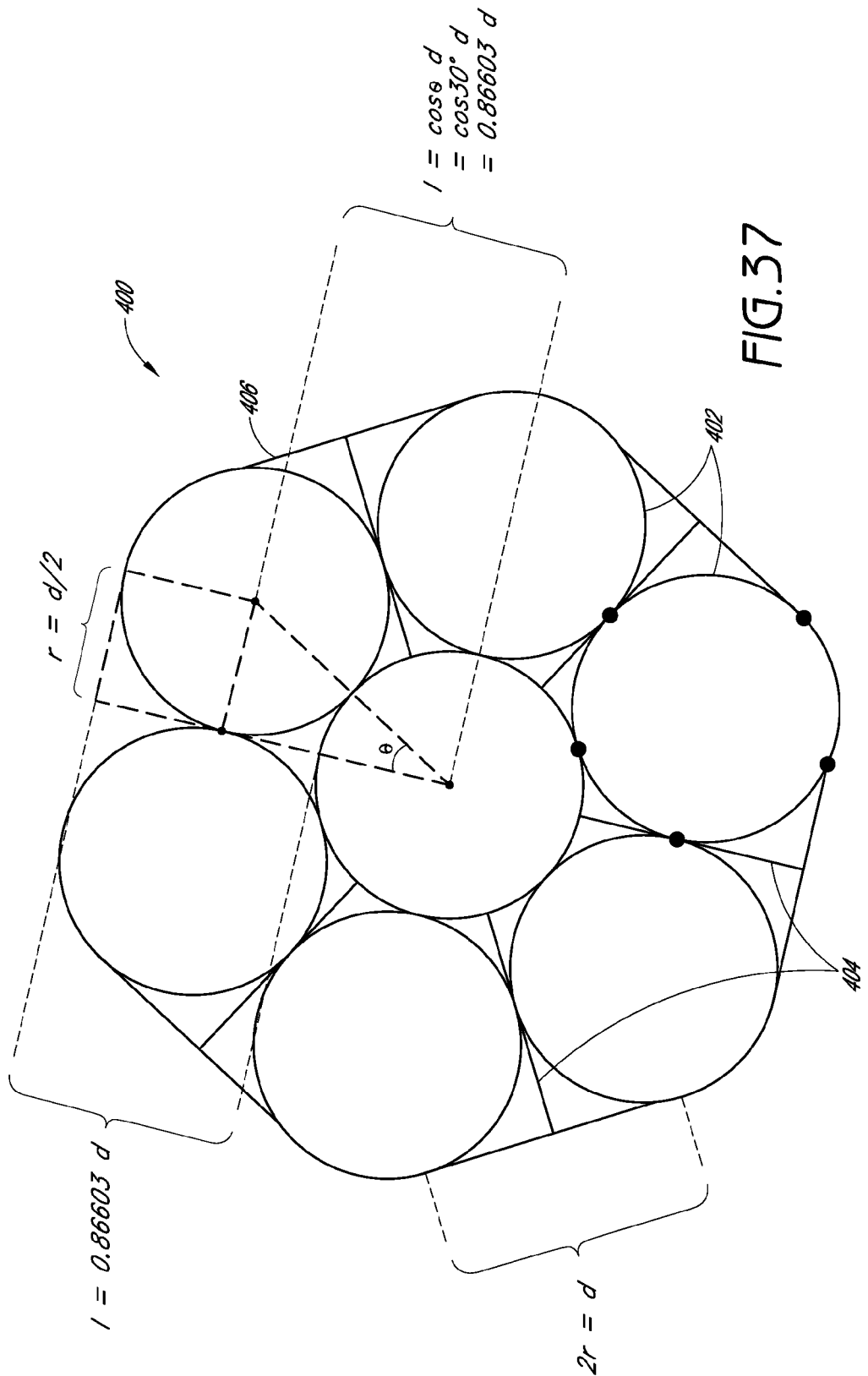
FIG. 37 shows a cross-section of an example of a hexagonal vessel, according to another embodiment.

FIG. 37 shows one example of a hexagonal vessel 400 including seven cylindrical segments, or flow paths, which are configured to accommodate cylindrical spiral-wound membrane cartridges 402. The vessel 400 includes flow path dividers 404 which bear tensile load from the outer wall 406 of the vessel 400. In one embodiment, the feed water can be directed down four of the flow paths in parallel, and then redirected at an end cap into the other three flow paths to return in the opposite direction. FIG. 37 also illustrates an example of the structural ties between one flow channel and the surrounding channels in the vessel 400. The dots in FIG. 37 represent points at which a cylinder can be supported by its surrounding cylinders and/or the outer wall 406 of the vessel 400. Calculations similar to those shown in Table 2 above reveal that such a configuration can be formed using only 30% of the material that would otherwise be required in a configuration using seven separate cylinders.

Figure 38:
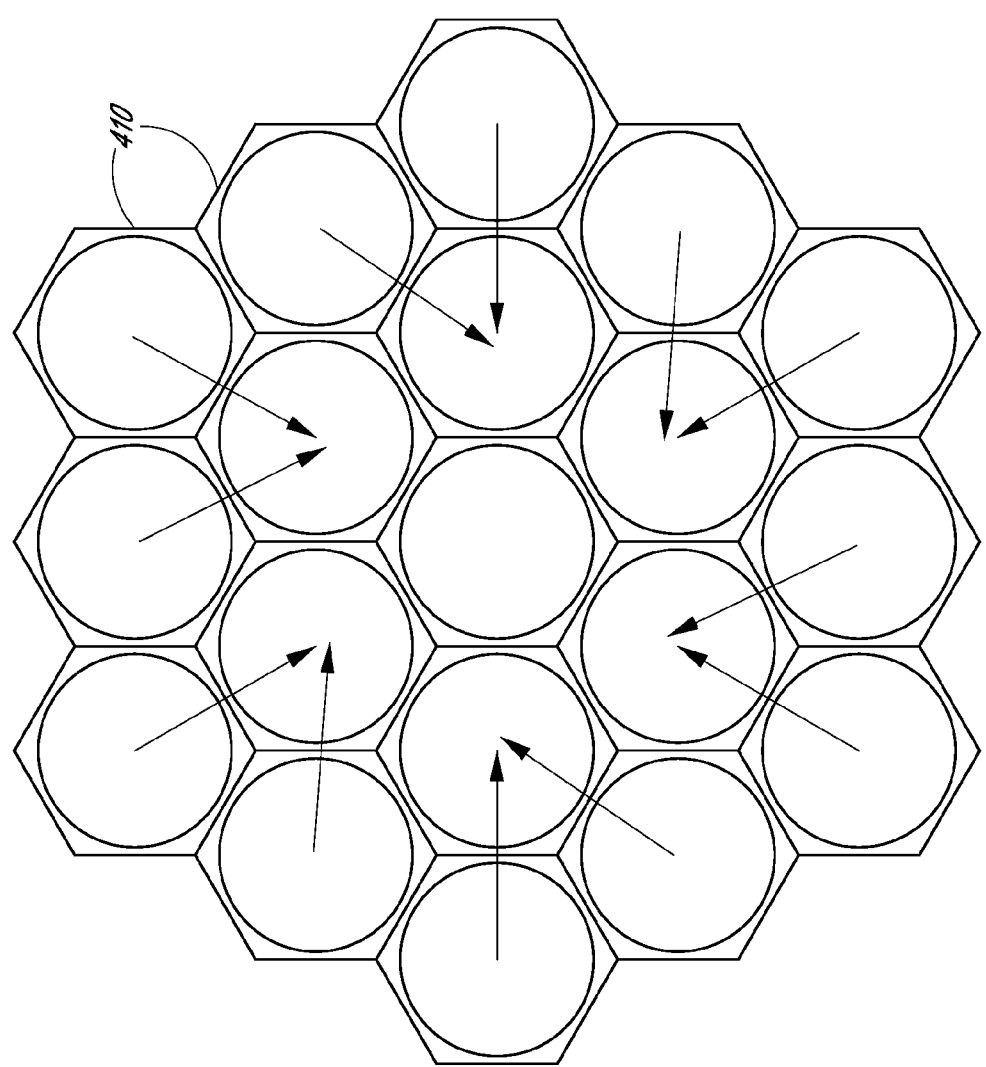
FIG. 38 shows a cross-section of another example of a hexagonal vessel.

FIG. 38 shows an extension of the hexagonal design including a number of individual hexagonal vessels 410, each of which is configured to accommodate one cylindrical membrane element, such as, for example, a spiral-wound membrane cartridge. These vessels 410 can be stacked immediately adjacent to each other and bound together to eliminate space between the individual vessels and impart strength by sharing interior walls. The vessels 410 can be bound together in any suitable manner. For example and without limitation, the adjoining surfaces of each vessel 410 can be glued together, or a series of bands or belts can be provided around the perimeter of the array of vessels and positioned at intervals along the length of the array. The bottom of the array can be supported by one or more pedestals configured to accommodate the particular shape of the bottom of the array. In some embodiments, the bands or belts can be attached to the pedestals.

In an embodiment configured to circulate feed water through the vessel more than once (a "re-circulation system") the number of adjoining vessels or vessel segments can be even, to allow for completion of the re-circulation circuit. In an embodiment configured to circulate feed water through the vessel only once (a "once-through system"), the number of adjoining vessels or vessel segments can be odd. A once-through system can involve a step-down in membrane area as feed water volume is reduced along the membrane circuit. In the embodiment shown in FIG. 38, the outer ring of 12 vessels can feed into the inner ring of six vessels. Put another way, the feed water can be directed in a first direction down the vessels in the outer ring. Then, at the end cap, the feed water in a pair of vessels from the outer ring can be redirected into a single vessel of the inner ring. The central vessel can optionally be used to house permeate collection hoses from the other vessels.

FIG. 39A illustrates an end view cross-section and a side view of another embodiment of a segmented vessel 500, with a vertically-extending dividing member 502 sealed together with first and second side walls 504, 506 of the vessel 500. The dividing member 502 divides the vessel 500 into two separate flow paths. The dividing member 502 is also connected to the side walls 504, 506 so as to bear tensile load from the side walls 504, 506 in a vertical direction. Four collector channels 508 are disposed within the vessel 500. The collector channels 508 extend in a direction normal to the dividing member 502. The collector channels 508 also bear tensile load from the side walls 504, 506, but are not continuous along the length of the vessel 500 as is the dividing member 502. Thus, the collector channels 508 act somewhat like studs that bridge the distance between opposing side walls and enhance the structural integrity of the vessel 500. In some embodiments, two collector channels can be provided for every one-meter length of membrane cartridge.

FIG. 39B illustrates an end view cross-section and a side view of yet another embodiment of a segmented vessel 550, with a vertically-extending dividing member 552 and a horizontally-extending dividing member 554 sealed together with an outer wall 556 of the vessel 550 so as to form four separate segments or flow paths in the interior of the vessel 550. The dividing members 552, 554 are connected to the outer wall 556 so as to bear tensile load from the outer wall 556 in the vertical and horizontal directions. Eight collector channels 558 are disposed within the vessel 550. The collector channels 558 extend in a direction normal to the vertical dividing member 552. The collector channels 558 also bear tensile load from the outer wall 556, but are not continuous along the length of the vessel 500 as are the dividing members 552, 554. Thus, the collector channels 558 act somewhat like studs that bridge the distance between opposing sides of the outer wall 506.

In-Vessel Recirculation

In some embodiments, one or more impellers or propellers can be disposed inside the vessel and configured to produce circulation of feed water past the surfaces of the membrane cartridges disposed inside the pressure vessel. One or more baffles can also be disposed inside the pressure vessel and configured to cooperate with the impeller or impellers to direct feed water in certain desired direction. The baffles can have any suitable shape and configuration within the vessel in order to, in combination with the impeller or impellers, create or encourage a general recirculatory flow path of the feed water through the vessel and past the membrane surfaces. The impeller can be configured to pull feed water from the membrane cartridges through and around the baffles. Such movement of the water will create a circulation of the water around and between the membranes. This circulation of the feed water will increase the cross-flow velocity past the membrane surfaces, thereby inhibiting particle settlement on the membrane elements. The impeller can be made of any suitable material such as, for example, stainless steel, plastic, fiberglass or carbon fiber. The impeller can have any number, shape, and orientation of blades consistent with its intended purpose. The impeller can be driven by a motor residing either inside the tank or outside the tank, with, for example, a sealed drive shaft penetrating the tank wall. The impeller can be configured to move a high volume of water at a low pressure.

Figure 1A:
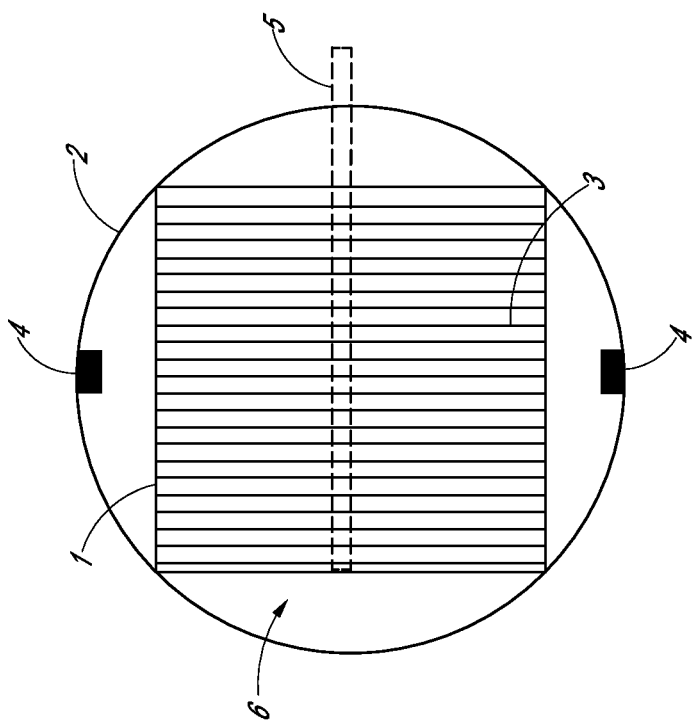
FIG. 1A shows a horizontal cross section of a water treatment system according to an embodiment, comprising a membrane system disposed in a pressure vessel.
Figure 2B:
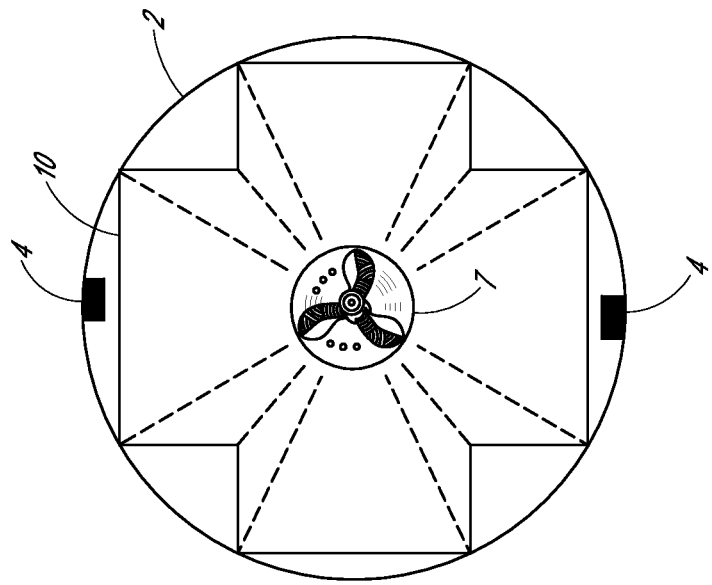
FIG. 2B shows the cross section of FIG. 2A with the membrane cartridge removed to better illustrate the baffle and impeller disposed within the pressure vessel.

In the embodiment illustrated in FIGS. 1A and 1B, the system includes a baffle 10 that comprises an outer peripheral surface of the membrane cartridge 1, and an extension surface that extends from one end of the membrane cartridge towards an impeller 7 disposed in an open area of the vessel 2 (FIG. 1B shows a cross section with the cartridge 1 removed, to better illustrate the configuration of the baffle 10). In the illustrated embodiment, the impeller 7 faces a direction generally parallel to the surfaces of the membranes in the cartridge 1. As the baffle 10 extends closer to the impeller 7, its cross section narrows from a rectangular shape at the end of the cartridge 1 to a circular shape around the impeller 7. By such a configuration, the baffle 10 serves to funnel feed water through the membrane-occupied area (through the cartridge 1 and between the membrane elements 3 that comprise the cartridge 1) and down toward the impeller 7 (into the page, in FIGS. 1A and 1B). The baffle 10 also serves to separate the flow of recirculating feed water in the open areas of the vessel (outside the cartridge) in the direction opposite the flow through the membrane-occupied area (out of the page, in FIGS. 1A and 1B). In some embodiments, the cartridge walls can form a portion of the baffle. In other embodiments, the baffle can comprise a sheet or sheets of water impermeable material covering the cartridge(s) and extending therefrom.

Figure 2A:
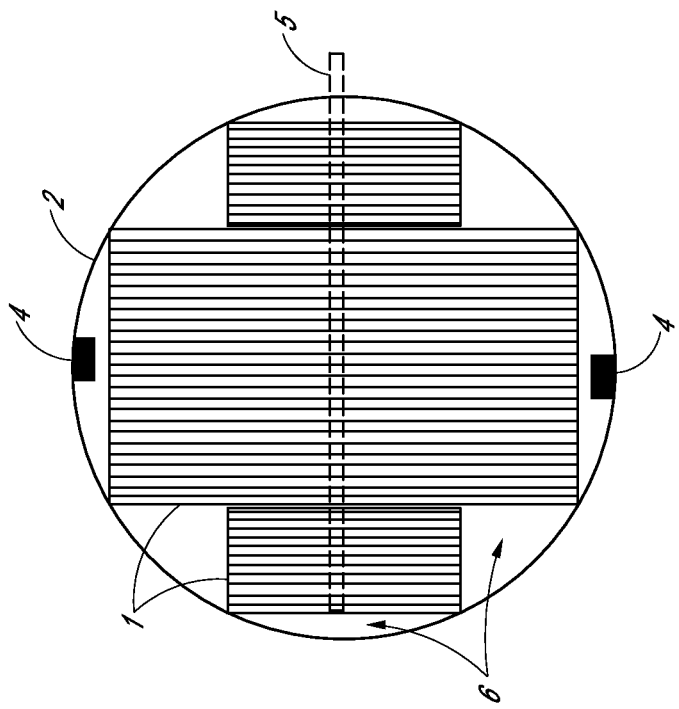
FIG. 2A shows a horizontal cross section of a water treatment system according to another embodiment.

FIGS. 2A (with the membrane cartridges 1) and 2B (with the membrane cartridges removed) show an embodiment in which the baffle 10 comprises an outer peripheral surface of three differently-sized membrane cartridges. As the baffle 10 extends away from the membrane cartridge 1 and toward the impeller 7, its cross-section narrows to ultimately encircle the impeller 7.

FIG. 3 illustrated a side cross-section of an embodiment, illustrating the frustoconical shape of the portion of the baffle 10 that extends between the cartridge 1 and the impeller 7.

FIGS. 6A through 6D show an alternative embodiment in which the impeller 7 faces a direction normal to the surfaces of the membranes 3 disposed inside the vessel. The impeller 7 is encircled by a baffle 20 which is configured to divide the open area at the left end of the vessel in two portions. As shown in FIG. 6C, in some embodiments, the baffle 20 extends roughly from the edge of the path defined by the rotating impeller 7, to the interior surface of the vessel wall in the open area and to the leftmost edge of the array of membranes 3 (see FIG. 6A) to direct flow generally to the right in the lower portion of the vessel, and generally to the left in the upper portion of the vessel. As shown in FIG. 6D, in some embodiments, the baffle 20 can extend through the array of membranes (toward the right in FIG. 6A) so as to define a first flow path to the right in the lower portion of the vessel, and a second flow path to the left in the upper portion of the vessel.

By recirculating or recycling feed water through the pressure vessel, a higher velocity is generated in the feed water past the membranes, assisting in preventing particles from settling on the membranes. In conventional systems, the cross flow velocity is generally determined by the recovery and flux of the system. In embodiments of the invention, by circulating the feed water past the membranes at higher velocities than would be dictated by the recovery and flux (or pressure) alone, better mixing and increased membrane surface scouring can be achieved. For example and without limitation, the cross-flow velocity in embodiments can be greater than 0.5 feet per second, greater than 1.0 feet per second, greater than 2.0 feet per second, greater than 3.0 feet per second, or greater than 5.0 feet per second. In some embodiments, the cross-flow velocity can be between about 0.5 and about 10.0 feet per second, between about 1.0 foot per second and about 2.0 feet per second, or between about 2.0 feet per second and about 3.0 feet per second. The recirculation or recycle rate in embodiments can also vary depending on the particular application and depending on the operator's particular goals. As an example, a system with a fresh surface water source having low total dissolved solids (TDS) and low turbidity can be operated at an 80% recovery rate with a relatively high recycle rate and a relatively high flux. The same system can also be operated at a lower recovery, with a lower recycle to save energy, or with the same or higher recycle rate to reduce membrane cleaning requirements. This added operational parameter (i.e., recirculation rate or recycle rate) also facilitates periodic system adjustments without interrupting production. For example, to accommodate seasonal variations in feed water quality, the recycle rate can be increased as the fouling potential of the feed water increases. This allows for a single configuration to treat nearly any source of water with only minor operational adjustments. Generally speaking, in once-through systems, the higher the recovery, the greater the reduction in feed water velocity as the feed water travels longitudinally past the membranes. By employing a recirculation system, embodiments of the invention can serve to even out the feed water velocity over the length of the membranes. In embodiments, the feed water is circulated through the vessel (and past the membranes) multiple times, reducing the recovery rate per pass. For example, for a conventional system with a 50 percent overall recovery, the velocity at the end of membrane circuit is roughly one half of the velocity at the feed water inlet. In an embodiment that adds a recirculation pass, operating at an overall recovery rate of 50%, the recovery per pass is half the overall recovery, or 25%. In such a system, the velocity at the end of the membrane circuit would be three-quarters of the velocity at the inlet.

Vibration System

In some embodiments, a vibration system can be included which produces waves in the feed water and sends waves through the channels between the membranes, to promote mixing and suspension of particles off of the membranes. Transducers 4 or other mechanical devices can be used to impart the vibration to the feed water or the vessel walls. Transducers can be placed in the feed water, and/or directly onto a wall or walls of the pressure vessel to propagate the waves through the feed water to the membranes.

In some embodiments, the vibration system can be configured such that the vibration waves are conducted by the water and/or by the vessel or other structure disposed inside the vessel. Depending on the configuration of the vessel walls, the vibration waves may in some cases reflect off the vessel walls. The vibration can be continuous or intermittent, as required to maintain the membrane productivity. Parameters such as wave frequency and amplitude can be adjusted (for example, with various tranducers) over time to maintain a desired level of membrane productivity. Embodiments of the invention can employ sonic frequencies, ultrasonic frequencies, and/or a combination of both. In embodiments that employ ultrasonic (frequency greater than 20 kilohertz) vibration, the transducers can be arranged to avoid damage to the membranes or other components due to cavitation. In embodiments of the invention, the vibration itself, and not cavitation resulting from the vibration, serves to keep the membranes clean.

In some embodiments, a vibration system can be configured to supply vibrations waves of two different frequencies.

For example, one frequency can be selected to keep large particles off the membranes, and another (perhaps higher) frequency can be selected to prevent bacteria from settling. A combination of frequencies can also be used to avoid a potential standing wave, which could be destructive. In some embodiments, a combination of frequencies can be provided either simultaneously (i.e., continuously at the same time, or intermittently at the same time) or alternatingly (i.e., continuously during different periods of time, or intermittently at different time intervals). In some embodiments, a lower-frequency vibration system can be operated substantially continuously or at relatively frequent intervals (for example and without limitation, every few minutes or hours), and a higher-frequency vibration system can be operated at relatively shorter intervals (for example and without limitation, every 12 to 24 hours).

By combining a vibration regime with an in-vessel recirculation system, embodiments of the invention provide a synergistic cleaning effect to dramatically reduce membrane maintenance requirements, providing a system that can accommodate a greater variety of feed water qualities with a vast reduction in pre-treatment requirements.

Antifouling Particles

Figure 42A:
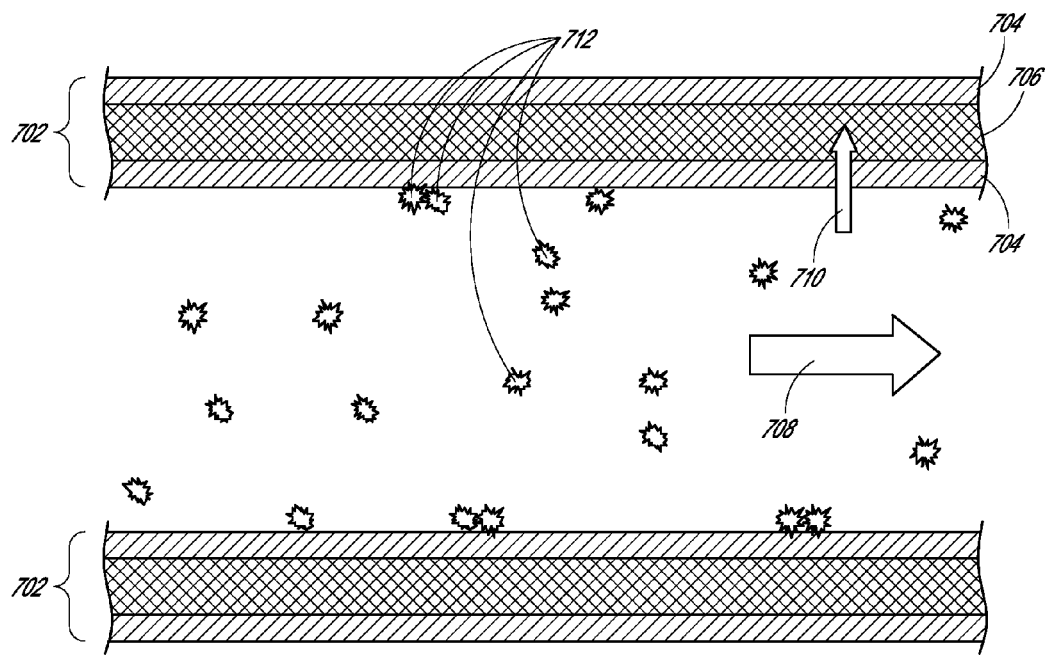
FIG. 42A is a schematic cross-sectional view illustrating a feed channel between two membrane elements, with contaminant particles suspended in the feed water and beginning to coat the membranes.

As mentioned above, feed water contaminants can tend to lodge in the pores of the membranes in membrane-based treatment systems. Contaminant particles can also tend to form a coating (which may be several particles deep) on the membrane surfaces, which can block the flow of permeate through the membranes. In reverse osmosis and nanofiltration systems, contaminant particles that are relatively small (e.g., on the order of 1 micron and smaller in diameter) are especially likely to cause this type of membrane fouling. FIG. 42A is a schematic cross-sectional view illustrating a feed channel between two membrane elements 702 that are housed within a pressure vessel (not shown). Each membrane element 702 comprises two membrane sheets 704 and a permeate spacer sheet 706. The flow of feed water through the feed channel is illustrated by arrow 708, with arrow 710 indicating the flow of permeate through one of the membranes 704. FIG. 42A illustrates various contaminant particles 712 suspended in the feed water and beginning to coat the surfaces of the membranes 704.

Figure 42B:
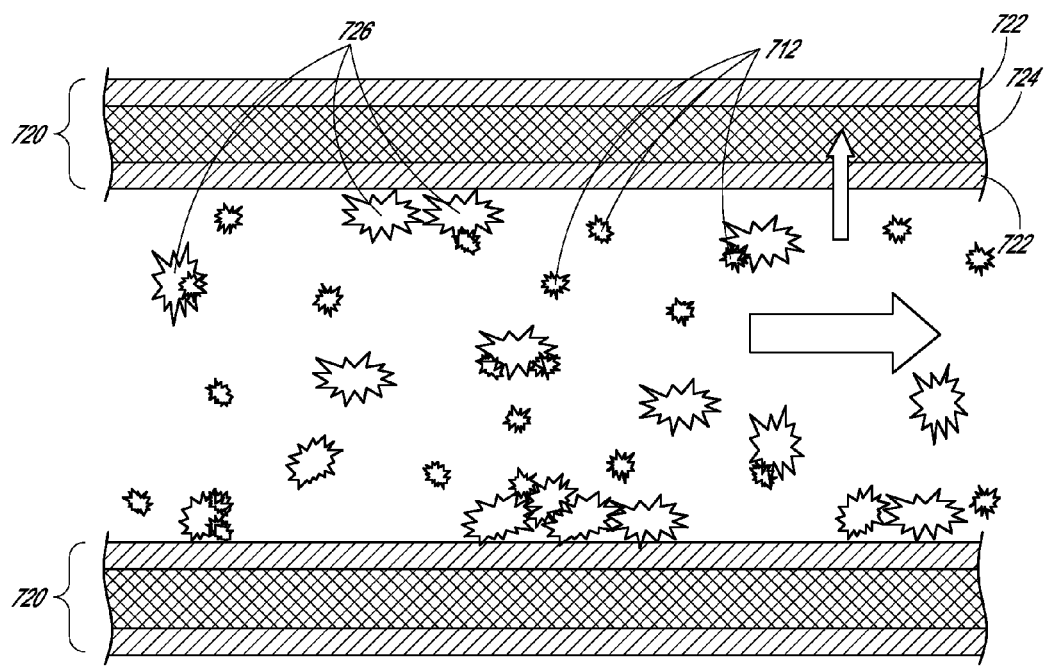
FIG. 42B is a schematic cross-sectional view illustrating a feed channel between two membrane elements, with antifouling particles added to the feed water, in accordance with an embodiment.

In some embodiments, antifouling particles can be added to the feed water (and/or to the membrane surfaces) to reduce or inhibit fouling of the membranes by contaminant particles. FIG. 42B is a schematic cross-sectional view illustrating a feed channel between two membrane elements 720 in one such embodiment. Each membrane element 720 comprises two membrane sheets 722 and a permeate spacer sheet 724. In the embodiment shown in FIG. 42B, antifouling particles 726 are added to the feed water, and are suspended in the feed water along with any contaminant particles 712 that may be present. As can be seen in FIG. 42B, the addition of the antifouling particles 726 has the effect of attracting the contaminant particles 712, which adhere to or embed themselves within the pores of the antifouling particles 726. As also shown in FIG. 42B, the antifouling particles 726 may also adhere to and/or coat the surfaces of the membranes 722. Unlike the contaminant particles 712, however, the presence of the antifouling particles 726 on the surfaces of the membranes 722 does not block the flow of permeate through the membranes 722. Instead, permeate can pass easily through the antifouling particles 726, through the membranes 722, and into the permeate channels 724. Thus, in some embodiments, the addition of antifouling particles to the feed water can serve to inhibit or prevent contaminant particles from forming a water-impermeable coating on the membrane surfaces and thus fouling the membranes.

The membranes 722 can be, for example, osmotic membranes (that is, NF or RO) membranes. The antifouling particles 726 that are added to the feed water can be, for example, diatomaceous earth particles, activated carbon particles, or particles of any other material with suitable porosity and/or specific surface area for their intended purpose. The material can be relatively inert, or can be selected to react with particular contaminants, such as industrial contaminants. Additional examples of materials that can be used for antifouling particles in embodiments include clay, bentonite, zeolite, and pearlite. In some embodiments, the antifouling particles can be selected to have a suitable porosity and/or specific surface area and size to attract and adsorb particular contaminant particles, such as, for example, contaminant particles approximately 1 micron in diameter and smaller. For example, in some embodiments, the antifouling particles can have a diameter (or a major dimension) of 0.5 microns or more, 1.0 microns or more, 1.5 microns or more, 2.0 microns or more, or a diameter (or a major dimension) greater than any of these numbers, less than any of these numbers, or within a range defined by any two of these numbers. Also in some embodiments, the antifouling particles can have a specific surface area of 10 $m^2/g$ or more, 20 $m^2/g$ or more, 30 $m^2/g$ or more, 40 $m^2/g$ or more, 50 $m^2/g$ or more, 60 $m^2/g$ or more, 70 $m^2/g$ or more, 80 $m^2/g$ or, more, 90 $m^2/g$ or more, 100 $m^2/g$ or more, 200 $m^2/g$ or more, 300 $m^2/g$ or more, 400 $m^2/g$ or more, 500 $m^2/g$ or more, 1000 $m^2/g$ or more, 1500 $m^2/g$ or more, or a specific surface area greater than any of these numbers, less than any of these numbers, or within a range defined by any two of these numbers. Alternatively or in addition to antifouling particles having a high porosity and/or surface area, absorbent particles, highly charged particles, magnetic particles, or other particles can be added to feed water as antifouling particles in various embodiments, for example to remove specific contaminants.

Figure 43A:
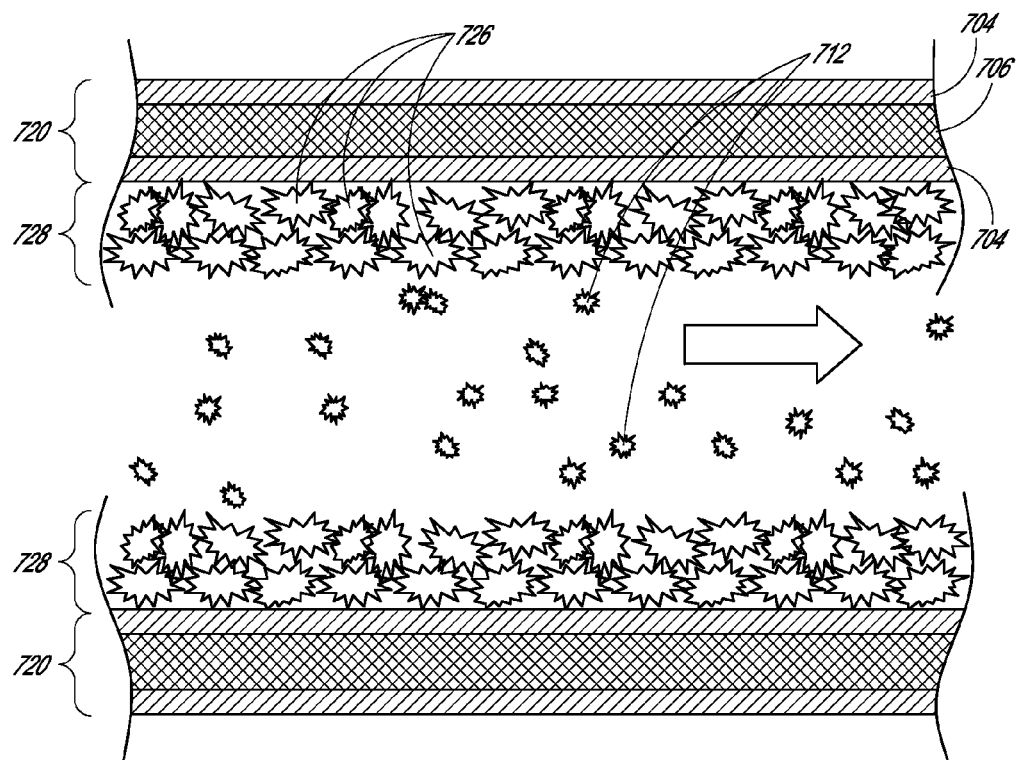
FIG. 43A is a schematic cross-sectional view illustrating a feed channel between two membrane elements in another embodiment at the beginning of a treatment process.
Figure 43B:
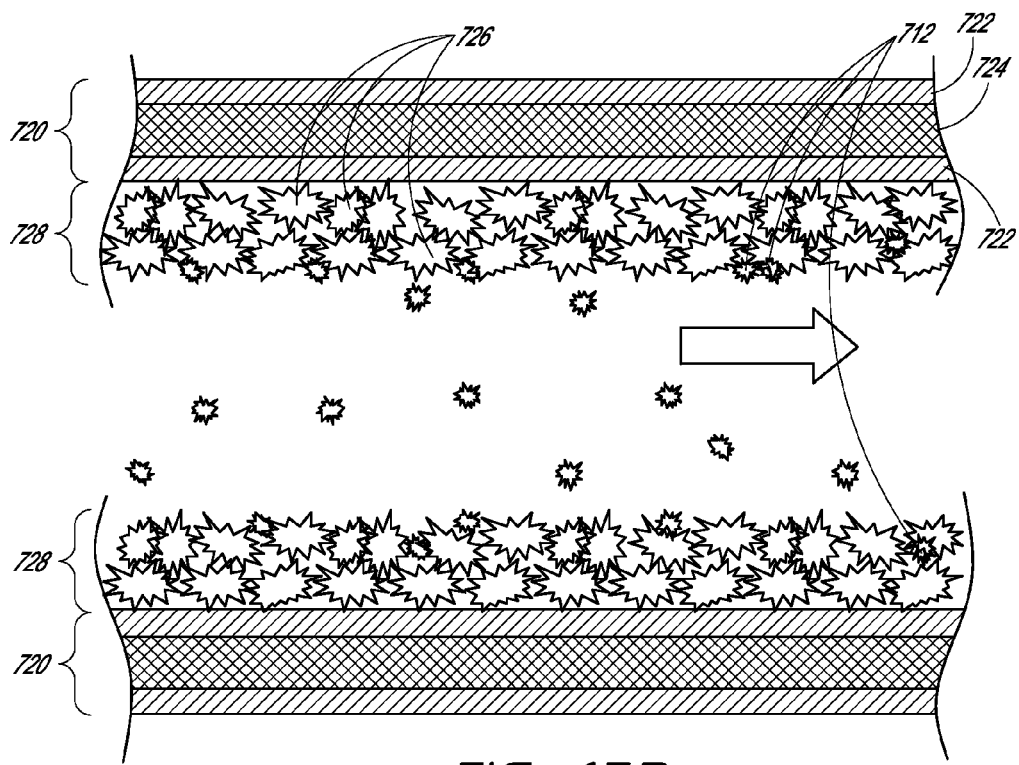
FIG. 43B is a schematic cross-sectional view of the feed channel of FIG. 43A at a later stage in the treatment process.

In some embodiments, instead of or in addition to supplying antifouling particles to the feed water, antifouling particles (and/or an antifouling material) can be used to form an antifouling layer on the membrane surfaces. FIG. 43A is a schematic cross-sectional view illustrating a feed channel in one such embodiment, at the beginning of a treatment process. FIG. 43B is a schematic cross-sectional view of the feed channel of FIG. 43A at a later stage in the treatment process. In FIG. 43A, a layer 728 of antifouling particles 726 coats the active surfaces of the membranes 722 (that is, those surfaces facing the feed channel). The layer 728 can be a high surface area, three-dimensional structure configured to attract and hold contaminant particles. As shown in FIG. 43A, at the beginning of the treatment process, a number of contaminant particles 712 are suspended in the feed water. As the treatment process proceeds, and as illustrated in FIG. 43B, the contaminant particles 712 begin to adhere to the antifouling particles 726 forming the layers 728. Due at least in part to the porosity of the particles 726, the presence of the layers 728 does not block the flow of permeate through the membranes 722. Instead, permeate can pass easily through the antifouling particles 726 and between the antifouling particles 726, through the membranes 722, and into the permeate channels 724, even after numerous contaminant particles 712 have become embedded in the layers 728. Thus, in some embodiments, the addition of an antifouling coating layer to the membrane surfaces can serve to inhibit or prevent contaminant particles from forming water-impermeable coating on the membrane surfaces and thus fouling the membranes. The layers 728 can have any suitable thickness, including, for example, about 50 microns, about 60 microns, about 70 microns, about 80 microns, about 90 microns, about 100 microns, about 150 microns, about 200 microns, about 300 microns, or a thickness greater than any of these numbers, less than any of these numbers, or within a range defined by any two of these numbers.

Figure 44A:
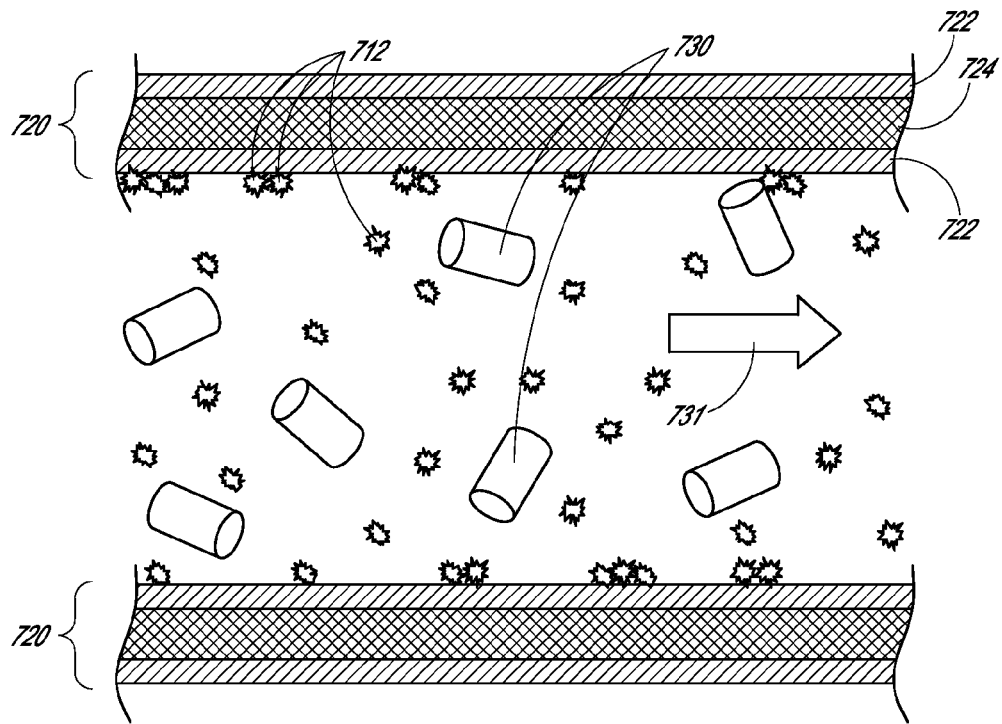
FIG. 44A is a schematic cross-sectional view of a feed channel between two membrane elements, with pellets added to the feed water, in accordance with another embodiment.

In some embodiments, instead of or in addition to supplying antifouling particles to the feed water and/or membrane surfaces, pellets can be added to the feed water to reduce or inhibit fouling of the membranes. FIG. 44A is a schematic cross-sectional view illustrating a feed channel in one such embodiment. In the embodiment shown in FIG. 44A, pellets 730 are added to the feed water, and are suspended in the feed water along with any contaminant particles 712 that may be present. The pellets 730 can be configured to contact and loosen and/or dislodge any particles 712 that may have settled upon or near the surfaces of the membranes 722 as the pellets move with the feed water in the general direction indicated by arrow 731. The pellets can have any suitable shape, including the cylindrical shape illustrated in FIG. 44A. Other examples of suitable shapes include spherical, nonspherical, elongated, oblong, cubic, cuboid, prismatic, pyramid, conical, or irregular shapes. The pellets can have any suitable size. In some embodiments, the pellets can have a major dimension of about 0.1 mm, about 0.2 mm, about 0.3 mm, about 0.4 mm, about 0.5 mm, about 1.0 mm, about 1.5 mm, about 2.0 mm, or a major dimension greater than any of these numbers, less than any of these numbers, or within a range defined by any of these numbers. In some embodiments, the pellets can have a major dimension less than or equal to about half the distance between the membranes 722. For example, in an embodiment employing a membrane spacing of about 2.5 mm, the pellets can have a major dimension of, for example, less than or equal to about 1.25 mm. In an embodiment employing a membrane spacing of about 3.2 mm, the pellets can have a major dimension of, for example, less than or equal to about 1.6 mm. The pellets can comprise any material suitable for their intended purpose, such as, for example, plastic, ceramic, or other materials. The pellets can be nonporous or slightly porous, and they can be solid or hollow. The pellets can have any suitable density, including, for example, a density of about 0.9 g/mL, about 1.0 g/mL, about 1.1 g/mL, about 1.2 g/mL, about 1.5 g/mL, or a density greater than any of these numbers, less than any of these numbers, or within a range defined by any two of these numbers.

Figure 44B:
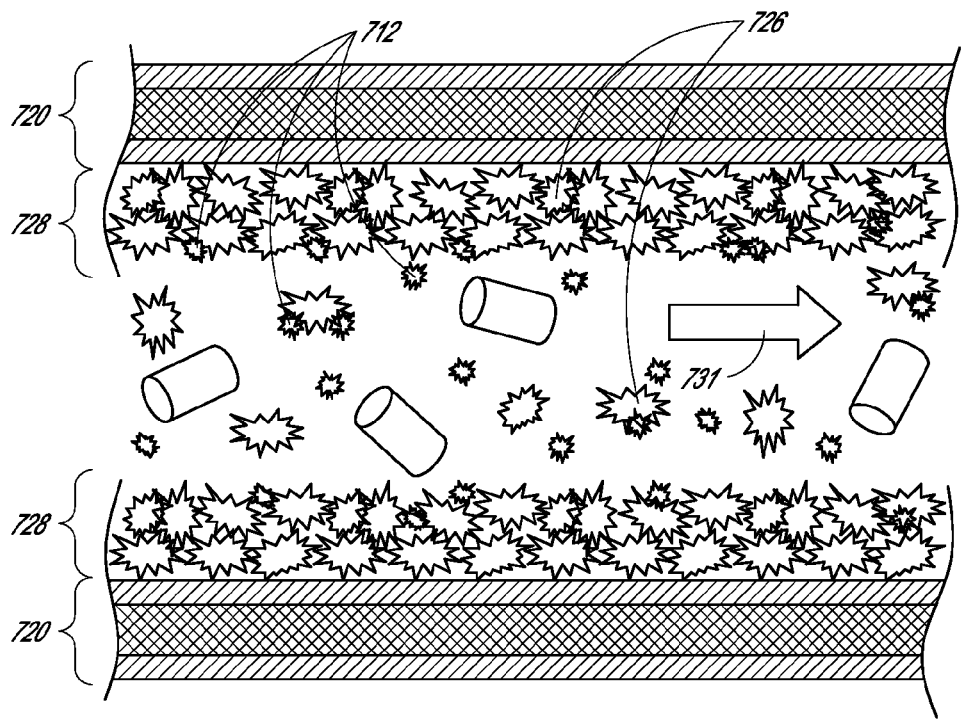
FIG. 44B is a schematic cross-sectional view of a feed channel between two membrane elements, with antifouling particles and pellets added to the feed water and with a layer of antifouling particles coating the membranes, according to another embodiment.

FIG. 44B is a schematic cross-sectional view of a feed channel in yet another embodiment. FIG. 44B shows antifouling particles 726 and pellets 730 added to the feed water and suspended with the contaminant particles 712 that are already present. FIG. 44B also shows a layer 728 of antifouling particles 726 coating the membranes 722. In an embodiment employing both antifouling particles and pellets to inhibit membrane fouling, the pellets can function to dislodge contaminant particles as well as any antifouling particles residing on the membrane surfaces. In this way, the addition of the pellets can encourage movement of the antifouling particles through the feed channels. The addition of the pellets can also encourage a constant exchange of antifouling particles coating the membrane surfaces.

Figure 45A:
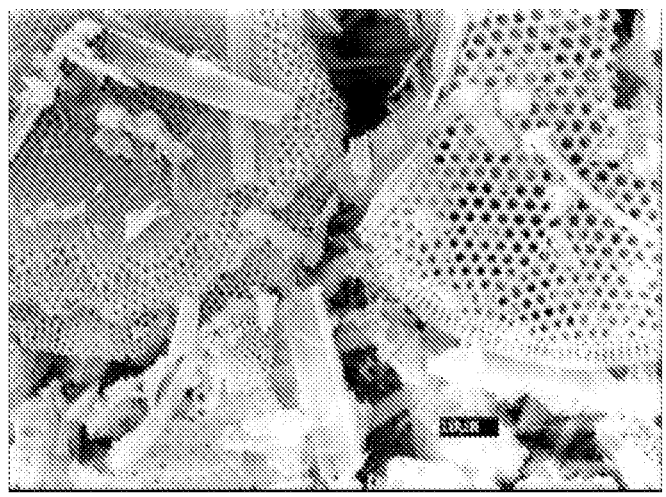
FIGS. 45A-C are scanning electron micrographs (SEMs) diatomaceous earth which may be used in embodiments.
Figure 45B:
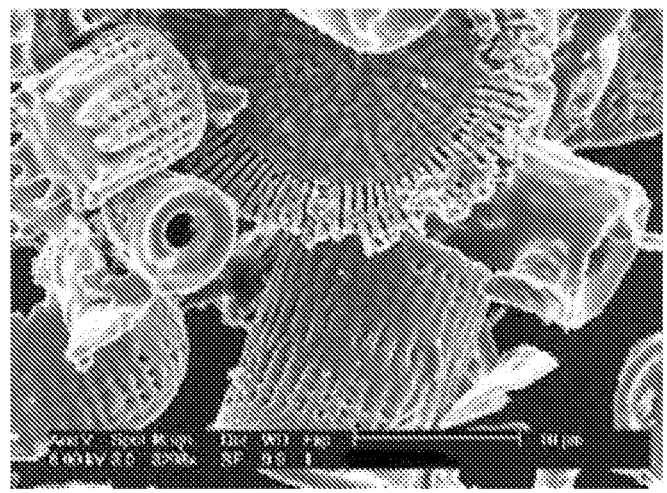
Figure 45C:
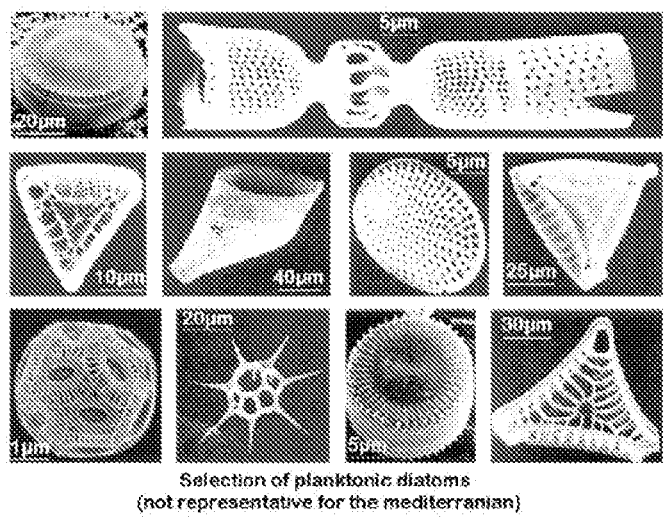
Figure 46A:
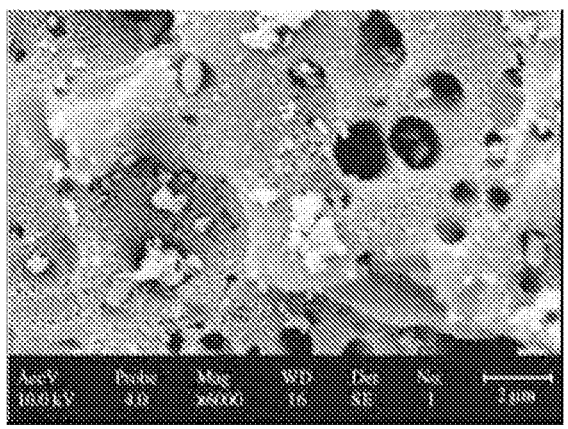
FIGS. 46A-C are SEMs of activated carbon which may be used in embodiments.
Figure 46B:
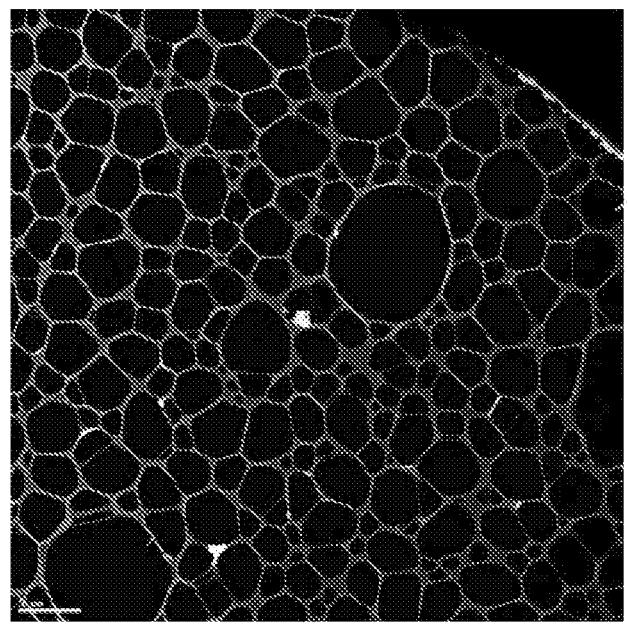
Figure 46C:
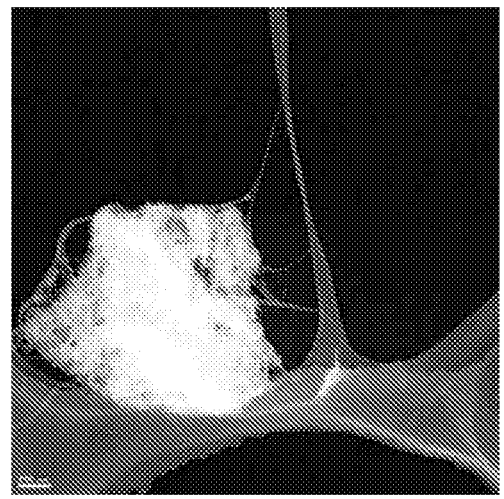

FIGS. 45A-C are scanning electron micrographs (SEMs) of diatomaceous earth which may be used as antifouling particles in some embodiments. FIGS. 46A-C are SEMs of activated carbon which may be used as antifouling particles in some embodiments. These SEMs illustrate the three-dimensional, high porosity and high surface area structure of both diatomaceous earth and activated carbon. FIG. 46B in particular shows the structure of an extremely porous particle of activated carbon, with contaminant particles lodged in some of its pores. FIG. 46C shows a close-up of a contaminant particle lodged in a pore of an activated carbon particle. In some embodiments, the material used for the antifouling particles can be prepared by suspending a bulk material in water in a tank and allowing the suspension to settle for a sufficient amount of time to separate the desirable particles from the undesirable particles. For example, the suspension can be allowed to settle for a sufficient time to allow particles larger than about 0.5 microns in diameter (or in major dimension) to settle, after which the remaining (smaller) particles in suspension can be poured off.

Figure 48A:
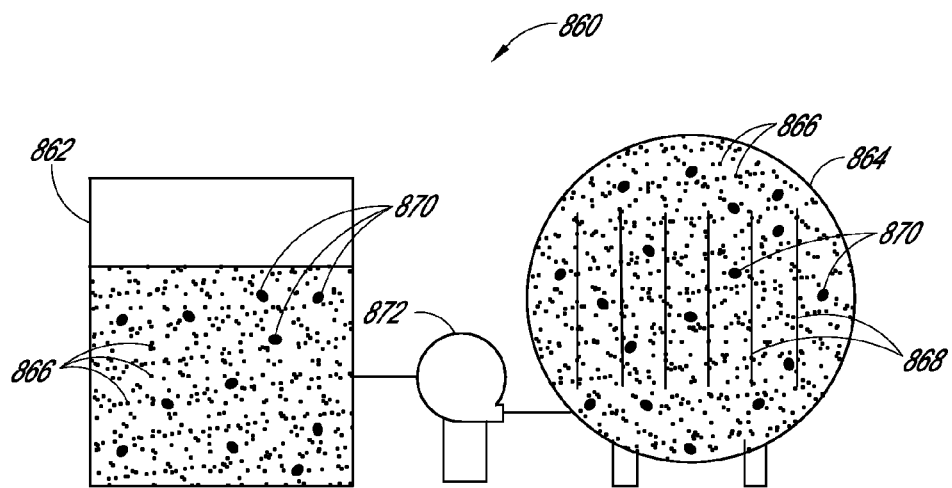
FIGS. 48A-C are schematic diagrams illustrating various water treatment systems configured in accordance with some embodiments.
Figure 48B:
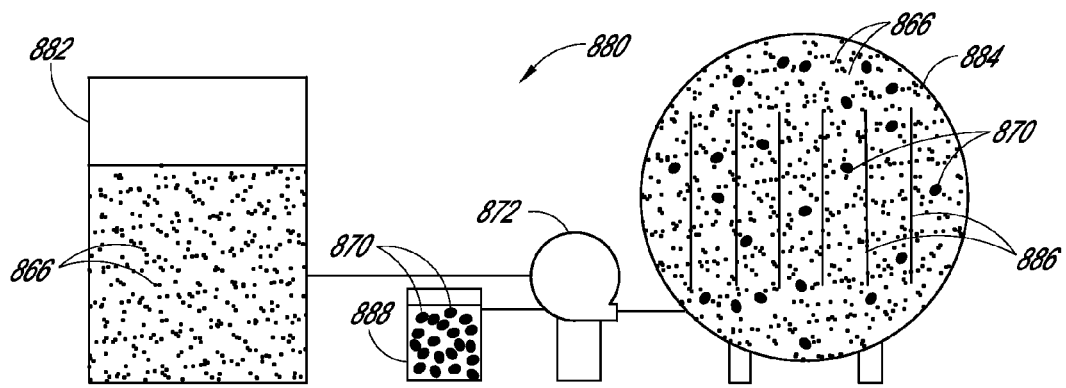
Figure 48C:
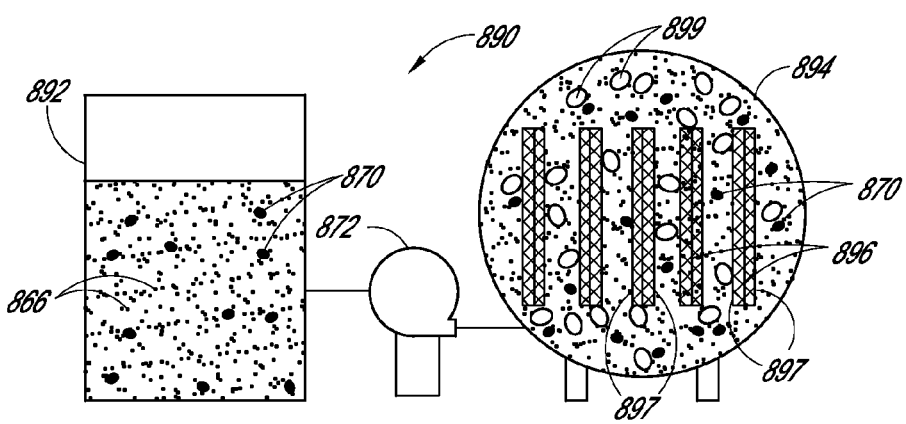

FIGS. 48A-C are schematic diagrams illustrating various water treatment systems configured in accordance with some embodiments. FIG. 48A shows a system 860 comprising a feed water supply 862 and a pressure vessel 864. The feed water supply 862 includes contaminant particles 866. At least some of the contaminant particles 866 are on the order of 1 micron and smaller in diameter. The vessel 864 includes a plurality of spaced-apart membrane elements 868. The membrane elements 868 can include osmotic membranes (e.g., NF or RO membranes) arranged in a planar configuration, for example as described herein. In the embodiment illustrated in FIG. 48A, antifouling particles 870 have been added to the feed water supply 862. A pump 872 is configured to pump feed water (including the contaminant particles 866 and the antifouling particles 870) to the pressure vessel 864 for treatment. Although not illustrated, the vessel 864 can include an impeller or other means for generating cross flow of feed water past the membrane surfaces.

FIG. 48B shows another system 880 comprising a feed water supply 882 and a pressure vessel 884. The feed water supply 882 includes contaminant particles 866. The vessel 884 includes a plurality of spaced-apart membrane elements 886. The system 880 also includes a mixing tank 888 holding antifouling particles 870 in suspension. In the embodiment illustrated in FIG. 48B, the antifouling particles 870 are added to the feed water as the feed water is pumped (by pump 872) to the pressure vessel 884 for treatment.

FIG. 48C shows another system 890 comprising a feed water supply 892 and a pressure vessel 894. The feed water supply 892 includes contaminant particles 866 as well as antifouling particles 870 which have been added to the feed water. The vessel 894 includes a plurality of spaced-apart membrane elements 896 which include antifouling layers 897 coating the active membrane surfaces (that is, the surfaces of the membrane elements 896 exposed to the feed water in the vessel). The pump 872 is configured to pump feed water (including the contaminant particles 866 and the antifouling particles 870) to the pressure vessel 894 for treatment. In the embodiment illustrated in FIG. 48C, pellets 899 have been added to the feed water inside the vessel 894. Although not illustrated, the vessel 894 can include an impeller or other means for generating cross flow of feed water past the membrane surfaces. In some embodiments, such an impeller can have a relatively slow speed (for example and without limitation, between about 100 rpm to about 400 rpm) to avoid damaging or breaking the pellets. In some embodiments, the system can also include a screen configured to prevent removal of the pellets from the vessel with the concentrated brine or sludge, so that the concentration of pellets in the vessel remains relatively constant.

Operation

Embodiments of the system can be operated by providing pressurized feed water to the vessel containing the membranes. The differential between the feed water pressure and the relatively lower pressure on the permeate side of the membrane starts the filtration process. The following parameters can be adjusted depending on the treatment goals and the feed water quality:

- Membrane type: Different membrane types can be used achieve different treatment goals. Tighter membranes are generally capable of removing more contaminants, but require higher pressures and tend to operate at lower fluxes (output per area). If using the system to pretreat water prior to a subsequent treatment step, certain membranes such as nanofiltration can be used to minimize maintenance on the second treatment step.
- Re-circulation rate: The rate at which water is circulated in the vessel will affect the cross-flow velocity of feed water at the surface of the membrane. Increased cross-flow velocity promotes mixing of particulates and dissolved contaminants within the raw water and prevents settling and fouling of the membrane surface.
- Feed water pressure: Feed water pressure is generally a function of the type of membrane used, the osmotic potential of the feed water, the desired flux (output per area of membrane), and the longitudinal headloss produced from the re-circulation.
- Recovery rate: This is defined as the percent of feed water recovered as permeate (1—concentrate %) versus the total amount of feed water used (example: 50% recovery is 2 liters of feed water producing 1 liter or permeate).
- Vibration regime: Vibratory cleaning provides a real-time method of removing particles from the membrane surface while the system is in use. For a given water quality there are several parameters within the vibration regime (e.g., frequency, intermittency, energy, location of input) that may be adjusted to, for example, improve membrane cleaning and/or reduce power consumption of the system.

In embodiments of the invention, these and other system and operational parameters can be adjusted based on source water quality, and source water availability, and treatment goals. These parameters can be adjusted so that the same system can be used for a broad range of source water qualities and treatment goals. In some applications, these parameters can be adjusted as source water quality changes (for example due to seasonal changes or environmental occurrences). Embodiments thus offer a significant advantage over conventional systems, which lack such adaptability to variance in feed water quality, and which therefore require complex and expensive pretreatment systems in order to achieve a consistent feed water quality. Embodiments can be operated at recoveries of anywhere from 20% or lower to recoveries of 80% or higher, depending on source water quality, maintenance preferences, and other considerations. In one embodiment, NF membranes can be used with a flux of 5 to 10 gfd, a recovery of 50-60%, and a recycle rate of about 15 times. The re-circulation and vibration regime of embodiments can be used to provide a highly cost effective maintenance program, in which the energy consumed by vibration and re-circulation is more than offset by the savings resulting from the reduced maintenance requirements, the relative absence of moving parts, and the absence of conventional low pressure membrane cleaning like backwashing or air scouring.

Embodiments of the system can be operated in a single-stage process in which the feed water enters a vessel and interacts with the membranes in that vessel until the feed water reaches a concentration corresponding to the desired recovery rate, at which point the concentrate can be evacuated from the vessel and disposed of (for example, returned to the external environment, or to a sewage treatment plant, in the case of a water reuse application). In some embodiments, concentrated feed water can be evacuated from the vessel continuously, through an aperture of any suitable size. In other embodiments, concentrated feed water can be evacuated from the vessel in a pulsed-release process, in which a relatively larger volume of concentrate is released intermittently through a relatively larger aperture, so as to obtain the same time-averaged rate of release as a continuous process while increasing the amount of solids disposed with the concentrate.

Figure 10:
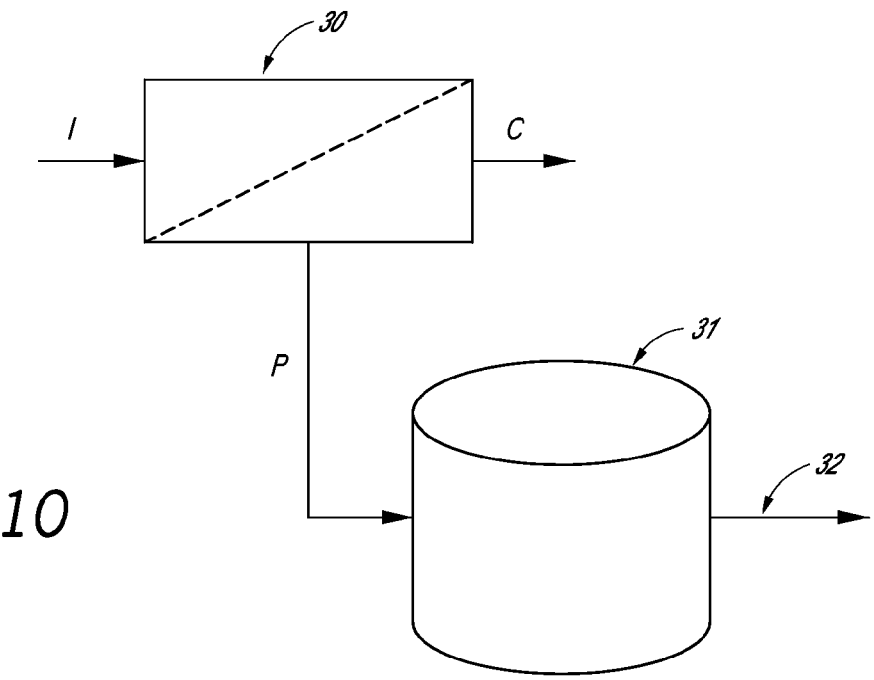
FIG. 10 is a schematic diagram of an operating mode according to an embodiment.
Figure 11:
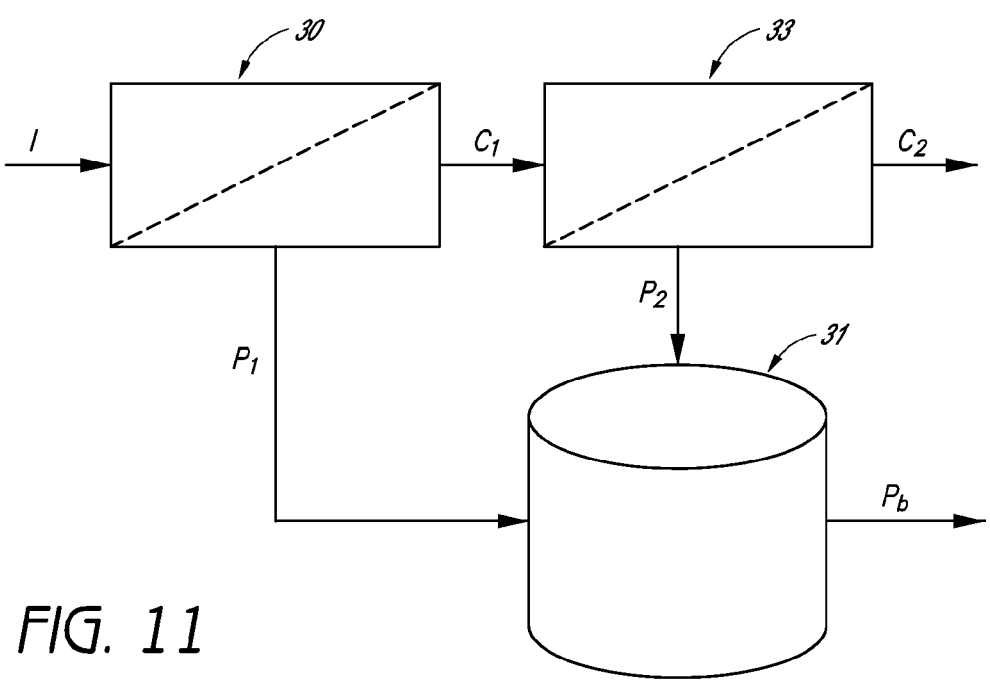
FIG. 11 is a schematic diagram illustrating an operating mode according to another embodiment.

FIG. 10 shows an example of how a single-step process can work. The influent (I) to the pressure vessel 30 containing the membranes is separated by the membranes into two streams: a concentrate (C) and a permeate (P). The permeate is transferred to a storage tank 31 which is kept at a relatively low pressure. The permeate can be transferred to later stages of a multi-stage filtration process, through a disinfectant process, or sent to its intended use as indicated by arrow 32. Table 3 below shows an example of the mass balance for the streams assuming 1,000 mg/l TDS influent, an NF membrane that removes 30% of dissolved solids and a 70% recovery rate. In embodiments of the invention, recirculation of the feed water inside the pressure vessel assures adequate mixing and a uniform concentration of the feed water, not necessarily as defined by the influent TDS, but as indicated by the desired recovery rate and the specified membrane's removal rate.

TABLE 3

| Parameter (TDS in mg/l) | |
|---|---|
| Influent TDS (I) | 1,000 |
| Concentrate TDS | 1,266 |
| Permeate TDS (P) | 886 |
| Recovery % | 70% |
| Membrane removal % | 30% |

In some embodiments, a second stage can be added to economically obtain higher recoveries and help mitigate fouling. This can work by using a relatively loose NF membrane on the first stage. Such an NF membrane might remove 30% of total dissolved solids (TDS). Table 4 below shows how a two-stage process can work given the same 1,000 mg/l TDS influent (I), a first stage 30 with the same 30% removal NF membrane and a second stage 33 with an RO membrane that removes 90% of TDS and has a 65% recovery rate. In this example, a 90% overall recovery is achieved. While such high recovery in conventional membrane systems can lead to scaling, embodiments of the present invention avoid this problem by the open channel membrane spacing and the use of vibration to suspend particles that can result from precipitation of the concentrated dissolved solids. Also, while one might consider the two stages as requiring a higher unit capital cost, that is not necessarily the case. This is because the two stage system can work with higher flux rates than a single stage system. The two stages are not processing all the water as only the concentrate from the first stage is input into the second stage. As such, a single vessel in the second stage can handle the concentrate from three similarly sized vessels on the first stage.

TABLE 4

| Parameter (TDS in mg/l) | Stage 1 | Stage 2 | Blended Permeate |
|---|---|---|---|
| Influent TDS (I, $C_1$) | 1,000 | 1,266 | |
| Concentrate TDS | 1,266 | 3,050 | |
| Permeate TDS ($P_1$, $P_2$, $P_b$) | 886 | 305 | 759 |

TABLE 4-continued

| Parameter (TDS in mg/l) | Stage 1 | Stage 2 | Blended Permeate |
|---|---|---|---|
| Recovery % | 70% | 65% | 90% |
| Membrane removal % | 30% | 90% | |

The discussion of the single and double stage processes highlights the selection of the proper membrane and the recovery rates. Other parameters of importance are the re-circulation rate and the vibration regime. Re-circulation increases feed water velocity which is associated with lower fouling.

The vibration regime can keep the membranes clean. Treating water from a mountain lake might not require much velocity or vibration in order to keep the membranes clean, while reuse applications might require significantly more of each. In embodiments of the invention, the vibration can be of varying frequencies, energy levels and durations. A particular application might require continuous low frequency vibration with daily or weekly doses of higher frequency or vibration (say, ultrasonic vibration) to remove certain accumulations. Similarly, the energy level of the vibration regime might be altered to suit the application. These parameters can be adjusted per the source water quality and the desired treatment goals.

A further embodiment of the system applies a negative pressure to the permeate side of the membrane cartridge. This negative pressure can provide the necessary pressure differential for UF-membrane-based systems, and can provide at least part of the necessary pressure differential in NF or RO systems.

Low-Fouling Treatment Processes Using Particles and/or Pellets

FIGS. 47A-C are method diagrams illustrating various processes for treating water in accordance with some embodiments. As shown in FIG. 47A, a process 800 for treating contaminated feed water can include supplying antifouling particles to the feed water at step 802. In some embodiments, the antifouling particles can be added to a feed water holding tank before the feed water is pumped into the pressure vessel. In some embodiments, the antifouling particles can be added to a mixing tank or wide spot in the line between the holding tank and the pressure vessel. In other embodiments, the antifouling particles can be supplied directly to the pressure vessel. The antifouling particles can be added to the feed water before the treatment process begins. The antifouling particles can be added to the feed water while the treatment system is online, during the treatment process. The antifouling particles can be added to the feed water intermittently or continuously. In some embodiments, the antifouling particles can be added initially at a higher rate (to build up the concentration in the pressure vessel) and later at a second rate (to maintain the concentration in the pressure vessel). In some embodiments, the antifouling particles can be added to the feed water so as to have a suspended concentration of, for example, between 1 and 20 mg/L, between 1 and 50 mg/L, between 1 and 100 mg/L, greater than 50 mg/L, or greater than 100 mg/L of feed water in the vessel.

At step 804, the feed water and antifouling particles can be supplied to a pressure vessel. The pressure vessel can be configured in any suitable fashion, for example as described herein. The pressure vessel can include one or more membrane modules disposed therein, which can be configured in any suitable fashion, for example as described herein. The membrane modules can include a plurality of membrane elements. The membrane elements can include osmotic membranes (e.g., NF or RO membranes). The membrane elements can have a generally planar configuration and can be spaced apart by any suitable distance, for example, by greater than 1 mm, greater than 2 mm, greater than 3 mm, greater than 4 mm, greater than 5 mm, greater than 6 mm, greater than 7 mm, greater than 8 mm, or the spacing distance can be within a range defined by any two of these numbers. For example, in some embodiments, the spacing can be between about 1 mm and about 12 mm, or between about 2 mm and about 8 mm.

At step 806, the feed water and antifouling particles can be circulated past the membranes in the pressure vessel. In this and other embodiments, the feed water can be circulated at any suitable cross-flow velocity to generate turbulent flow past the membranes. For example, in some embodiments, the feed water can be circulated at a rate of approximately 1 fps to 2 fps, although slower and faster rates are also possible, depending on the particular configuration. The feed water and antifouling particles can be directed past the membranes in a "once-through" system. Alternatively, the feed water and antifouling particles can be recirculated through the vessel, either by returning the outlet water to the vessel inlet via an external conduit, or by directing the flow of feed water in different directions through different portions of the vessel. In the process 800, the addition of antifouling particles to the feed water can serve to inhibit or prevent contaminant particles from forming a nonporous (or low-porosity) coating on the membrane surfaces and thus fouling the membranes.

As shown in FIG. 47B, a process 810 for treating contaminated feed water can include forming an antifouling layer on the surface of one or more membranes at step 812. At step 814, the feed water can be circulated past the membranes in the pressure vessel. In some embodiments, the antifouling layer can comprise a plurality of antifouling particles. In other embodiments, the antifouling layer can comprise a continuous layer of an adsorbent material. In some embodiments, the antifouling layer can be formed on the membrane surfaces before the membrane elements are installed in the pressure vessel. In other embodiments, the antifouling layer can be built up naturally during the treatment process, by supplying antifouling particles to the feed water in suspension and allowing them to adhere to and coat the membrane surfaces. In the process 810, the addition of an antifouling layer to the membrane surfaces can serve to inhibit or prevent contaminant particles from forming a nonporous or water-impermeable coating on the membrane surfaces and thus fouling the membranes.

As shown in FIG. 47C, a process 820 for treating contaminated feed water can include supplying pellets to the feed water at step 822. At step 824, the feed water and pellets can be circulated past the membranes in the pressure vessel. In the process 820, the addition of the pellets can serve to dislodge any contaminant particles that may have settled upon or near the surfaces of the membranes during the treatment process. Optionally, the process 820 can also include supplying antifouling particles to the feed water, and/or forming an antifouling layer on the membrane surfaces. In some embodiments, the pellets can be added to a concentration of 0.5% to 10% of the feed volume in the vessel, although lower or higher concentrations can also be used. In some embodiments, the pellets can be added to the vessel in a single batch and remain in the vessel during treatment of the feed water. In other embodiments, the pellets can be added batchwise and intermittently during treatment, or continuously during treatment of the feed water.

Wastewater Treatment

Conventional wastewater treatment facilities typically employ primary treatment methods, such as settling and/or skimming, to remove large suspended solids (SS or TSS). Primary treatment is commonly followed by secondary treatment methods incorporating aerobic biological treatment, such as trickling filters and activated sludge, to reduce organics (as measured by biological oxygen demand (BOD)) and total suspended solids so as to produce treated wastewater of a quality suitable for discharge into receiving waters. Secondary treatment processes can include membrane bioreactors (MBRs), which employ MF or UF membranes submerged in an activated sludge tank to act as a clarifier and further reduce suspended solids while reducing plant footprint.

Treated wastewater of a quality suitable for reuse (non-potable or potable) is typically achieved by adding additional treatment systems on to conventional wastewater treatment trains. In this "add-on" approach, water reclamation projects receive secondary-treated effluent from conventional wastewater treatment facilities and add on tertiary technologies, such as sand or membrane filtration processes. Osmotic membranes (that is, NF and RO membranes) are not used in primary, secondary or tertiary wastewater treatment.

In some applications, where even higher quality product water is required, advanced treatment steps are added after secondary or tertiary steps to remove dissolved salts, organics, and other potentially harmful contaminants. Such advanced treatment can include, for example, MF or UF membrane pre-treatment followed by RO treatment and disinfection.

Figure 23:
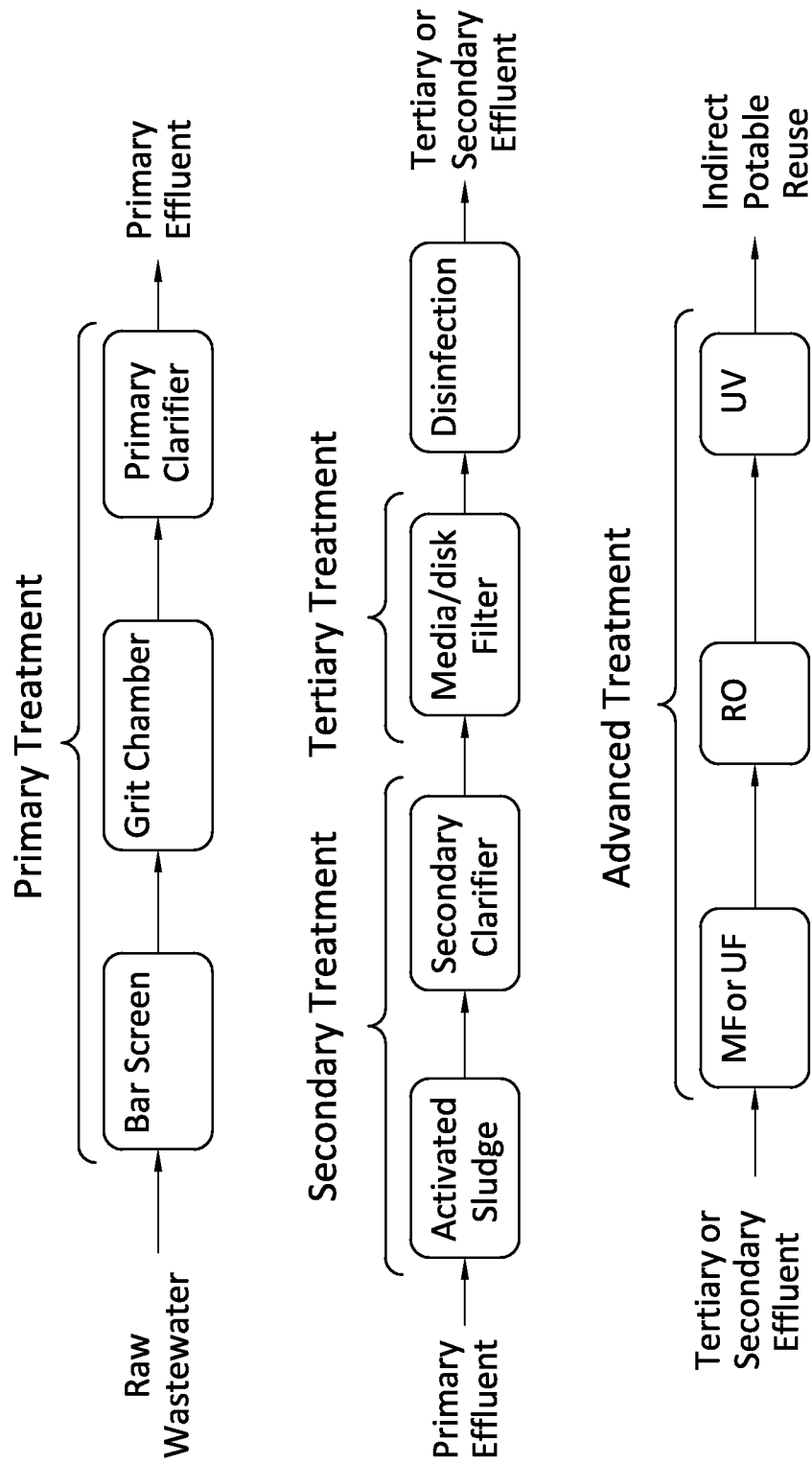
FIG. 23 is a process diagram illustrating a conventional wastewater treatment regime that includes primary, secondary, tertiary, and advanced treatment steps.

FIG. 23 is a process diagram illustrating a conventional wastewater treatment regime that includes primary, secondary, tertiary, and advanced treatment steps. As shown in the figure, in a primary treatment step, raw wastewater passes through a bar screen and a grit chamber for gross removal of large solids, and the effluent passes into a primary clarifier. In a secondary treatment step, primary effluent from the primary treatment step passes into an activated sludge process (i.e., an aerobic biological process), which may be followed by a secondary clarification process. In a tertiary treatment step, effluent from the secondary treatment is passed through a filtering media or a disk filter. This step may be followed by a disinfection step. Effluent from the secondary or tertiary steps may be discharged back into the environment (e.g., to the ocean or a river). If a higher quality effluent is desired, as in, for example, indirect potable reuse applications, the secondary or tertiary effluent can be passed through one or more advanced treatment steps. As shown in the figure, advanced treatment can include initial low-pressure membrane (MF or UF) pretreatment, subsequent RO treatment, and final UV disinfection. The addition of such membrane systems using conventional technology, however, adds significant complexity, maintenance, and cost to wastewater treatment systems.

In embodiments of the invention, a low-fouling osmotic membrane system can be configured to directly treat primary effluent from a primary wastewater treatment system, without requiring secondary or tertiary treatment of the primary effluent before exposure to the osmotic membranes. The low-fouling osmotic membrane system can include a pressure vessel with a plurality of spaced-apart osmotic membrane elements disposed inside the pressure vessel. Each of the osmotic membrane elements can have a substantially planar configuration. In some embodiments, the osmotic membrane elements can be oriented vertically in the pressure vessel. Adjacent membrane elements can be spaced apart from one another by a sufficient distance to allow the primary effluent to flow freely between adjacent membrane elements, without a conventional continuous spacer element extending between the adjacent elements and obstructing flow of the primary effluent between adjacent membrane elements. Instead, the spacing between adjacent membrane elements can be maintained by any suitable means, including, for example, one or more rigid or flexible spacing elements disposed at discrete and spaced-apart locations along one or more edges or surfaces of the membranes. The edges of the membrane elements are sealed (to maintain isolation between the permeate side and the concentrate side of the membrane elements) and thus do not form part of the active membrane surface. Therefore, in some embodiments, edge spacers can be disposed so as not to contact active membrane surface. The spacing distance between adjacent membrane elements can be, for example, greater than 1 mm, greater than 2 mm, greater than 3 mm, greater than 4 mm, greater than 5 mm, greater than 6 mm, greater than 7 mm, greater than 8 mm, or the spacing distance can be within a range defined by any two of these numbers. For example, in some embodiments, the spacing can be between about 1 mm and about 12 mm, or between about 2 mm and about 8 mm.

The pressure vessel can be pressurized to a suitable level for driving a filtration process through the osmotic membranes. Embodiments incorporating nanofiltration membranes, for example, can be operated at between about 15 psi and about 250 psi; between about 20 psi and about 120 psi; between about 30 psi and about 75 psi; or at any other suitable operating pressure. An impeller can be disposed inside the pressure vessel and configured to generate flow of the primary effluent (or feed water) past the membrane surfaces, in a direction generally parallel to the surfaces of the membranes. The flow of feed water in a direction generally parallel to the membrane surfaces is generally referred to as "cross-flow". Embodiments of the invention employ a high cross-flow velocity to keep particles in suspension and reduce fouling of the membranes. In some embodiments, the cross-flow velocity can be, for example, between about 0.5 and about 10.0 feet per second, or between about 2.0 and about 3.0 feet per second. By such a configuration, osmotic membranes can be used to treat primary effluent without additional pre-treatment of the primary effluent, and without requiring the frequent backflushing or chemical cleaning processes that are required in conventional dead-end filtration systems.

There is a spectrum of osmotic membranes, ranging from "loosest" NF membranes to the "tightest" RO membranes that can be used in embodiments. In some embodiments, "tighter" RO membranes can be used to target certain constituents, such as, for example, smaller monovalent ions. In some embodiments, "looser" nanofiltration membranes can be used to selectively remove high percentages (e.g., from about 50% to 80% or more) of divalent or multivalent dissolved ions such as organics, hardness, pesticides, and heavy metals from primary effluent. The "loose" NF membranes will remove a relatively smaller percentage of monovalent ions (e.g., up to about to 20%), so that the ratio of multivalent ions to monovalent ions will be significantly higher in the concentrate than the permeate.

Multivalent ions that are generally present in wastewater tend to reach saturation and precipitate in aqueous solutions at relatively low concentration (e.g., approximately 1,000 milligrams per liter (mg/l) to 5,000 mg/l, depending on the specific constituents in the wastewater). The saturation point for the monovalent ions is typically far greater. When the concentration of multivalent ions approaches saturation, the ions will precipitate out of solution and become suspended solids in the feedwater. In embodiments, due at least in part to the high cross-flow velocity and the spaced-apart arrangement of planar membranes, suspended solids merely flow by the membranes without attaching to the membranes. Also, when solids become suspended, they no longer impart an osmotic force. Thus, although the osmotic potential of water comprising multivalent ions can increase along with the concentration of multivalent ions, it will not increase beyond the point of saturation. Accordingly, in embodiments incorporating NF membranes, the osmotic pressure requirement can be kept low even at very high rates of recovery, because the osmotic pressure requirement is proportional to concentration of dissolved solids and not suspended solids. Monovalent ion concentration can be kept to a minimum as NF membranes reject relatively smaller percentages of monovalent ions as compared to multivalent ions.

In some embodiments, NF membranes can also be used to remove high percentages of organic material (as measured by biological oxygen demand (BOD)) from primary effluent, without the need for activated sludge or other aerobic biological process treatment. In some applications, however, e.g., industrial wastewater applications, dissolved contaminants may not pose a significant problem. Thus, in some embodiments, flat sheet UF membranes can be employed in a planar configuration in a low-fouling, cross-flow membrane system, to remove solids and biologicals only.

According to one embodiment, a method of treating wastewater includes treating wastewater to remove at least some larger suspended solids and thereby produce a primary effluent, and directly treating the primary effluent with a low-fouling osmotic membrane system to remove at least some dissolved (organic and/or inorganic) compounds from the primary effluent. Some embodiments employ multiple osmotic membrane elements, such as NF membrane elements, disposed inside a pressure vessel in a planar and open configuration, to produce a high quality effluent from primary effluent feed water. In some embodiments, feed water can be circulated past the planar membrane surfaces (in a direction generally parallel to the membrane surfaces), for example using an impeller disposed inside the pressure vessel or a pump disposed outside the pressure vessel, to reduce the membrane fouling commonly associated with membrane treatment. In some embodiments, concentrate from the low-fouling osmotic system can be supplied to a secondary treatment process, such as an activated sludge and clarification process, to remove solids that may have precipitated out of solution in the concentrate. In some such embodiments, secondary effluent (from the secondary treatment process) can be supplied to a second low-fouling osmotic system, to obtain a higher total recovery.

Embodiments can be used to produce a relatively high quality effluent suitable for reuse applications, without requiring multiple additional treatment systems. Some embodiments can be configured to provide a better quality permeate than is provided by conventional tertiary processes, with less equipment and with a reduced number of process steps. Embodiments can also be used to produce a high quality feed water for subsequent treatment in a conventional RO system. The high quality feed water produced with a low-fouling osmotic system according to embodiments can serve to reduce the level of inorganic and organic fouling that normally occurs in conventional RO system, allowing for a smoother, more efficient operation of the RO stage even in the absence of conventional secondary or tertiary treatment or low-pressure membrane pre-treatment processes. Embodiments can allow for cost effective and efficient expansion of existing wastewater treatment plants while improving the effluent water quality in a more compact footprint than conventional systems.

Figure 24:
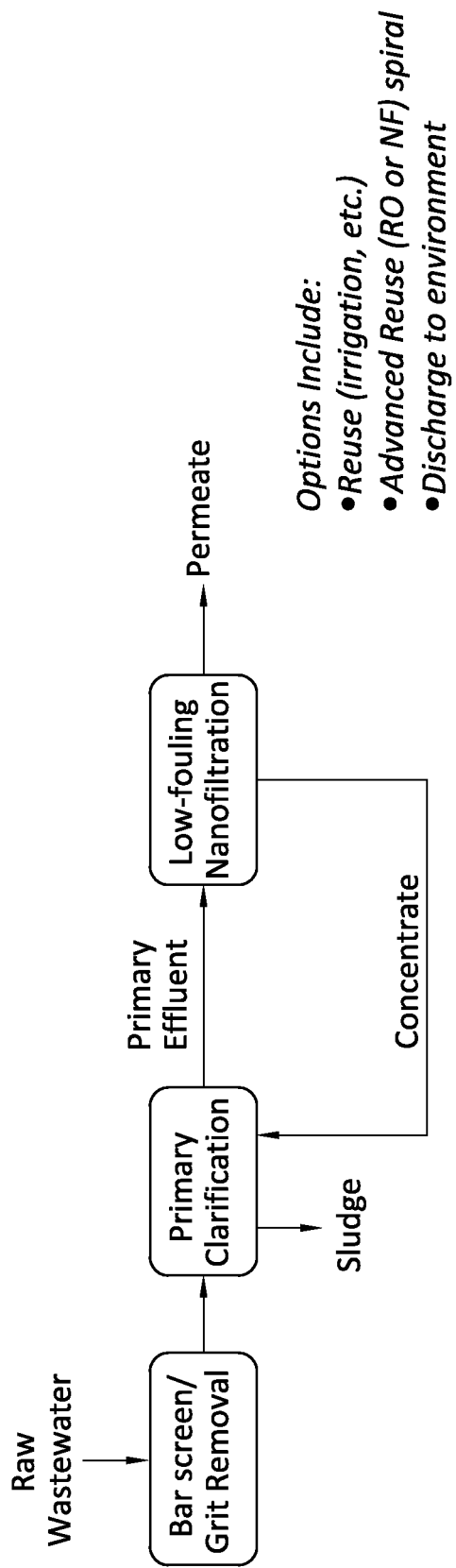
FIG. 24 is a process diagram illustrating a method of treating wastewater according to an embodiment.

FIG. 24 is a process diagram illustrating a method of treating wastewater according to an embodiment. As shown in the figure, raw wastewater can be passed through a bar screen/grit removal process, and then subjected to a primary clarification process for removal of at least some suspended solids. The primary clarification process produces sludge and a primary effluent stream having a reduced level of suspended solids. The primary effluent is directly supplied to a low-fouling osmotic system, such as a low-fouling nanofiltration system, for example as described herein. The low-fouling osmotic system is configured to produce a permeate stream having reduced levels of dissolved constituents, total suspended solids, and BOD, as well as a waste or concentrate stream. The concentrate stream may be disposed of along with the sludge produced by the grit removal and primary clarification steps. In some embodiments, as illustrated in FIG. 24, the concentrate stream can be returned to the primary clarification process. In some embodiments, the concentrate stream can be subjected to additional processes, for example to remove solids that may have precipitated out of solution in the osmotic system. For example, these solids can be removed by a secondary activated sludge and sedimentation process or by a hydrocyclone centrifugal system. In embodiments, removal of at least the larger (and/or denser) suspended solids from the raw wastewater stream (before routing the stream to the low-fouling osmotic system) can reduce or prevent scratching or other damage to the osmotic membranes in the osmotic system, and can also reduce the risk of plugging channels and/or valves in the osmotic system. In some embodiments, the use of a primary clarifier to remove solids can provide an added benefit of raw wastewater storage, to even out diurnal and weather-related variances in flow.

In some embodiments, the low-fouling osmotic system can be configured to operate at a relatively low recovery rate (for example and without limitation, between about 30% and about 80%, with some embodiments configured to operate at a recovery rate of about 65%). In some embodiments, the total recovery (the volume of clean water produced as a percentage of the volume of raw water supplied) of the entire treatment process can range from 30 to 90%, although lower or higher recovery rates are possible. For example, in some embodiments, additional low-fouling NF membrane systems or secondary or tertiary treatment systems can be added after a low-fouling osmotic system to increase the total recovery of the entire system.

Embodiments such as the one illustrated in FIG. 24 can be used in, for example, end-of-line wastewater treatment plants, in which substantially all of the raw wastewater flow (e.g., sewer flow) is treated and the final effluent is discharged directly into the environment (e.g., a river or the ocean), as well as in distributed wastewater or "skimming" plants, in which just a portion of raw wastewater flow (e.g., 30% to 60% of the total flow) is removed from the wastewater stream and treated, with the resulting concentrated wastewater being discharged back to the wastewater stream (e.g., sewer flow). Embodiments can be used to advantage in skimming plants to reduce the volume of flow in sewers, and also to reduce the volume of flow to subsequent end-of-line treatment plants. In addition, low-fouling osmotic systems employing nanofiltration membranes can be used as a skimming plant to produce cleaner effluent than conventional skimming plants, increasing the number of possible uses for the effluent. In some embodiments, effluent from distributed skimming plants comprising a low-fouling osmotic system can provide a distributed water supply for irrigation and industrial uses, without the need to construct long pipelines from a central or end-of-line plant. The process simplicity of embodiments allows for little to no operational requirements and little to no maintenance of such systems.

Figure 25A:
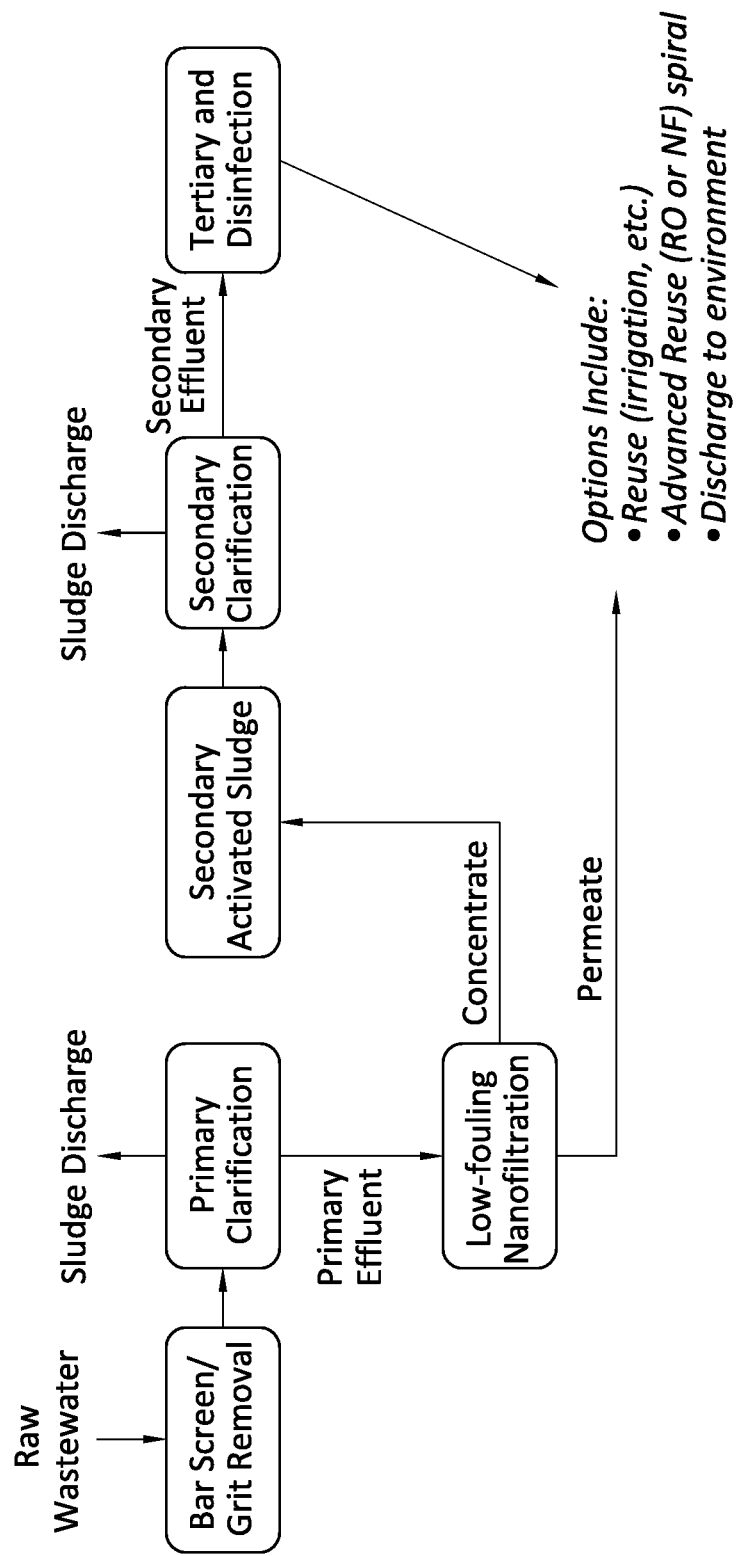
FIGS. 25A-D are process diagrams illustrating various methods of treating wastewater according to various embodiments.

FIGS. 25A-D are process diagrams illustrating various methods of treating wastewater according to various embodiments. As shown in FIG. 25A, in some embodiments, concentrate from a low fouling nanofiltration system can be transferred to a conventional secondary (and optionally, a tertiary) treatment system, to lower the volume requirements for the secondary (and optional tertiary) systems. Such an embodiment can be used to advantage in, for example, an upgrade to an existing wastewater treatment plant. By adding a low fouling NF system to an existing plant, the capacity of the existing plant can be increased. For example, the addition of a low fouling NF system to an existing plant according to an embodiment (after primary treatment but before any subsequent processes in the existing plant), operating at a 50% recovery rate, would roughly double the capacity of the subsequent processes. Since only the concentrate from the NF system would be sent to the subsequent processes, the presence of the NF system would roughly halve the volume of feed water supplied to the subsequent processes.

Figure 25B:
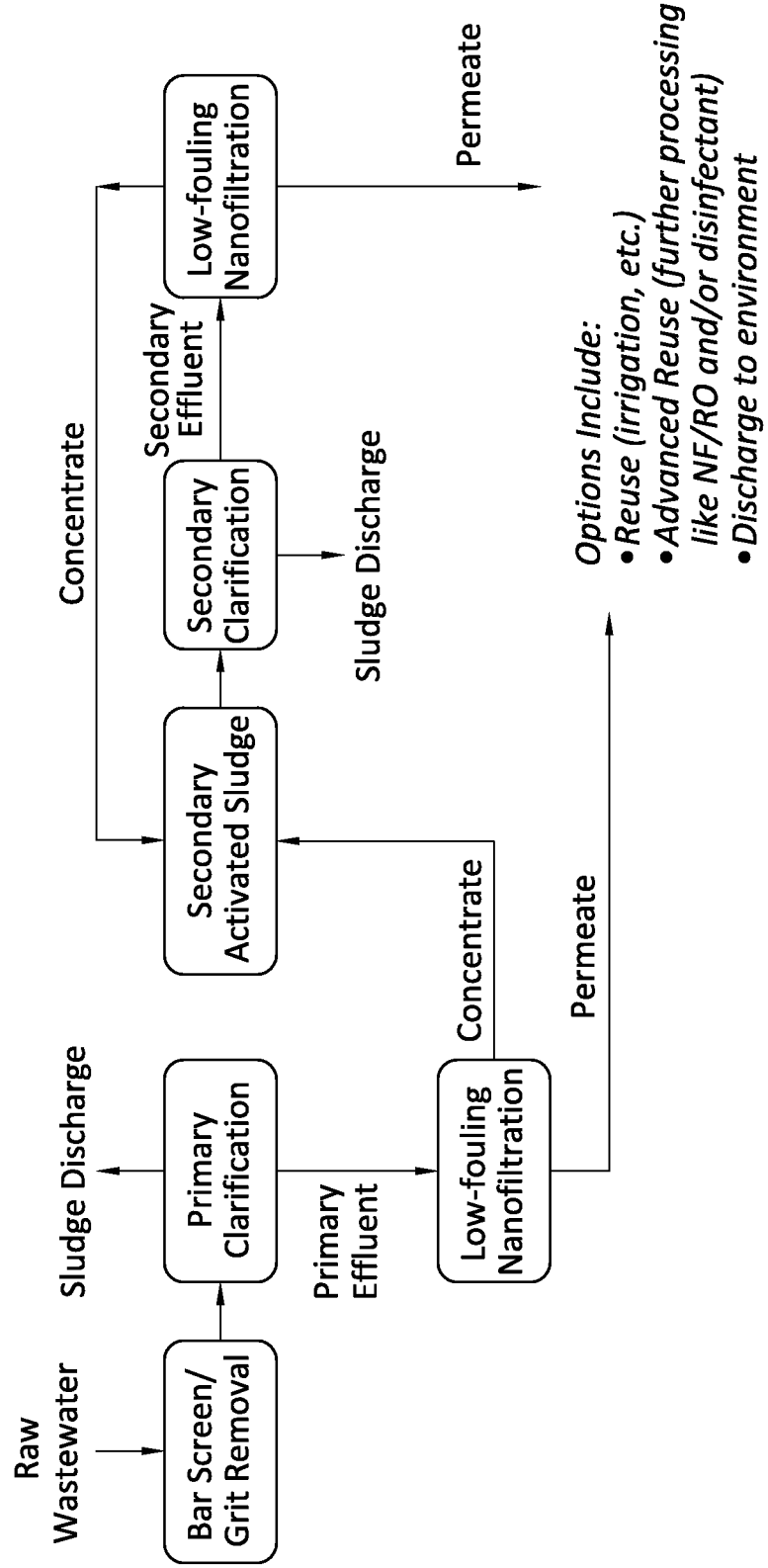

As shown in FIG. 25B, in some embodiments, concentrate from a first low fouling NF system can be transferred to a smaller secondary treatment system, which may include an activated sludge process. The secondary effluent from the secondary treatment system can be supplied to a second low fouling NF system. The concentrate from the second low fouling NF system can be recycled back to the secondary treatment process (e.g., to the activated sludge process step). Such an embodiment can be configured to maximize the overall recovery of the entire treatment system—that is, to minimize the volume of discharge relative to the amount of usable effluent produced. In some embodiments, essentially the only liquid discharged is the liquid discharged with the sludge disposal. Such a system may be referred to as a "zero liquid" discharge process.

Figure 25C:
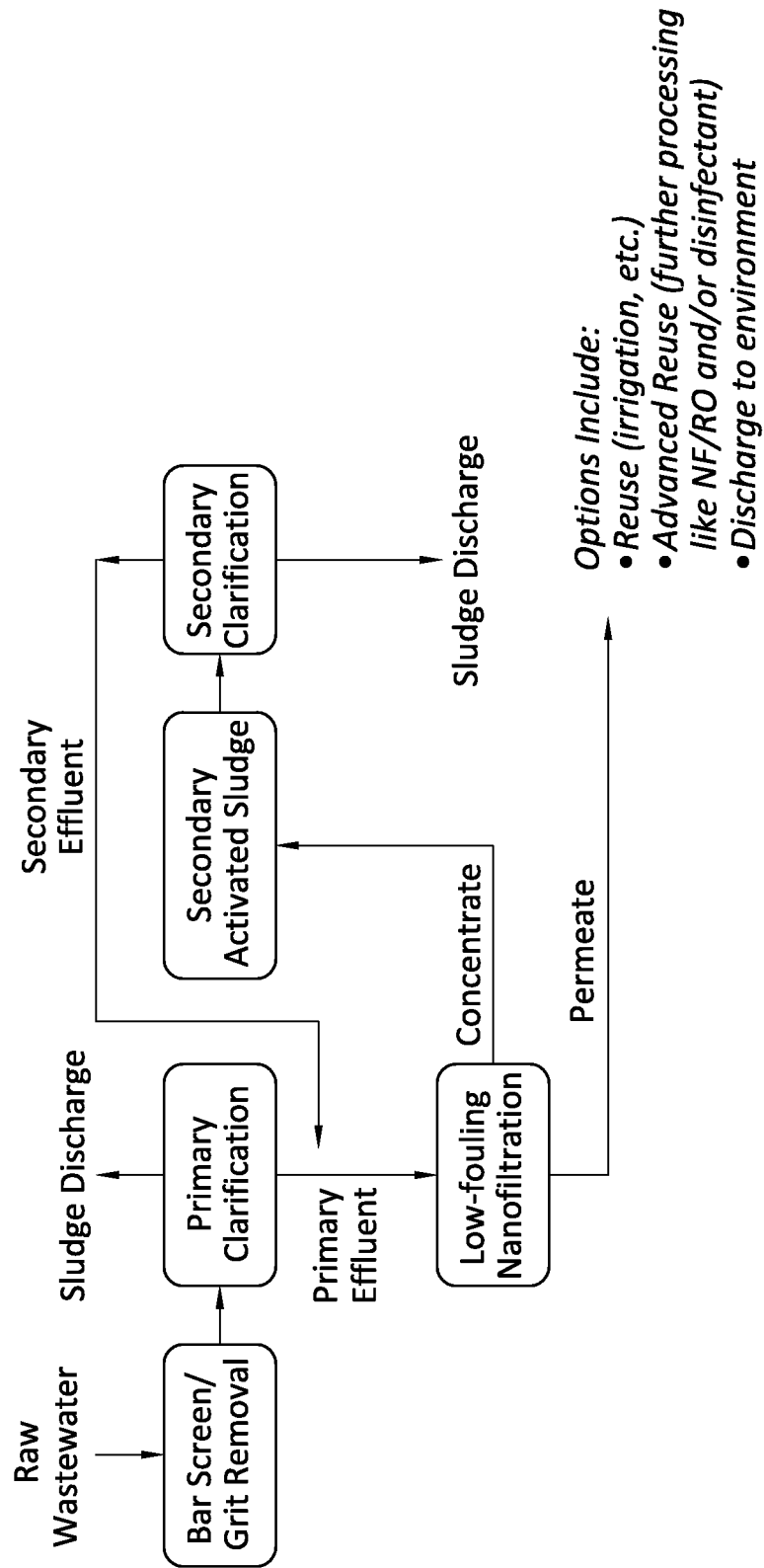

FIG. 25C illustrates a further embodiment, in which secondary effluent from the secondary (and optionally tertiary) treatment process is returned to the primary effluent stream (or, optionally, returned directly to the first low fouling NF system). Such an embodiment can be used to advantage as, for example, a retrofit to a conventional wastewater treatment plant that might be space constrained and not have room for multiple low fouling NF systems.

Figure 25D:
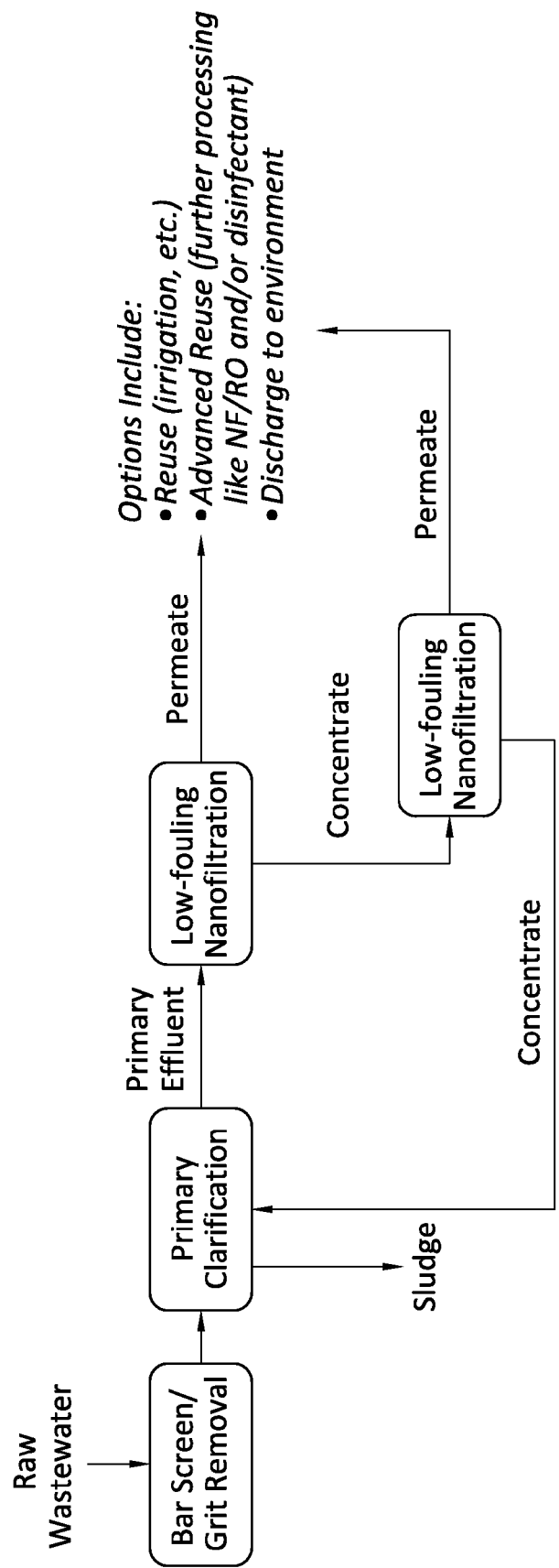

FIG. 25D illustrates a further embodiment, in which the concentrate stream from a first low fouling NF system is transferred directly to a second, smaller low fouling NF system, which may be operated at a slightly higher pressure than the first low fouling NF system (as some monovalents will be retained in the concentrate from the first low fouling NF system). By such a configuration, the overall recovery of the system can be increased without subjecting the entire stream to the higher osmotic pressure. In some embodiments, biologicals can be adequately removed with the concentrate from the low fouling NF systems (and/or with the sludge from the primary clarification process), obviating the need for an activated sludge tank.

Figure 26:
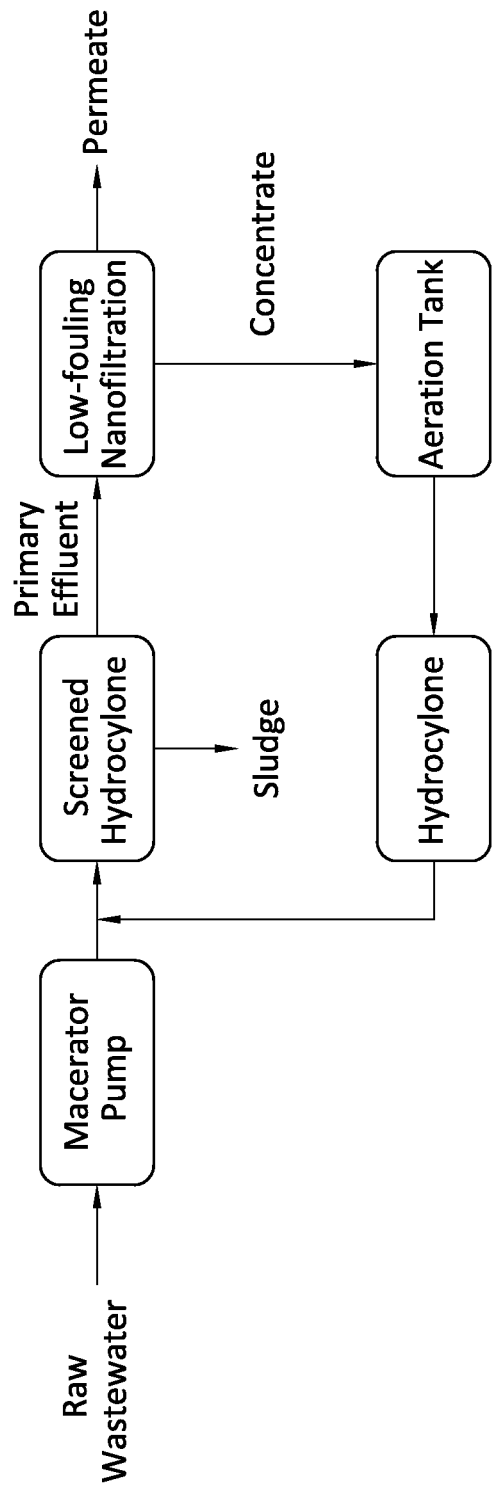
FIG. 26 is a process diagram illustrating another method of treating wastewater, according to a further embodiment.

FIG. 26 is a process diagram illustrating another method of treating wastewater, according to a further embodiment, in which the primary treatment takes a different form than illustrated in the previous figures. As shown in FIG. 26, raw wastewater is supplied to a macerator pump and a hydrocyclone or automated screen (or some combination of the two) to remove at least some of the suspended solids from the wastewater. Primary effluent from the hydrocyclone/screen is supplied to a low fouling nanofiltration system. The concentrate from the low fouling nanofiltration system can be routed to an aeration tube to prevent anaerobic conditions, and then to a second hydrocyclone or screen. Use of a second hydrocyclone/screen can serve to remove small particles and precipitate from the concentrate in the low fouling nanofiltration system. Effluent from the second hydrocyclone can be returned to an early stage of the process flow (e.g., to the first hydrocyclone), to enhance the overall efficiency of the system.

Embodiments of the present invention can have varying recovery rates. The recovery of a cross-flow membrane process can be defined as the ratio of the desired effluent (e.g., permeate) volume to the influent volume, expressed as a percent. The recovery of a given system can depend on such factors as the level of dissolved matter and the biological oxygen demand (BOD) in the influent. Generally, the lower the level of dissolved solids (especially of divalent or multivalent ions) in the influent, the higher the recovery of a low-fouling osmotic system. At the point of saturation, the dissolved matter can precipitate out of solution in the feed water (or concentrate) and settle, for example, as sludge in a follow-on secondary treatment process or hydrocyclone. In embodiments employing two low-fouling nanofiltration systems, concentrate from the first system, which may have a concentration of divalent and multivalent ions very close to saturation, can be supplied to the second system. In such an embodiment, the second stage recovery can be set based on economic considerations related to pressure and viscosity of the feedwater (i.e., the concentrate from the first system).

In some embodiments, in addition to planar, spaced-apart membrane configuration and the high cross-flow velocity generated in the feed water, an air scour system can be employed to further agitate the membranes and inhibit particles from settling. An air scour system can also serve to prevent the feedwater from becoming anaerobic. The addition of an air scour system can be advantageous for more challenging wastewater streams. Other real-time cleaning systems, such as flow pulsing, ultrasonic and/or sonic vibration, or flushing may also be employed to limit cleaning requirements and to prolong operational uptime between maintenance.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A method of treating a liquid containing membrane foulants, the method comprising:
   adding antifouling particles to the liquid, the antifouling particles having a specific surface area of 10 $m^2/g$ or more;
   supplying the liquid to a pressure vessel, the pressure vessel having an inlet, a permeate outlet, and a spiral-wound reverse osmosis or nanofiltration membrane element disposed within the pressure vessel, the membrane element having one or more membrane sheets spaced apart at a spacing of from about 1 mm to about 8 mm;
   applying a pressure differential across the spiral-wound reverse osmosis or nanofiltration membrane element so as to drive a reverse osmosis or nanofiltration process across the membrane element;
   circulating the liquid and the antifouling particles past the spiral-wound reverse osmosis or nanofiltration membrane element in the pressure vessel, wherein the antifouling particles coat membrane surfaces of the spiral-wound reverse osmosis or nanofiltration membrane element to form a protective layer over the membrane surfaces that attracts and holds membrane foulants while allowing passage of permeate through the spiral-wound reverse osmosis or nanofiltration membrane element; and
   collecting the permeate from the permeate outlet.

2. The method of claim 1, wherein the membrane foulants comprise suspended and/or dissolved particles.

3. The method of claim 1, wherein the spiral-wound membrane element is a reverse osmosis membrane.

4. The method of claim 1, wherein the spiral-wound membrane element is a reverse osmosis membrane.

5. The method of claim 1, wherein the liquid is circulated at a cross-flow velocity between 0.5 feet per second and 10 feet per second.

6. The method of claim 1, wherein the liquid is circulated at a cross-flow velocity between 1 foot per second and 2 feet per second.

7. The method of claim 1, wherein the pressure vessel is pressurized to an operating pressure of from 15 psi to 250 psi.

8. The method of claim 1, wherein the antifouling particles have a specific surface area of 30 $m^2/g$ or more.

9. The method of claim 1, wherein the antifouling particles have a specific surface area of 300 m²/g or more.

10. The method of claim 1, wherein the antifouling particles have a minimum major dimension of 0.5 microns or more.

11. The method of claim 1, wherein the antifouling particles have a minimum major dimension of 1.0 micron or more.

12. The method of claim 1, wherein the antifouling particles are configured to adsorb membrane foulants having a diameter of 1 micron or less.

13. The method of claim 1, wherein the antifouling particles comprise diatomaceous earth.

14. The method of claim 1, wherein the antifouling particles comprise activated carbon.

15. The method of claim 1, wherein the antifouling particles are added to the liquid during treatment.

16. The method of claim 1, wherein the antifouling particles are added to the liquid continuously during treatment.

17. The method of claim 1, wherein the antifouling particles are added so as to have a concentration of between 1 and 20 mg/L of liquid in the pressure vessel.

18. The method of claim 1, wherein the liquid is primary effluent from a wastewater primary treatment process.

19. The method of claim 18, wherein the primary effluent is supplied to the pressure vessel from the wastewater primary treatment process without any intervening biological treatment process.

20. The method of claim 1, further comprising adding pellets to the pressure vessel.

21. The method of claim 20, wherein the pellets are configured to dislodge at least some of the membrane foulants and/or at least some of the antifouling particles from the osmotic membrane elements as the pellets circulate in the pressure vessel.

22. The method of claim 20, wherein the pellets have a cylindrical shape.

23. The method of claim 20, wherein the pellets have an oblong shape.

24. The method of claim 20, wherein the pellets have a maximum major dimension of between 0.1 mm and 2.0 mm.

25. The method of claim 20, wherein the pellets have a maximum major dimension which is less than or equal to half of the spacing.

26. The method of claim 20, wherein the pellets are added so as to have a concentration of between about 0.5% and about 10% of the volume of the liquid in the pressure vessel.

27. The method of claim 1, wherein the vessel further comprises a concentrate outlet.

28. A method of treating a liquid containing membrane foulants, the method comprising:

providing a liquid containing membrane foulants, wherein the liquid containing membrane foulants is a primary effluent from a wastewater primary treatment process;

adding antifouling particles to the liquid containing membrane foulants, wherein the antifouling particles have a specific surface area of 10 m²/g or more, and wherein a concentration of antifouling particles in the liquid is between 1 and 20 mg/L;

supplying the liquid containing the antifouling particles and the membrane foulants to a pressure vessel through an inlet, wherein the pressure vessel has disposed within a spiral-wound reverse osmosis membrane element, the membrane element having adjacent membrane sheets spaced apart by a spacing of from about 1 mm to about 8 mm;

applying a pressure differential across the spiral-wound reverse osmosis membrane element;

circulating the liquid containing the antifouling particles and the membrane foulants past the spiral-wound reverse osmosis membrane element in the pressure vessel at a cross-flow velocity of between 0.5 feet per second and 10 feet per second while applying a pressure differential across the spiral-wound reverse osmosis membrane element, wherein the antifouling particles coat membrane surfaces of the spiral-wound reverse osmosis membrane element to form a protective layer over the membrane surfaces that attracts and holds the membrane foulants while allowing passage of permeate through the spiral-wound reverse osmosis membrane element; and collecting the permeate from a permeate outlet of the pressure vessel.

* * * * *

UNITED STATES PATENT AND TRADEMARK OFFICE
CERTIFICATE OF CORRECTION

PATENT NO. : 8,685,252 B2  
APPLICATION NO. : 13/020393  
DATED : April 1, 2014  
INVENTOR(S) : Vuong et al.

Page 1 of 1

It is certified that error appears in the above-identified patent and that said Letters Patent is hereby corrected as shown below:

On the Title Page

Page 1 (item 75, Inventors) at lines 3-4, Change "Ranchos Palos Verdes, CA" for Curtis Roth to --Rancho Palos Verdes CA--.

In the Specification

In column 10 at line 46, After "(SEMs)" insert --of--.

In the Claims

In column 48 at line 56, In Claim 4 change "The method of claim 1, wherein the spiral-wound membrane element is a reverse osmosis membrane" to --The method of claim 1, wherein the spiral-wound membrane element is a nanofiltration membrane--.

Signed and Sealed this  
Twenty-first Day of October, 2014

Michelle K. Lee  
*Deputy Director of the United States Patent and Trademark Office*